United States Patent [19]
Nonaka et al.

[11] Patent Number: 5,991,256
[45] Date of Patent: Nov. 23, 1999

[54] MULTIPLE DISC CHANGING AND PLAYING APPARATUS HAVING DISK RACK BOARDS, A CARRIER AND A RECORDER GENERATOR

[75] Inventors: Wataru Nonaka; Masahiko Watanabe; Takahisa Hakoishi; Motofumi Itawaki; Masaharu Suzuki, all of Kanagawa, Japan

[73] Assignee: Sony Corporation, Tokyo, Japan

[21] Appl. No.: 08/526,874

[22] Filed: Sep. 12, 1995

[30] Foreign Application Priority Data

Sep. 15, 1994 [JP] Japan ..................................... 6-246949

[51] Int. Cl.$^6$ .................................................. G11B 33/14
[52] U.S. Cl. ........................................... 369/178; 369/192
[58] Field of Search ..................................... 369/178, 191, 369/192, 36, 75.1; 360/97.01, 97.02, 98.04, 92

[56] References Cited

U.S. PATENT DOCUMENTS

| | | | |
|---|---|---|---|
| 4,949,328 | 8/1990 | Kase et al. .............................. | 369/75.2 |
| 5,236,258 | 8/1993 | Bunch ..................................... | 360/92 X |
| 5,267,225 | 11/1993 | Fukasawa et al. ....................... | 369/36 |
| 5,353,269 | 10/1994 | Kobayashi et al. ....................... | 369/36 |
| 5,418,763 | 5/1995 | Ichikawa et al. ..................... | 369/178 X |
| 5,638,347 | 6/1997 | Baca et al. ............................. | 369/36 X |
| 5,726,967 | 3/1998 | Tanaka et al. ........................... | 369/192 |
| 5,729,524 | 3/1998 | Pines et al. .............................. | 369/178 |

FOREIGN PATENT DOCUMENTS

| | | |
|---|---|---|
| 2 232 524 | 12/1990 | United Kingdom . |
| 2 279 490 | 1/1995 | United Kingdom . |

OTHER PUBLICATIONS

Patent Abstracts of Japan, vol. 015, No. 041 (P–1160), Jan. 31, 1991 & JP–A–02 276056 (Mitsubishi Electric Corp.), Nov 9,1990 , abstract.

*Primary Examiner*—William R. Korzuch
*Attorney, Agent, or Firm*—Frommer Lawrence & Haug, LLP.; William S. Frommer

[57] ABSTRACT

A disc changer is provided to support each of a plurality of bare discs for recording and/or regeneration on a separate disc rack board without requiring a cartridge. The disc rack boards are positioned so as to form a vertical stack. A carrier is provided which moves only in the vertical direction along the vertical stack of disc rack boards. Furthermore, a plurality of disc drives is provided in a vertical stack opposing the vertical stack of disc rack boards. A hand is provided which moves only in a direction perpendicular to the direction in which the carrier moves, and operates to transfer one of the plurality of bare discs between one of the plurality of disc rack boards and the carrier and between one of the plurality of disc drives and the carrier. Thus, the number of discs which may be loaded is increased while the size of the disc changer is minimized.

5 Claims, 78 Drawing Sheets

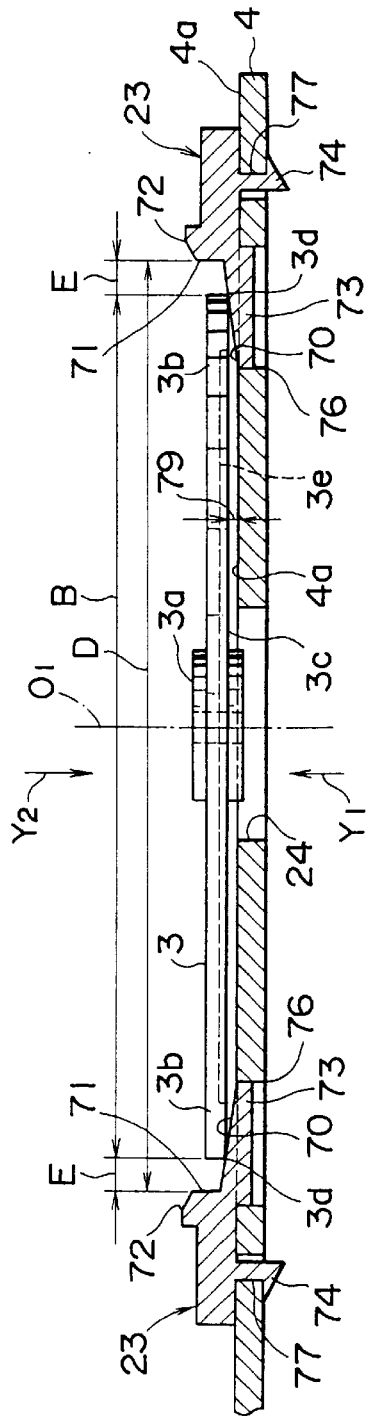
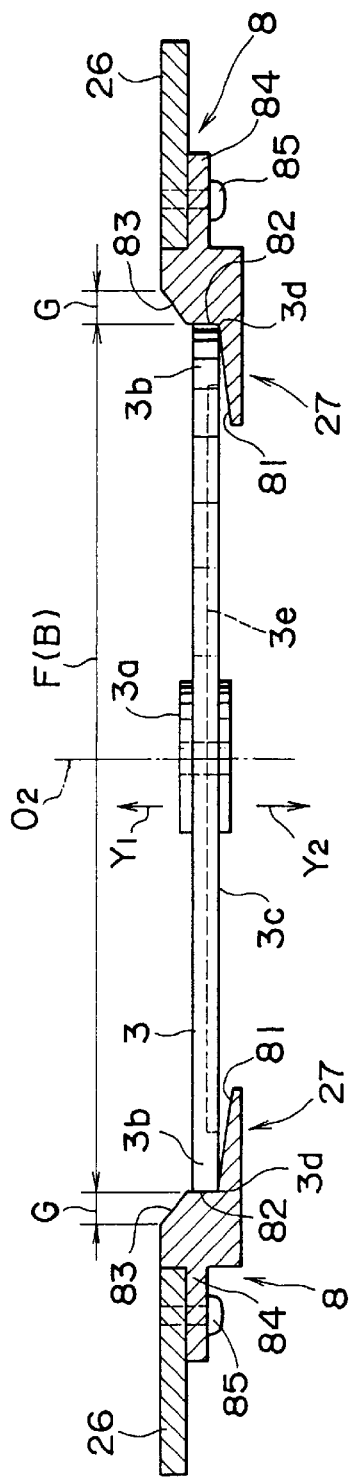
FIG. 30A
FIG. 30B

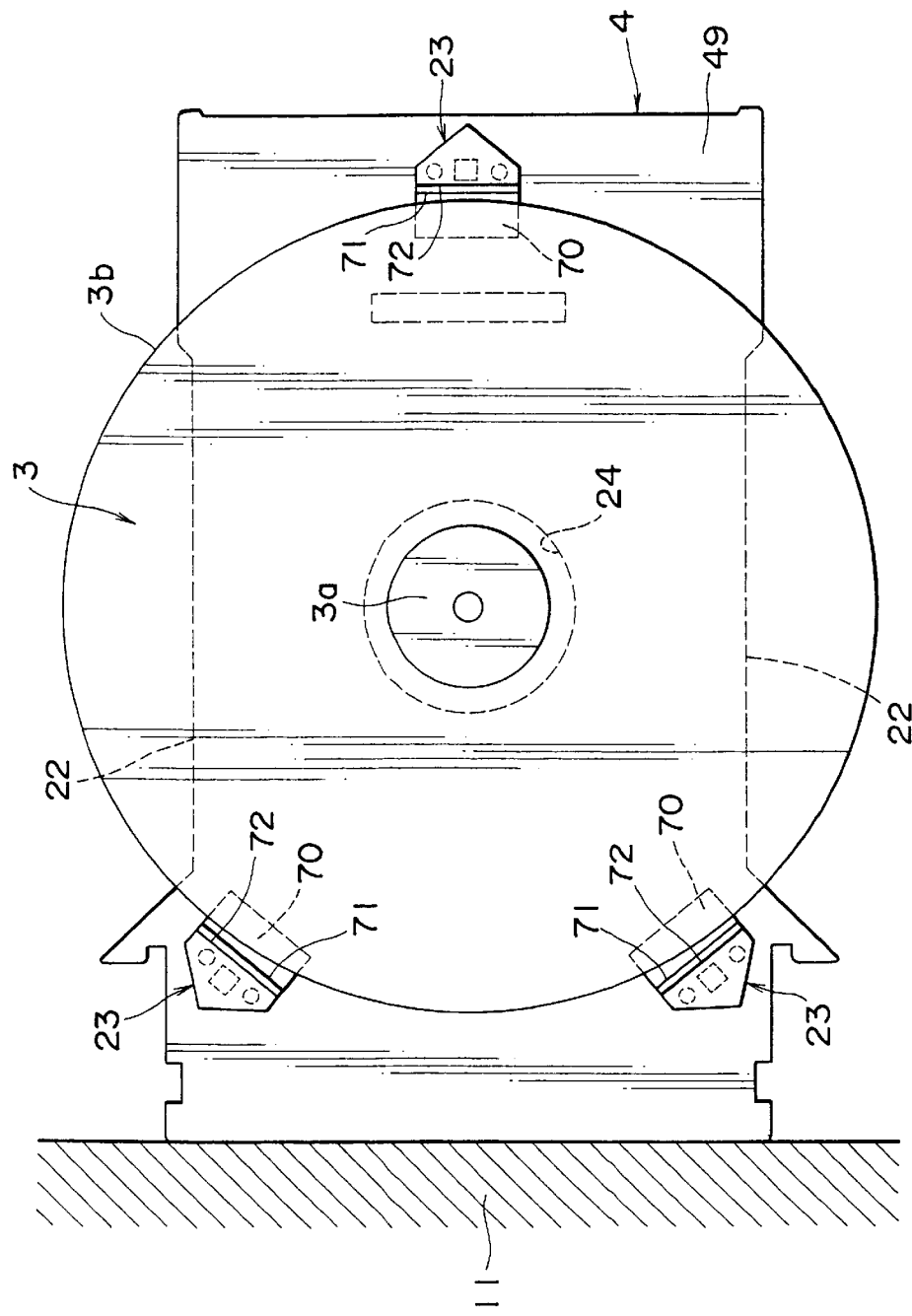

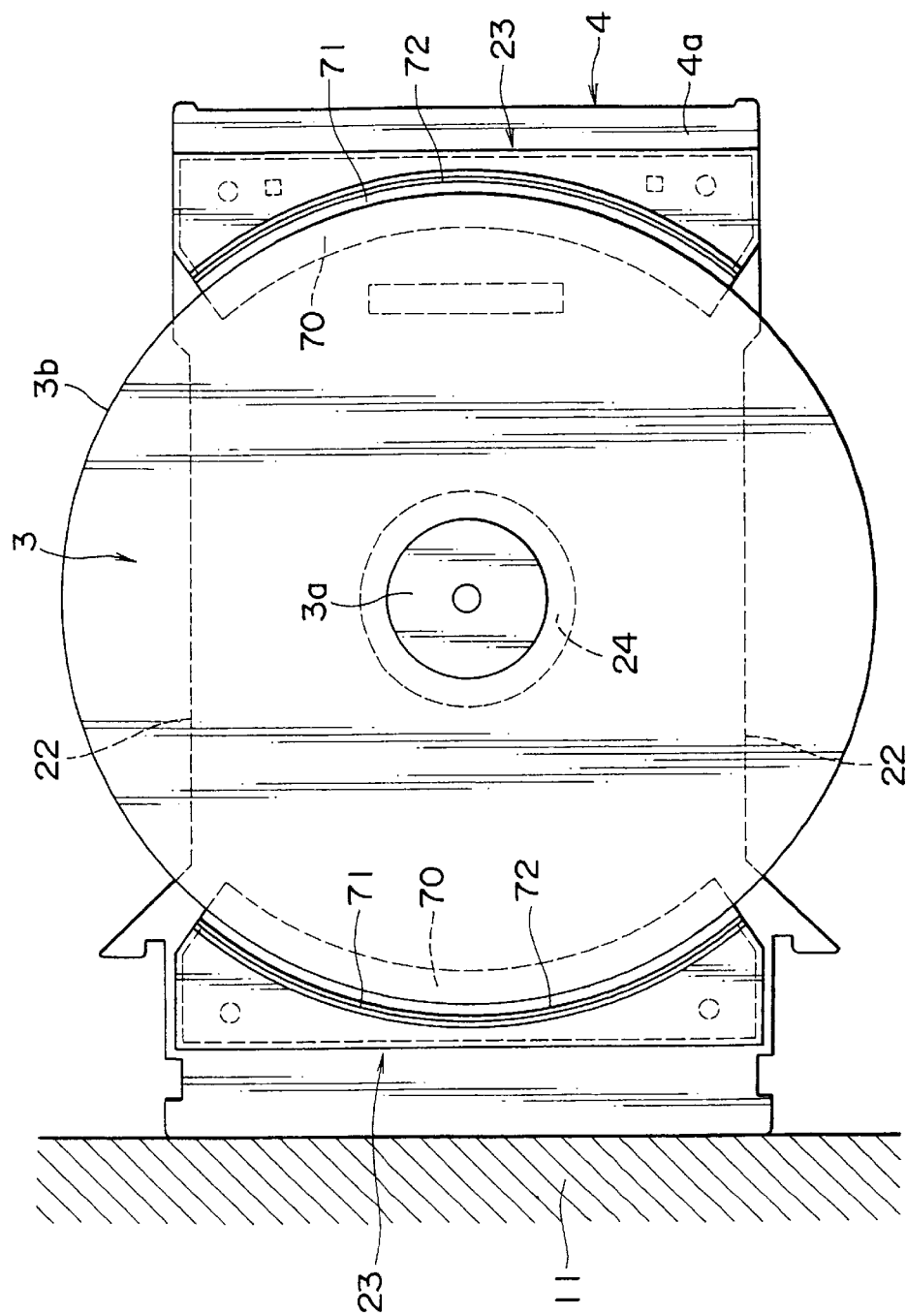

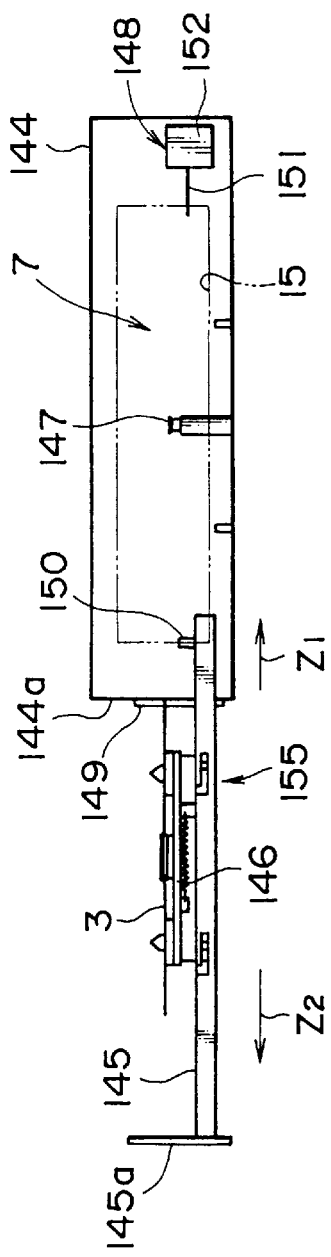
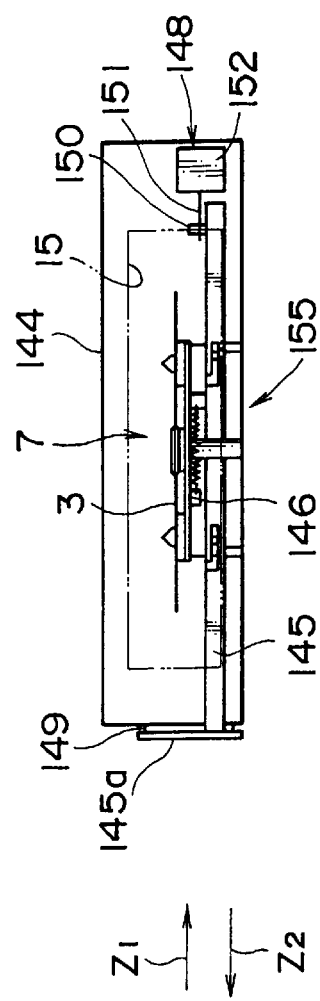

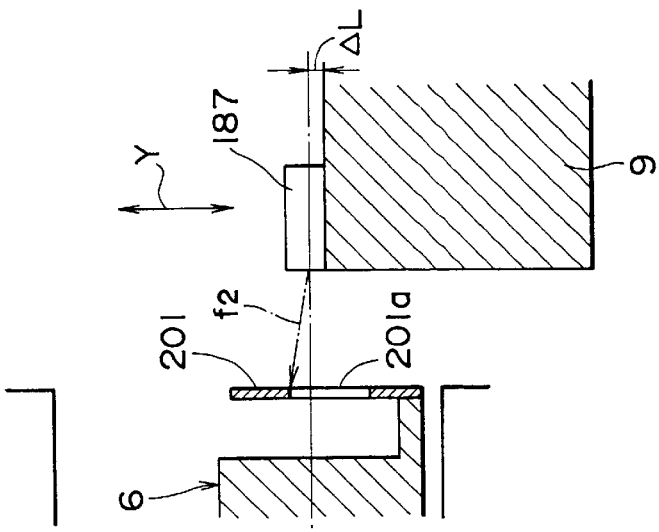
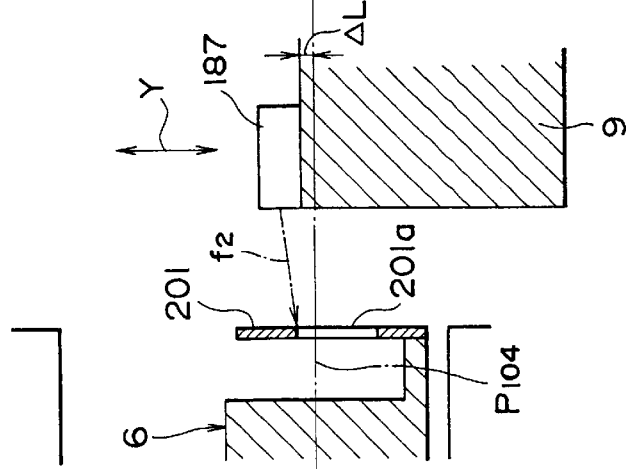
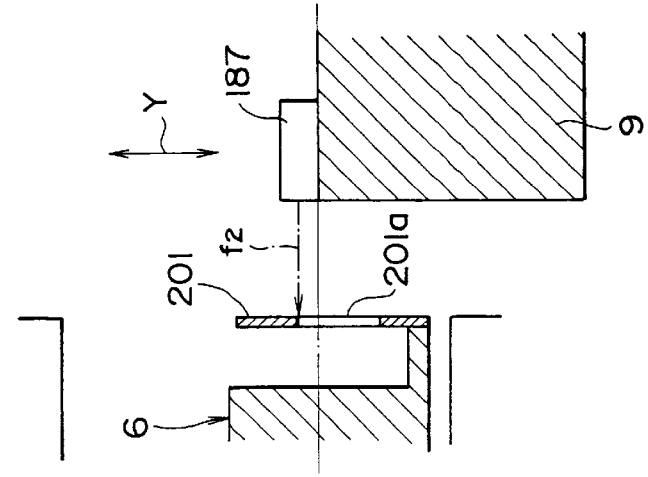

F I G. 75
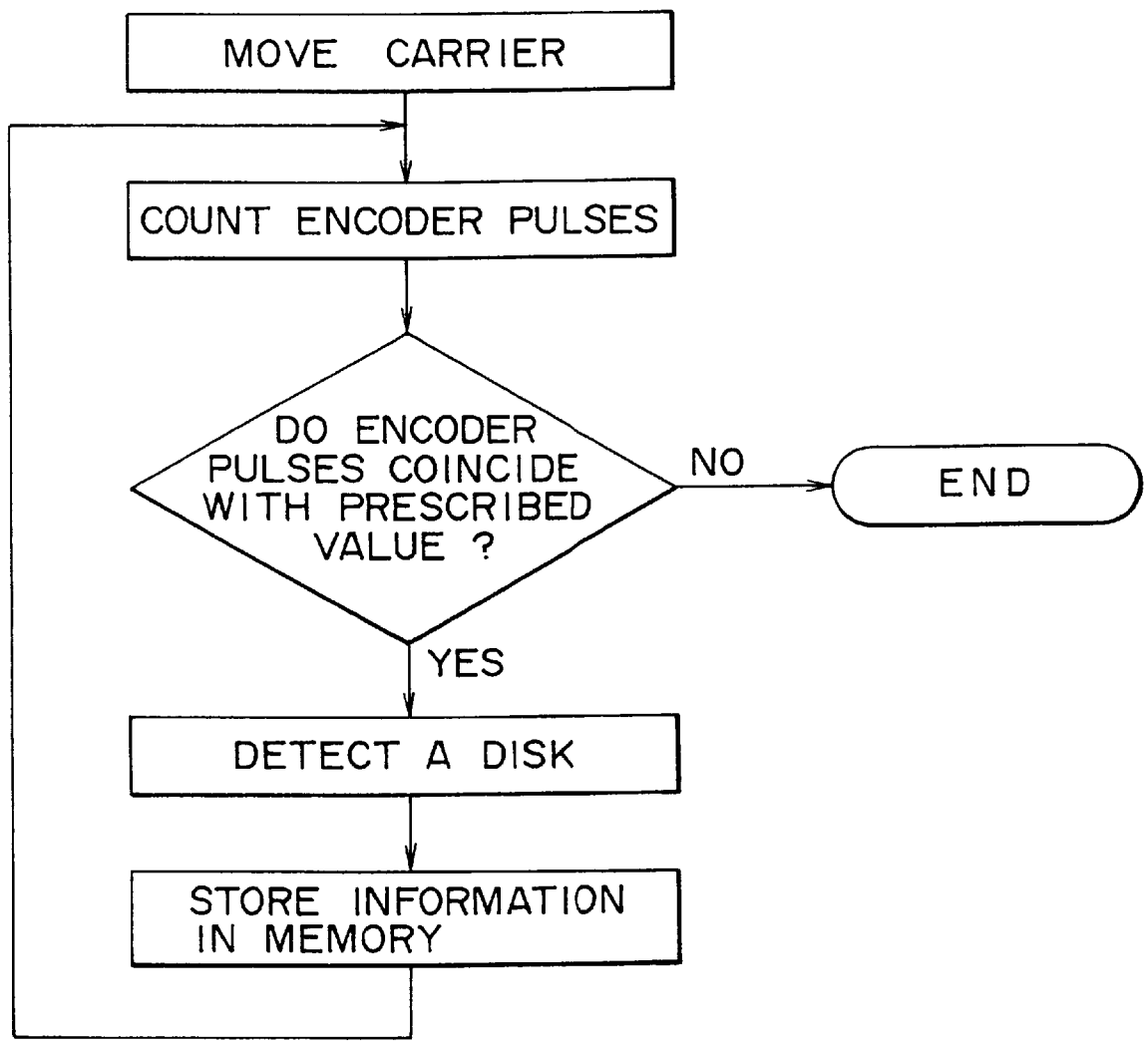

/ / 5,991,256

MULTIPLE DISC CHANGING AND PLAYING APPARATUS HAVING DISK RACK BOARDS, A CARRIER AND A RECORDER GENERATOR

BACKGROUND OF THE INVENTION

1 Field of the Invention

This invention relates to a disc changer for automatic changing of a disc to a disc drive using bare discs for recording and/or regeneration, for example, optical discs such as CD-ROM and magneto-optic (MO) disc.

2 Description of Related Art

Conventionally, disc changers mostly uses a disc cartridge which is the cartridge which contains a disc, and automatically changes a disc to a disc drive.

In the case in which some information is recorded and/or regenerated simultaneously on a plurality of disc cartridges using a plurality of disc drives arranged vertically, a plurality of rack containers arranged vertically for containing disc cartridges and a plurality of disc drives arranged vertically are placed in two lines with front sides in the same direction, and a disc cartridge conveyer moves in the first direction and the second direction perpendicular each other in the horizontal plane and in the vertical direction to convey a disc cartridge between the plurality of rack containers arranged vertically and disc drives.

However, such a conventional disc changer using disc cartridges is disadvantageously restricted in disc containing capacity, because the volume of a disc cartridge is larger than that of a bare disc.

A conveyer which conveys a disc cartridge in three directions of the orthogonal axes has a complex structure, costs alot, and requires a large space for conveying, thus the minimization of a disc changer is limited disadvantageously.

SUMMARY OF THE INVENTION

The present invention is accomplished to solve the above mentioned problem, and the object of the invention is to provide a disc changer having a capability of containing many discs while the disc changer is minimized in size.

The present invention provides a disc changer to achieve the object comprising; a plurality of disc rack boards provided vertically for holding bare discs for recording and/or regeneration, one or more of disc drives for recording and/or regenerating the bare discs provided facing to said disc rack boards, a carrier which moves only one direction in a space defined by the disc rack boards and disc drives, and a hand mounted on the carrier which moves only in the direction perpendicular to the moving direction of the carrier for transferring in only one direction the bare disc between a disc rack board and the carrier and between a disc drive and the carrier.

In the disc changer of the present invention structured as described herein above, bare discs for recording and/or regenerating are placed on a plurality of disc rack boards without using cartridge, a carrier which moves only one direction in a space defined by the disc rack boards and disc drives is provided, and a hand mounted on the carrier which moves only in the direction perpendicular to the moving direction of the carrier is provided, and a bare disc is transferred by the hand between a disc rack board and the carrier and between the carrier and disc drive.

BRIEF DESCRIPTION OF THE DRAWINGS

FIG. 30A is a cross-sectional view taken on line C3—C3 of FIG. 29 for illustrating the disc detecting mechanism on a disc rack board, and FIG. 30B is a cross-sectional view taken on line B3—B3 of FIG. 25 for illustrating the disc holder of the hand.

FIG. 31 is a top view for illustrating the first modification of the disc supports of a disc rack board.

FIG. 32 is a top view for illustrating the second modification of the disc supports of a disc rack board.

FIG. 53A is a side view taken on line G2—G2 of FIG. 51, and FIG. 53B is a side view taken on line G3—G3 of FIG. 52.

FIGS. 69A to 69C are schematic side views for illustrating the deviation in position of the carrier due to sensor error of the carrier.

FIG. 75 is a flowchart for describing the operation for detecting the existence of a disc on the disc rack board.

DESCRIPTION OF THE PREFERRED EMBODIMENTS

Figure 1:
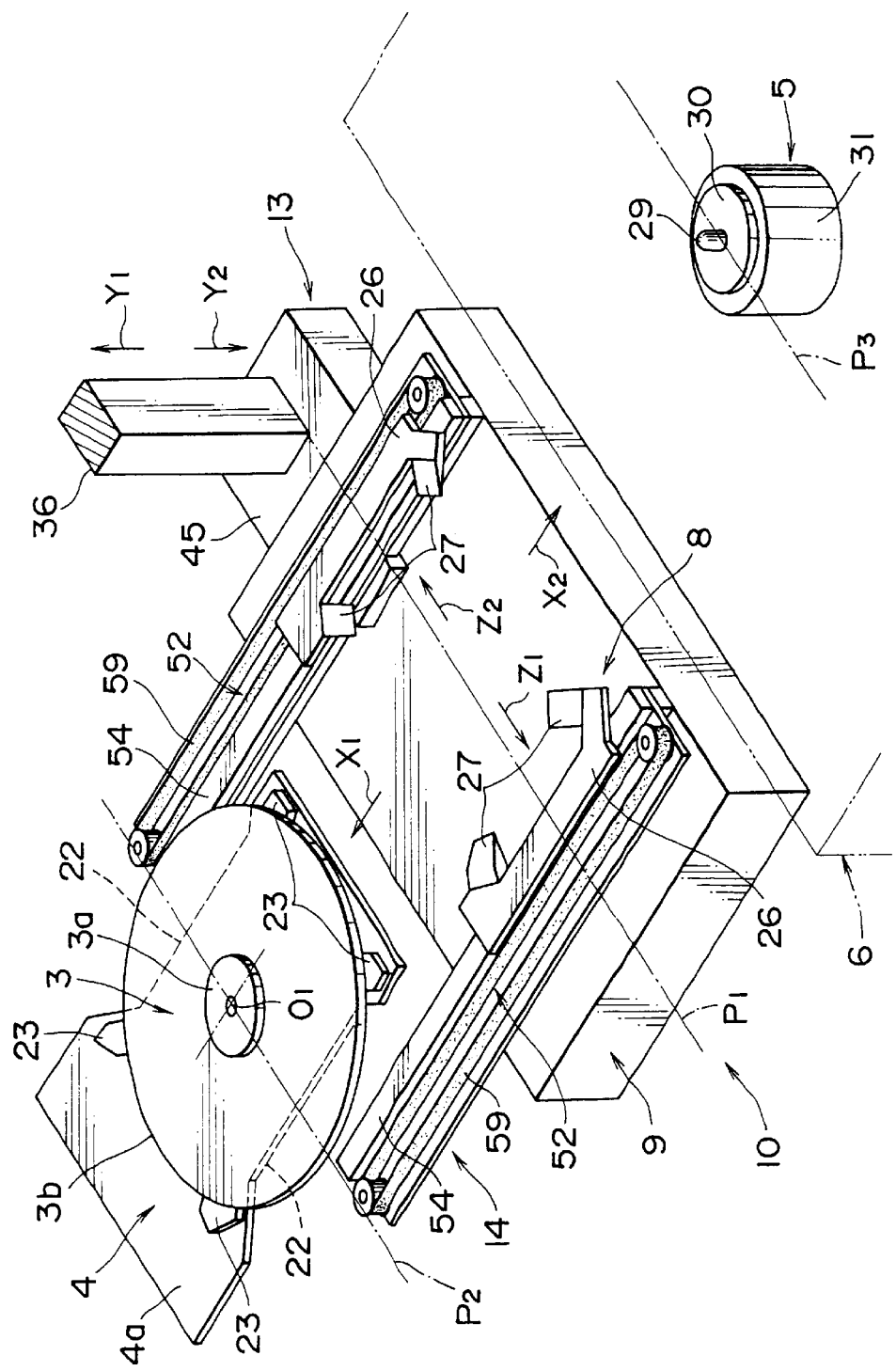
FIG. 1 is a perspective view for illustrating the starting of operation for taking out a disc from a disc rack board by the hand on the carrier in an embodiment of a disc changer in accordance with the present invention.

Embodiments of the disc changer in accordance with the present invention will be described referring the drawings. In these embodiments, bare discs for recording and/or regeneration of optical discs such as CD-ROM or magneto-optic discs are used. Therefore the drive for recording and/or regenerating these discs are a disc drive.

Outline of the Disc Changer

Referring to FIG. 13 to FIG. 16, outline of this disc changer is described.

The changer body 1 formed in a vertical cuboid box having the front side 1a of operating side, opposite back side 1b, and right and left sides 1c and 1d. The changer body 1 is divided to two sections by a partition 2 provided vertically along the center between the right side and left side of the internal of the changer body.

In the changer body 1, a disc rack having a plurality of disc rack boards 4 is provided vertically for storing bare discs 3 flat on the boards, a plurality of disc drives 6 is provided vertically and is contained inside a recorder and/or regenerator 5 for recording and/or regenerating a disc 3, one disc-in-out port 7 provided in the same arrangement as the disc drives 6, and a carrier 9 having a hand 8 for handling a disc.

Where, a stack of the rack 4 having a plurality of flat rack boards 4 vertically and a stack comprising a plurality of flat disc drives 6 provided vertically and the disc-in-out port 7 are provided facing each other in the X direction, otherwise horizontal right and left direction, and between these two stacks a travelling passage 10 for carrying the carrier 9 is provided.

The disc rack having a plurality of rack boards 4 and the travelling passage 10 for carrying the carrier 9 are contained in one partition of the internal of the changer body 1 defined by the partition 2, and a plurality of disc drives 6 provided vertically and the disc-in-out port 7 are contained in another partition of the internal of the chamber body 1 defined by the partition 2.

The disc rack having one hundred disc rack boards 4 to store one hundred discs 3 is used for this disc changer, the one hundred disc rack boards 4 are divided to four blocks having twenty five boards each, twenty five disc rack boards 4 of one block are supported with a certain interval by one board base 11 with cantilevered structure in which one cantilever forms one disc rack board, and the four vertical board bases 11 are provided in four steps vertically. Eight disc drives 6 and one disc-in-out port 7, which is provided at a certain height in the middle of the stack of the disc drives in the same arrangement as the disc drive, are placed flat on the total nine step drive tables 12.

In the travelling passage 10, a carrier moving mechanism 13, which supports the cantilevered carrier 9 and is a linearly moving mechanism for traveling vertically in Y direction, is provided vertically. On the carrier 8, a hand moving mechanism 14, which is a linearly moving mechanism for traveling horizontally in X direction, is provided.

Disk gates 15, each of which is a flat opening provided on the side facing to the carrier 9 of the eight disc drives 6 and one disc-in-out port 7, are connected to the nine vertically arranged connecting gates 16. The tray gate 17 of the disc-in-out port opens on the front side 1a of the changer body 1.

On the front side 1a of the changer body 1 in front of the one hundred step disc rack boards 4, an amplifier block 19 is incorporated vertically isolated with a vertical partition 18 with U-shaped horizontal cross-section, and an interface block 20 for disc drives 6 are contained in the bottom under the space for containing disc drives 6 in the internal of the changer body 1. In the amplifier block 19, an amplifier circuit, power supply circuit, and CPU, which is a microcomputer for controlling the carrier moving mechanism 13 and hand moving mechanism 14 responding to signals from sensors and encoders and for controlling recorders and/or regenerators 5 of the disc drives 6 are provided.

BRIEF DESCRIPTION OF OPERATION OF THE DISC CHANGER

As shown in FIG. 13 to FIG. 16, in the case of this disc changer for charging discs, an operator inserts bare discs 3 one by one into the disc-in-out port 7 from the outside of the changer body 1. The inserted disc 3 is taken out from the disc-in-out port 7 by the carrier 9 and hand 8, and transferred in Y and X directions, and fed automatically to a certain specified position of the one hundred disc rack boards 4, and placed flat on the disc rack board 4.

For changing a disc 3, the carrier 9 and hand 8 are moved under control in Y and X directions, a disc 3 is taken out automatically in the X direction from a specified disc rack board 4 to the internal of the carrier 9 by the hand 8 responding to a command from the CPU. The taken out disc 3 is transferred automatically in Y direction to a specified disc drive 6 by the carrier 9. The disc 3 in the carrier 9 is loaded directly and automatically along X direction to the recorder and/or regenerator 5 in the specified disc drive 6 through the connecting gate 16 and disc gate 15 by the hand 8.

After the disc loading, the hand 8 is withdrawn automatically from the internal of the disc drive 6 to the carrier 9, and recording and/or regeneration of the disc 3 is operated automatically by the recorder and /regenerator 5 in the disc drive 6.

While the disc 3 is recorded and/or regenerated in the specified disc drive 6, another disc 3 is taken out from another specified disc rack board 4 and transferred and loaded automatically to another specified disc drive 6 in the same manner as described above, such operation is repeated. The operation of taking out a disc after completion of recording and/or regeneration operation from the disc drive 6 and returning to a specified original disc rack board 4 is a reversed operation of the loading operation described hereinbefore.

Description of Disc Placing on a Disc Rack Board

A method of placing a disc 3 on a disc rack board 4 is described referring to FIG. 1 to FIG. 12.

A disc rack board 4 comprises a rectangular metal plate, a pair of cut-outs 22 are formed on both sides of a disc in Z1 and Z2 directions, which is perpendicular to X1 and X2 directions, that is the moving direction of the hand 8. The width A of a disc rack board 4 is made sufficiently narrower than the diameter B of disc 3 by providing the pair of cut-outs 22.

Total four disc supports 23 made of synthetic resin are provided on the disc rack board at the positions on right and left sides on both ends in X1 and X2 directions. The total four disc supports 23 are positioned radially and point-symmetrically about the center of the disc rack board 4.

Disk supports are structured so as that the bottom face of the outer periphery 3b of a disc 3 is supported flat on the pair of disc supports 23 at both ends in X1 and X2 directions, and the disc 3 is positioned at the center O1 of the disc rack board 4 with some slack around the center. AT the center O1 of a disc rack board 4, a circular opening 24 is formed in which the center core 3a of a disc 3 is to be inserted with some slack.

Description of Operation for Holding a Disc by the Hand

Operation for holding a disc 3 by the hand 8 is described referring to FIG. 1 to FIG. 12.

A hand 8 comprises a pair of hand members provided facing each other in Z1 and Z2 directions, and comprises a pair of hand main members 26, namely sliding plate 26, made of flat metal plate formed symmetrically which are movable synchronously with each other in horizontal X1 and X2 directions by the hand moving mechanism 14 described hereinafter and comprises two pairs of submembers, total four disc holders 27, made of synthetic resin provided on the inside of a pair of hand main member 26 with interposition in X1 and X2 directions. These total four disc holders 27 of a set are positioned point-symmetrically about the center O2 between a pair of hand main members 26.

The disc hand is structured so as that the periphery 3b of a disc 3 is supported flat at both Z1 side and Z2 side on two pairs of disc holders 27 and the disc 3 is held at the center O2 between a pair of sliding plate 26 without a slack.

Description of Operation for Transferring a Disc by the Hand

Operation for transferring a disc 3 by the hand 8 on the carrier 9 between a disc rack board 4 and the carrier 9 and between the carrier 9 and a disc drive 6 referring to FIG. 1 to FIG. 12.

As illustrated in FIG. 1 to FIG. 8, on a disc rack board 4 a disc is supported flat on total four disc supports 23 at four points on the periphery 3b of the disc 3 on both X1 and X2 sides.

As illustrated in FIG. 1 to FIG. 8, the carrier 9, in which the hand 8 is contained at the origin P1 of the internal of the carrier 9, is moved in vertical Y1 and Y2 directions by the carrier moving mechanism 13 and stopped in front of a specified disc rack board 4.

As illustrated in FIG. 2 to FIG. 9, the hand 8 is moved horizontal X1 direction to the withdrawing position P2 on the disc rack board 4 by the hand moving mechanism 14, the total four disc holders 27 of the hand 8 is inserted to the lower position under the disc 3 on both sides Z1 and Z2 of the periphery 3b of the disc 3 placed flat on a specified disc rack board 4 (position under a pair of cutting off 22 of the disc rack board 4).

Figure 3:
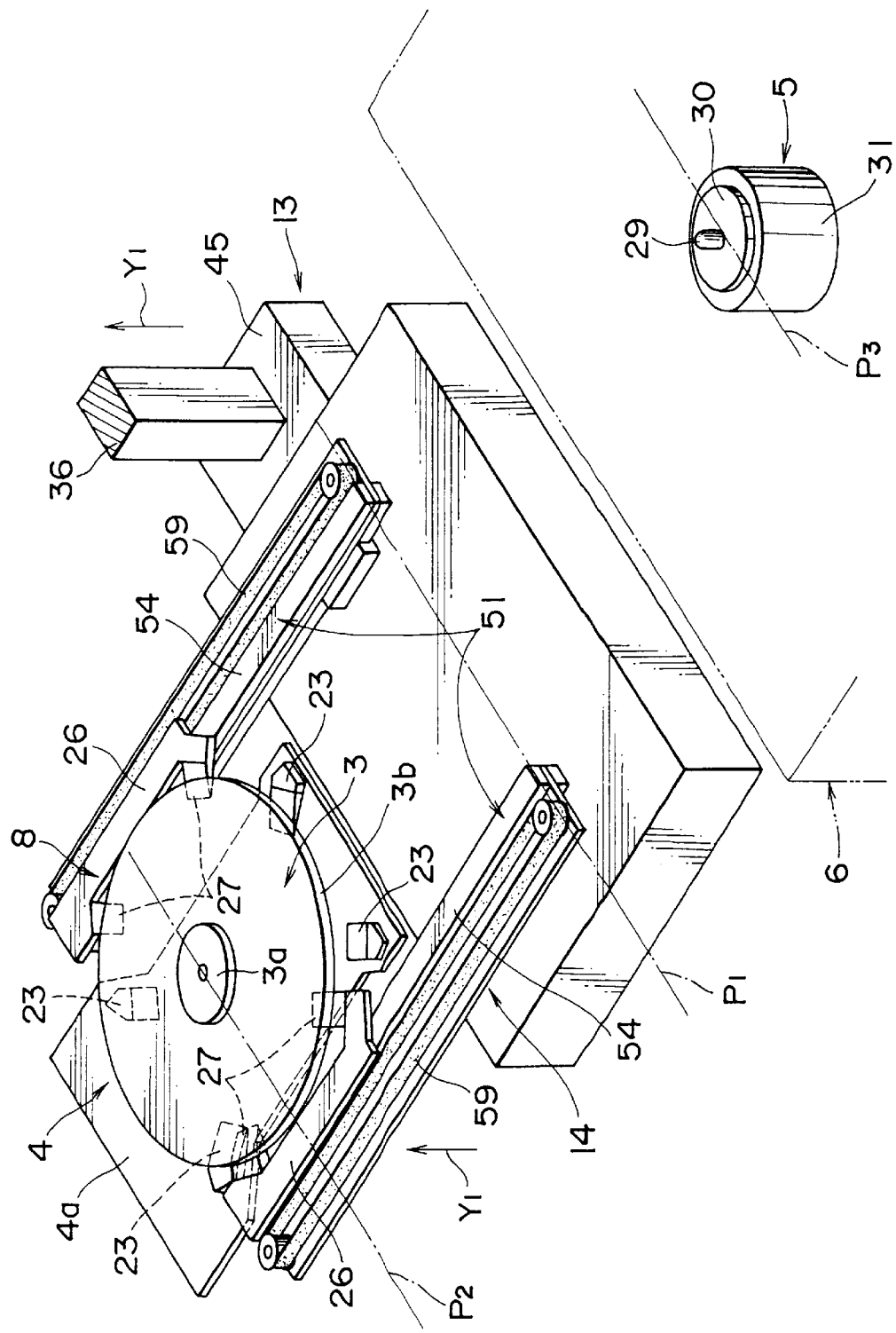
FIG. 3 is a perspective view for illustrating the operation for taking out a disc from a disc rack board by the hand on the carrier following to FIG. 2.

Then as illustrated in FIG. 3, the carrier 9 is lifted vertically in Y1 direction by a certain distance by the carrier moving mechanism 13, and the hand 8 with the carrier 9 is lifted vertically from the lower position to the upper position of the disc rack board 4 passing through a pair of cut-out 22. In this case, the periphery 3b of a disc is supported by the total four disc holders 27 at both Z1 side and Z2 side, and a disc 3 is lifted up in Y1 direction apart from the total four disc supports 23 of the disc rack board 4.

Figure 4:
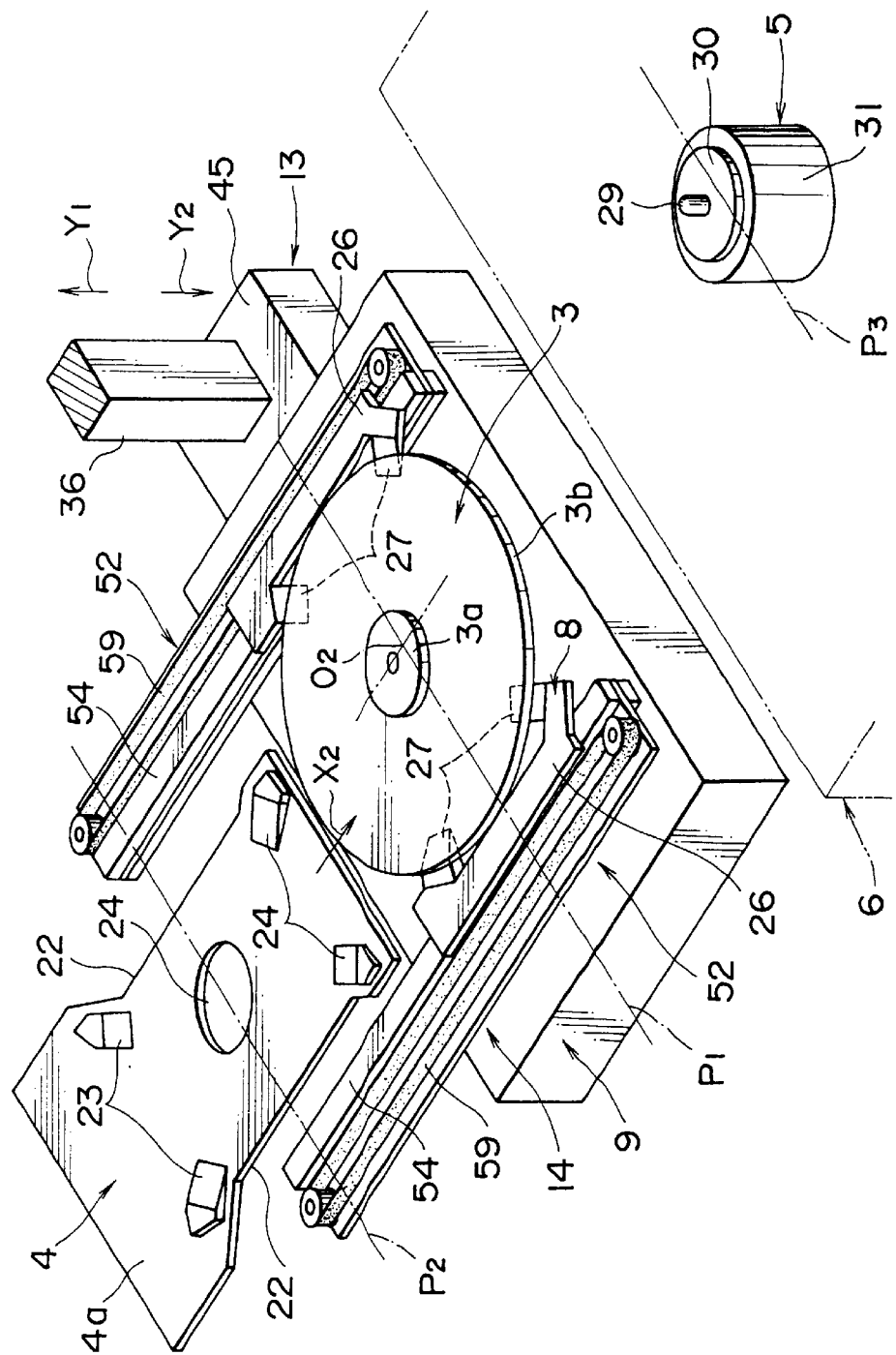
FIG. 4 is a perspective view for illustrating the ending of the operation for taking out from a disc rack board to the carrier by the hand on the carrier following to FIG. 3.
Figure 10:
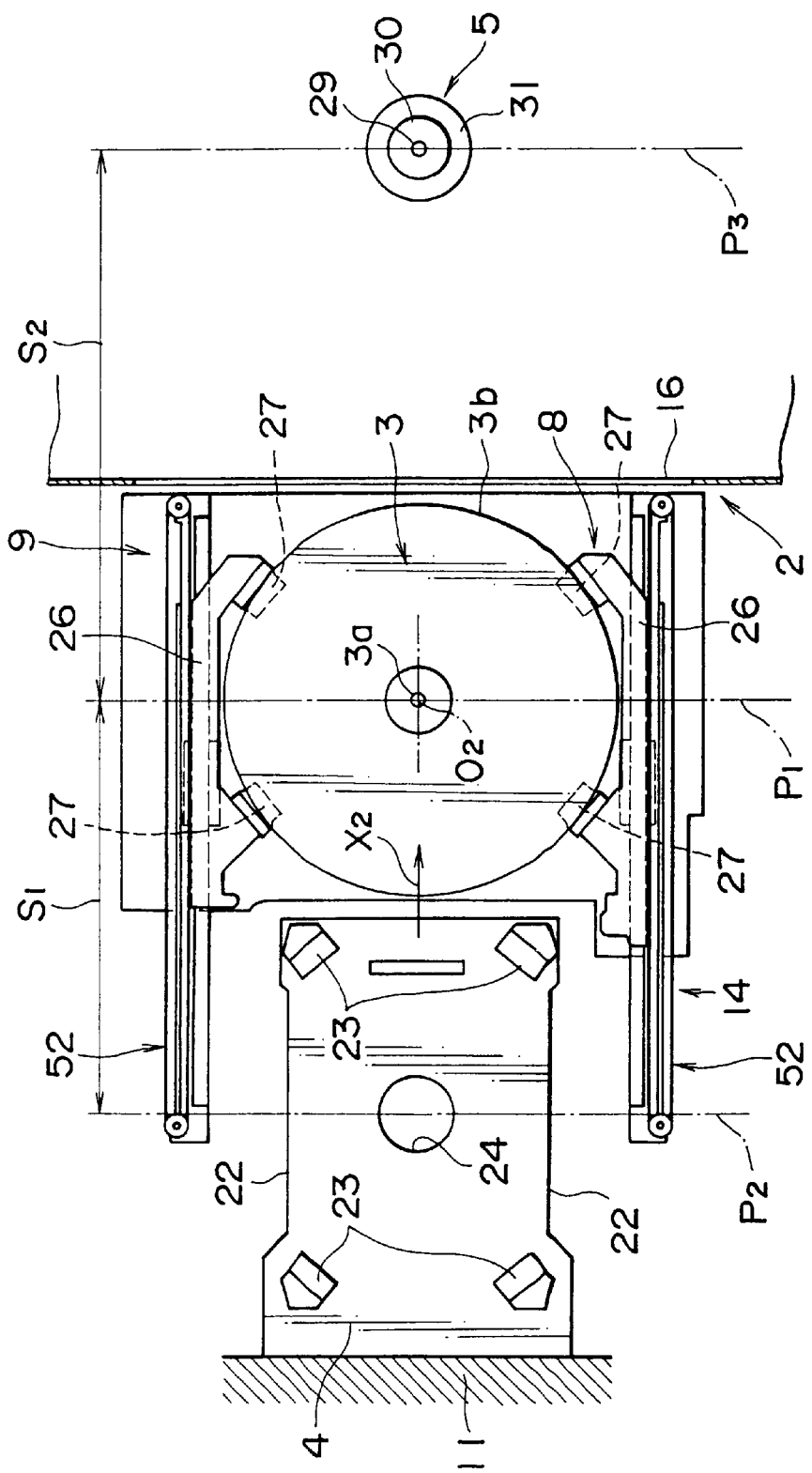
FIG. 10 is a top view of FIG. 4.

As illustrated in FIG. 4 and FIG. 10, the hand 8 is moved in X2 direction to the origin P1 in the carrier 9 by the hand moving mechanism 14, a disc 3 is taken out in the arrow X1 direction from the disc rack board 4 to the internal area of the carrier 9.

The carrier 9 is moved in vertical Y1 and Y2 directions by the carrier moving mechanism 13, a disc 3 is transferred vertically in Y1 and Y2 directions to a position in front of a specified disc drive 6 by the carrier 9, and the carrier 9 is stopped at the position in front of the specified disc drive 9.

Figure 5:
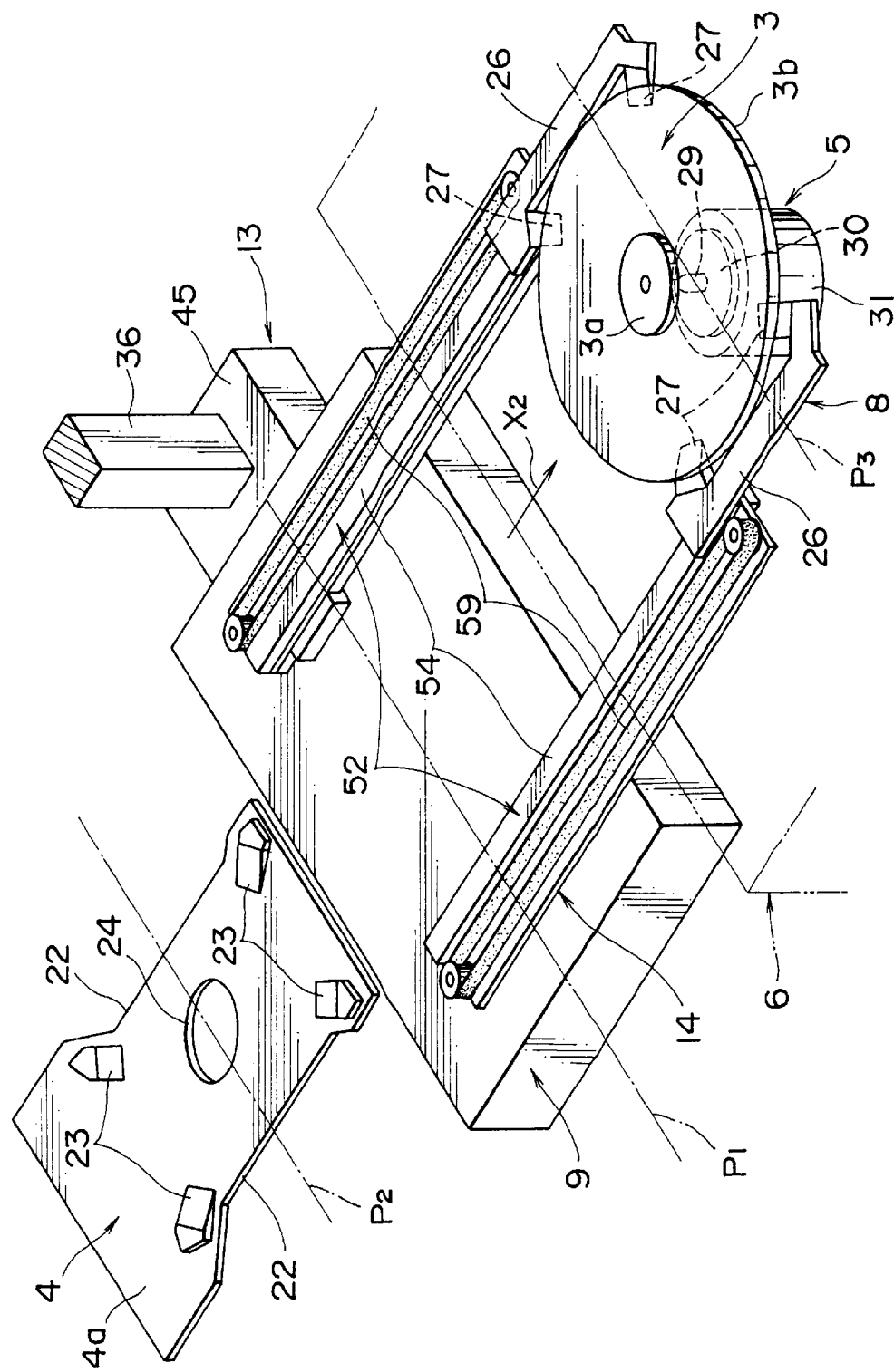
FIG. 5 is a perspective view for illustrating the operation for placing a disc in a disc drive by the hand on the carrier following to FIG. 4.
Figure 11:
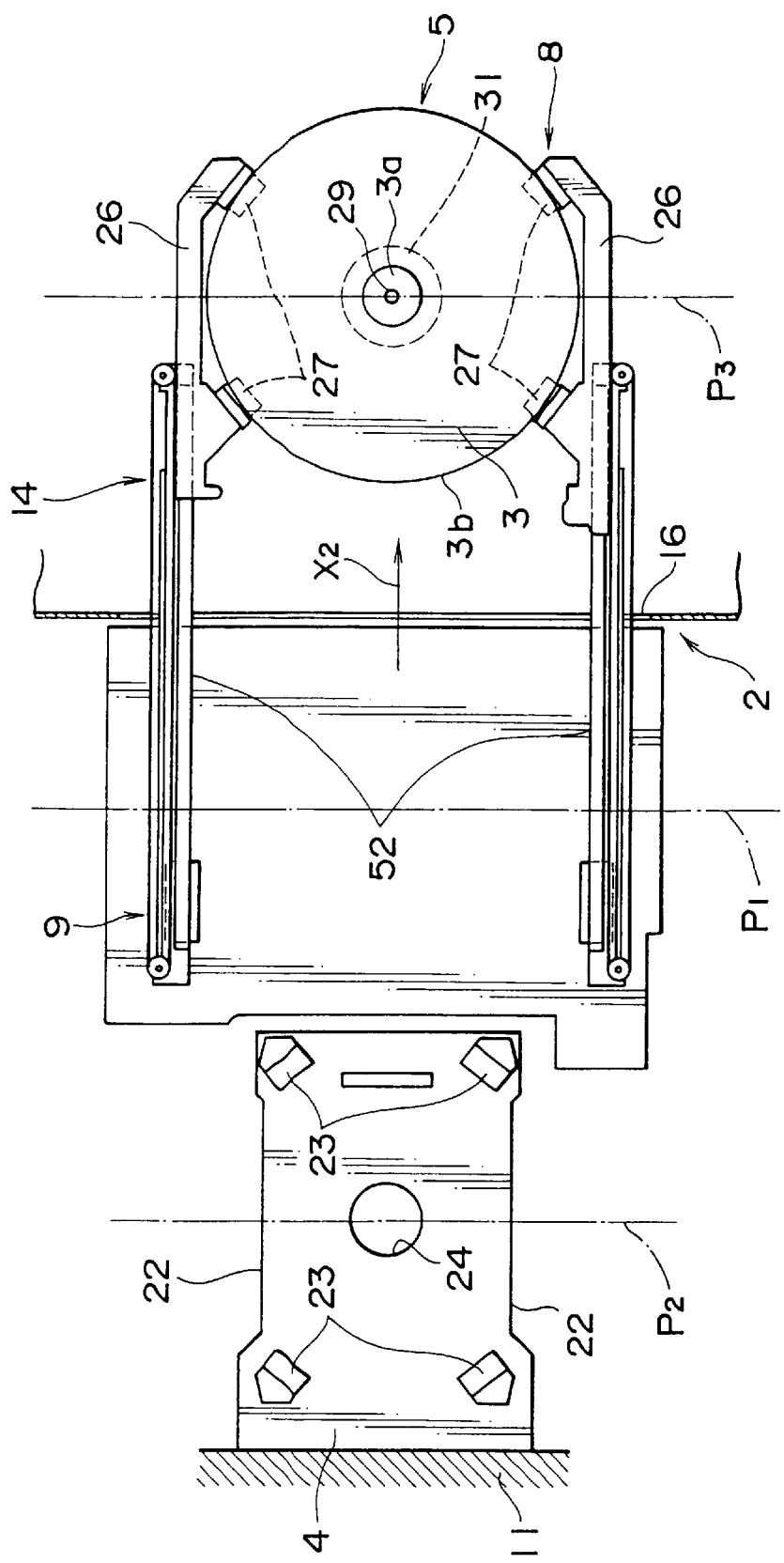
FIG. 11 is a top view of each of FIG. 5 and FIG. 6.

As illustrated in FIG. 5 and FIG. 11, the hand 8 is moved horizontally in X2 direction to the recorder and/or regenerator position P3 in the disc drive 6 by the hand moving mechanism 14, the disc 3 is withdrawn horizontally to the withdrawing position P3 of the disc drive 6 above the spindle 29 and disc table 30 of the recorder and/or regenerator 5 in the specified disc drive 6 by the hand 8.

Figure 6:
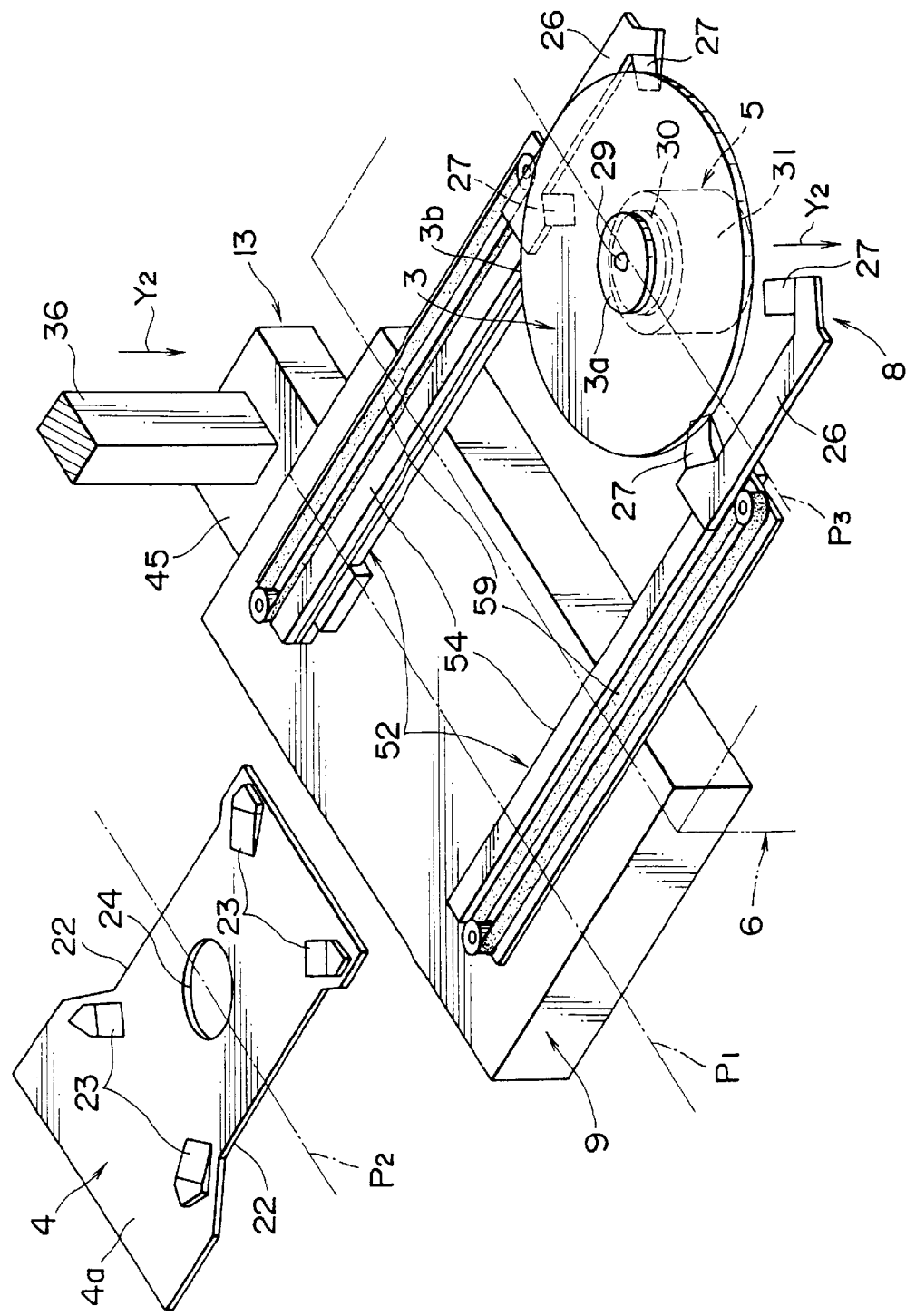
FIG. 6 is a perspective view for illustrating the operation for placing a disc in a disc drive by the hand on the carrier following to FIG. 5.

As illustrated in FIG. 6, the carrier 9 is descended by a certain distance vertically in Y2 direction by the carrier moving mechanism 13, the hand 8 and disc 3 with the carrier 9 are descended vertically in Y2 direction. In this case, the disc 3 is loaded vertically from the above on the spindle 29 and disc table 30 by the center core 3a, and the disc 3 is chucked flat to the spindle 29 and disc table 30. The total four disc holders 27 of the hand 8 is moved down apart from the disc 3.

Figure 12:
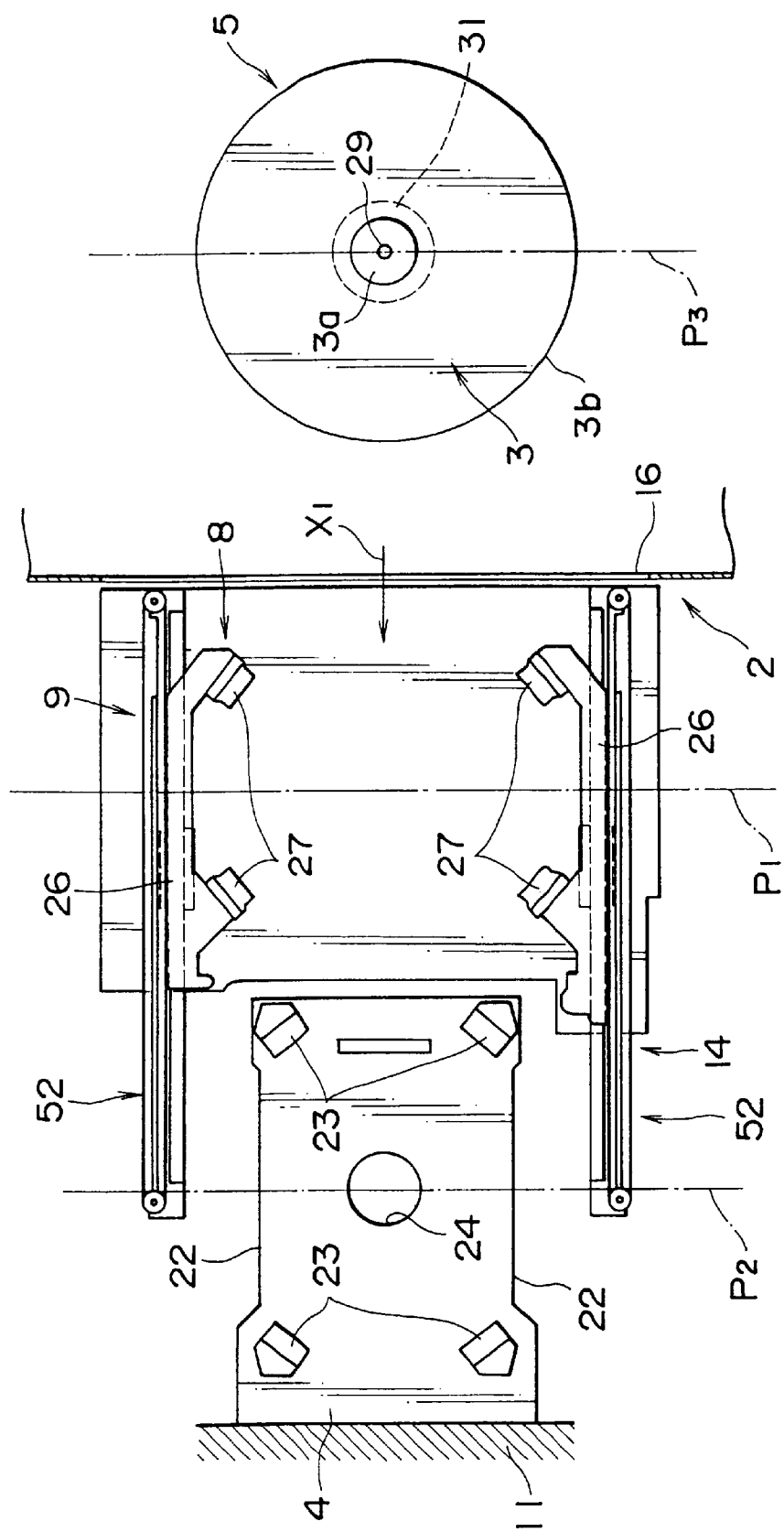
FIG. 12 is a top view of FIG. 7.
Figure 13:
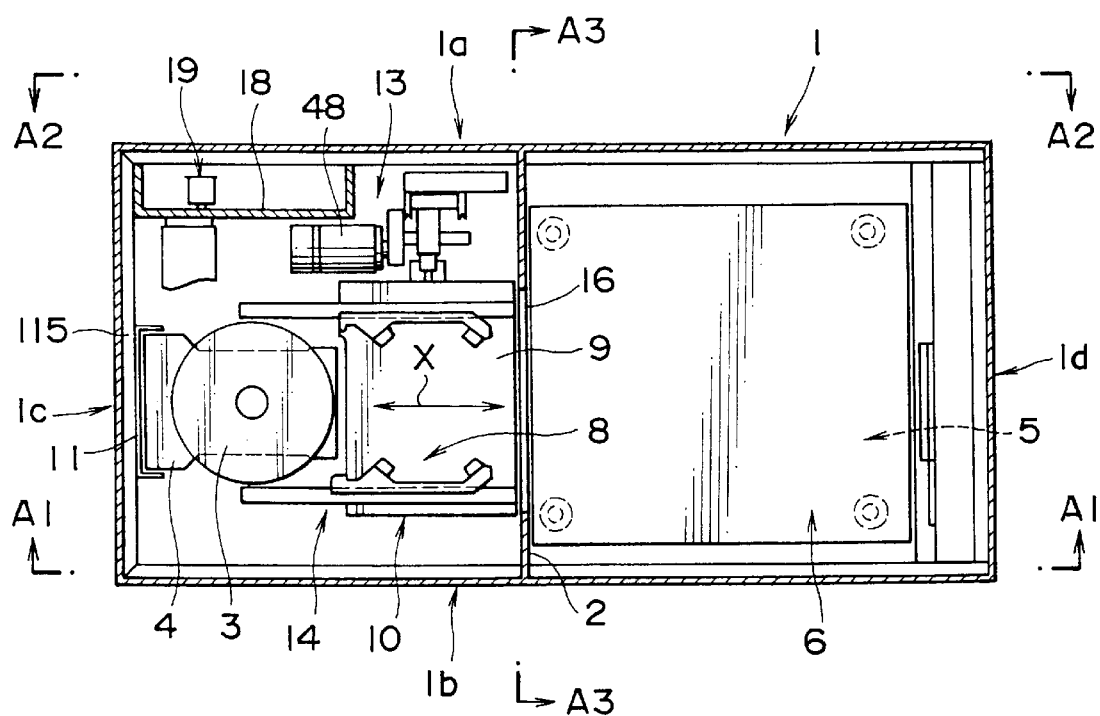
FIG. 13 is a partially cutaway top view of a whole disc changer.

As illustrated in FIG. 12, the hand 8 is withdrawn horizontally in X1 direction to the origin P1 in the carrier 9 by the hand moving mechanism 14, thus a series of disc transferring operations from a disc rack board 4 to a disc drive 6 is completed.

Figure 7:
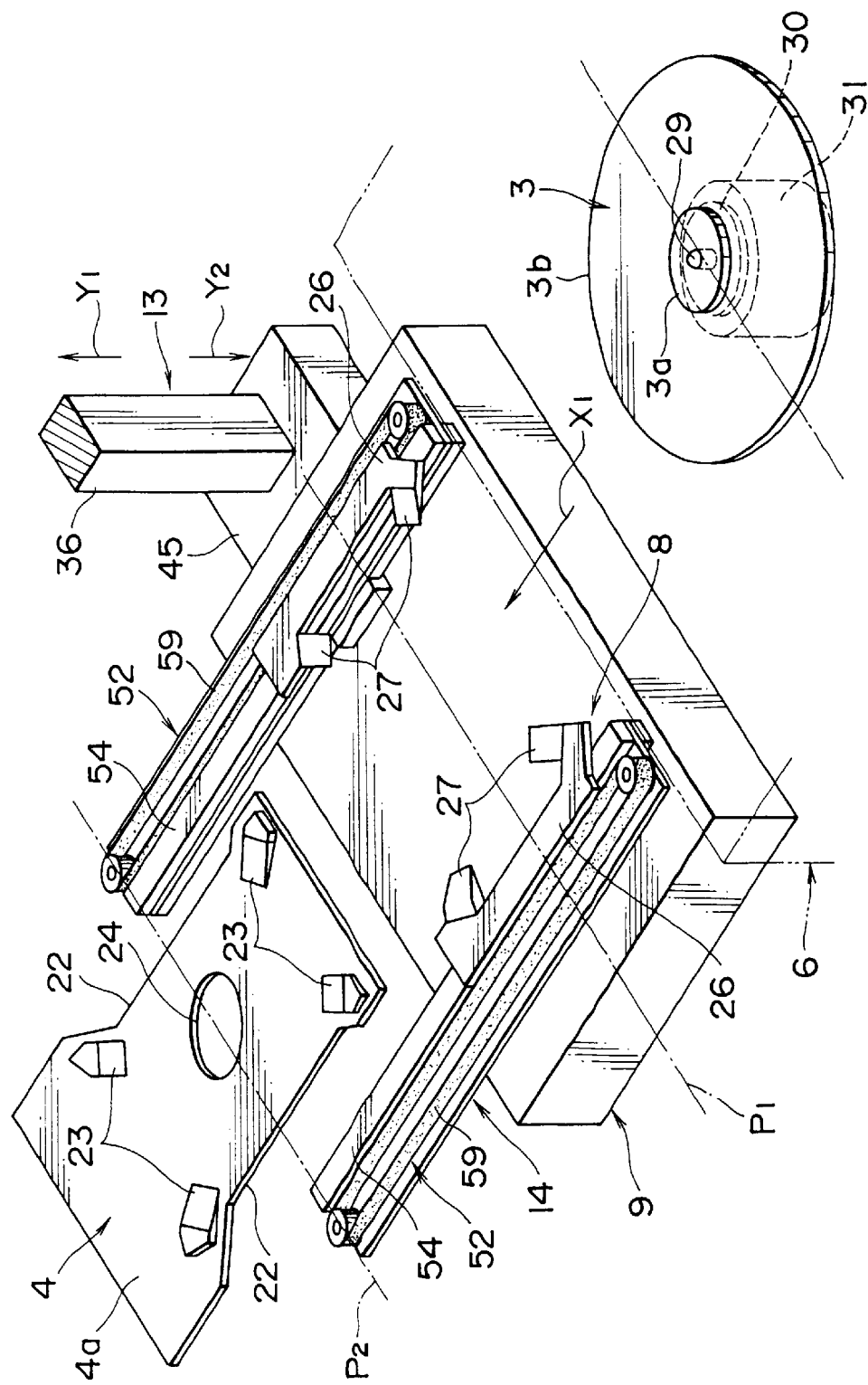
FIG. 7 is a perspective view for illustrating the ending of the operation for placing a disc in a disc drive by the hand on the carrier following to FIG. 6.

After the disc loading, as illustrated in FIG. 7 and FIG. 12, in the recorder and/or regenerator 5 of the disc drive 6, the disc 3 with the spindle 29 and disc table 30 is rotated by the spindle motor 21, and recording and/or regeneration of the disc 3 is operated by an optical pickup or external magnetic head as required (both are not shown in figures).

The operation to return a disc 3 in a disc drive 6 to an original disc rack board 4 after finishing of recording and/or regeneration is a reversed operation of above described loading operation. The transferring of a disc between the disc-in-out port 7 and a disc rack board 4 is operated in the same manner as the transferring operation for a disc drive 6.

When transferring a disc using the disc changer described above in which both sides of the periphery of a disc 3 is supported by total four disc holders 27 of a hand 8, and a disc 3 is transferred between a disc rack board 4 and a carrier 9, and between a carrier 9 and a disc-in-out port 7, the recording surface of the disc 3 will not be soiled and damaged.

For transferring of a disc 3, the disc 3 is supported on disc supports 23 of a disc rack board 4 and total four disc holders 27 alternately at the periphery 3b of the disc 3 on both X1 and X2 sides and on both Z1 and Z2 sides which are perpendicular each other, therefore, a disc 3 is transferred smoothly.

For transferring a disc 3 in X1 and X2 directions between a carrier 9 and a disc rack board 4 and between a carrier 9 and a disc drive 6, the hand 8 supports the periphery 3b of a disc 3 at both sides in Z1 and Z2 directions perpendicular to the moving direction (X1 and X2 directions) of the hand 8, therefore, transferring operation of a disc 3 between the origin P1 and withdrawing points P2 and P3 of a disc rack board 4 and disc drive 6 respectively is operated easily without withdrawing the hand 8 to the deeper position in X1 and X2 directions into a disc rack board 4 and disc drive 6. Therefore, transferring of a disc 3 between a carrier 9 and a disc rack board 4 and disc drive 6 is operated stably and quickly with sufficiently reduced withdrawing distances S1 and S2 from a carrier 9 to disc rack board 4 and disc drive 6.

For transferring operation of a disc 3 in X1 and X2 directions between a carrier 9 and a disc rack board 3 and between a carrier 9 and a disc drive 6, a hand 8 supports the periphery 3b of a disc 3 on both Z1 side and Z2 side in the direction perpendicular to the moving direction (X1 and X2 directions) of the hand 8, therefore, when a disc 3 is withdrawn in X2 direction from a disc rack board 4 on the one side of the carrier 9 and then the disc 3 is delivered in X2 direction from another side of the carrier 9 to a disc drive 6, the disc 3 taken out in X2 direction form a disc rack board 4 is delivered quickly in X2 direction from the carrier 9 to a disc drive 6 without changing the moving direction and without passing the disc 3 on the carrier 9. Therefore, the transferring operational time of a disc 3 between a disc rack board 4 and a disc drive 6 through a carrier 9 is significantly shortened.

Description of the Closed Area in a Changer Body

Figure 17:
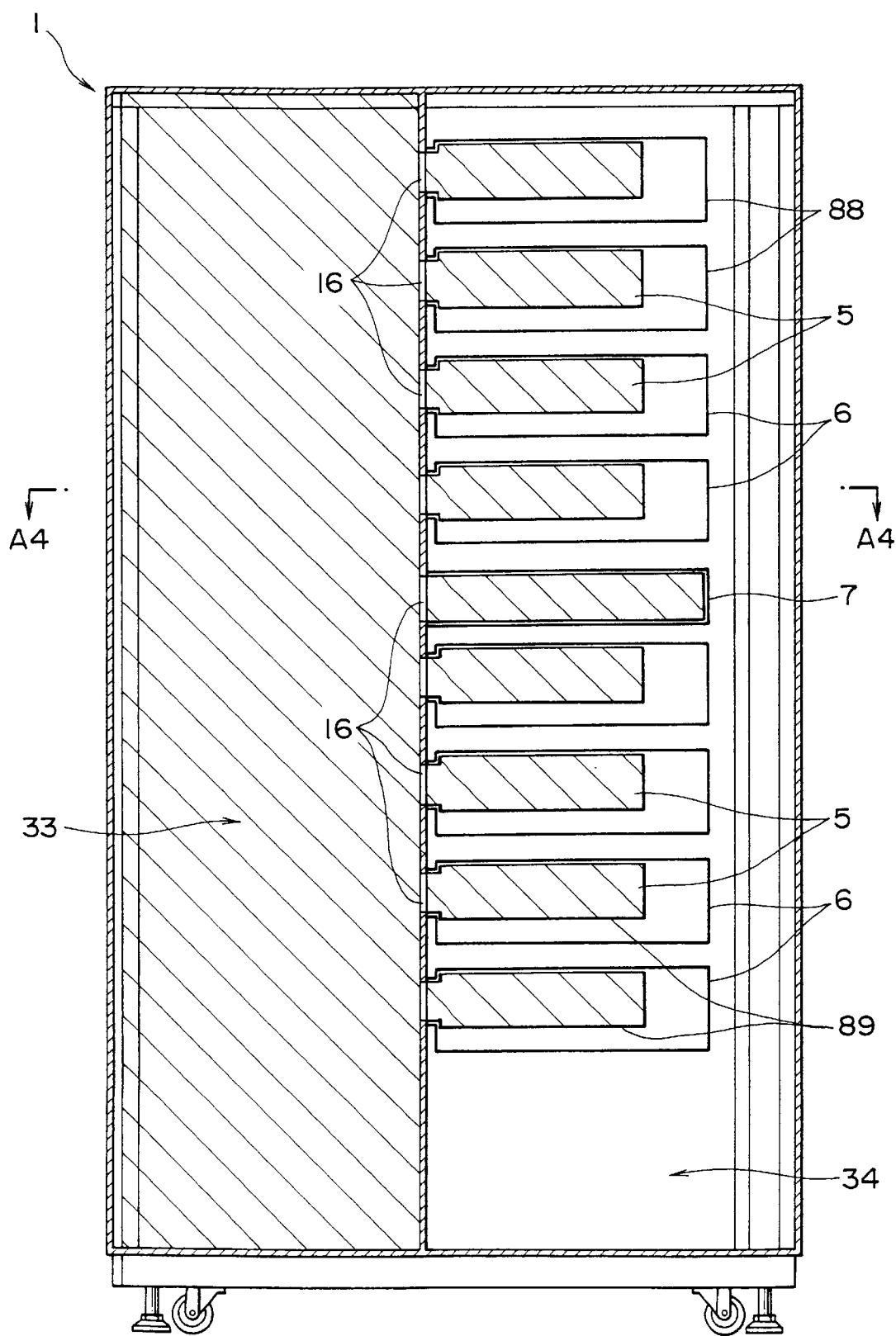
FIG. 17 is a partially cutaway rear elevation view similar to FIG. 13 for illustrating the sealed area and unsealed area in the disc changer.
Figure 18:
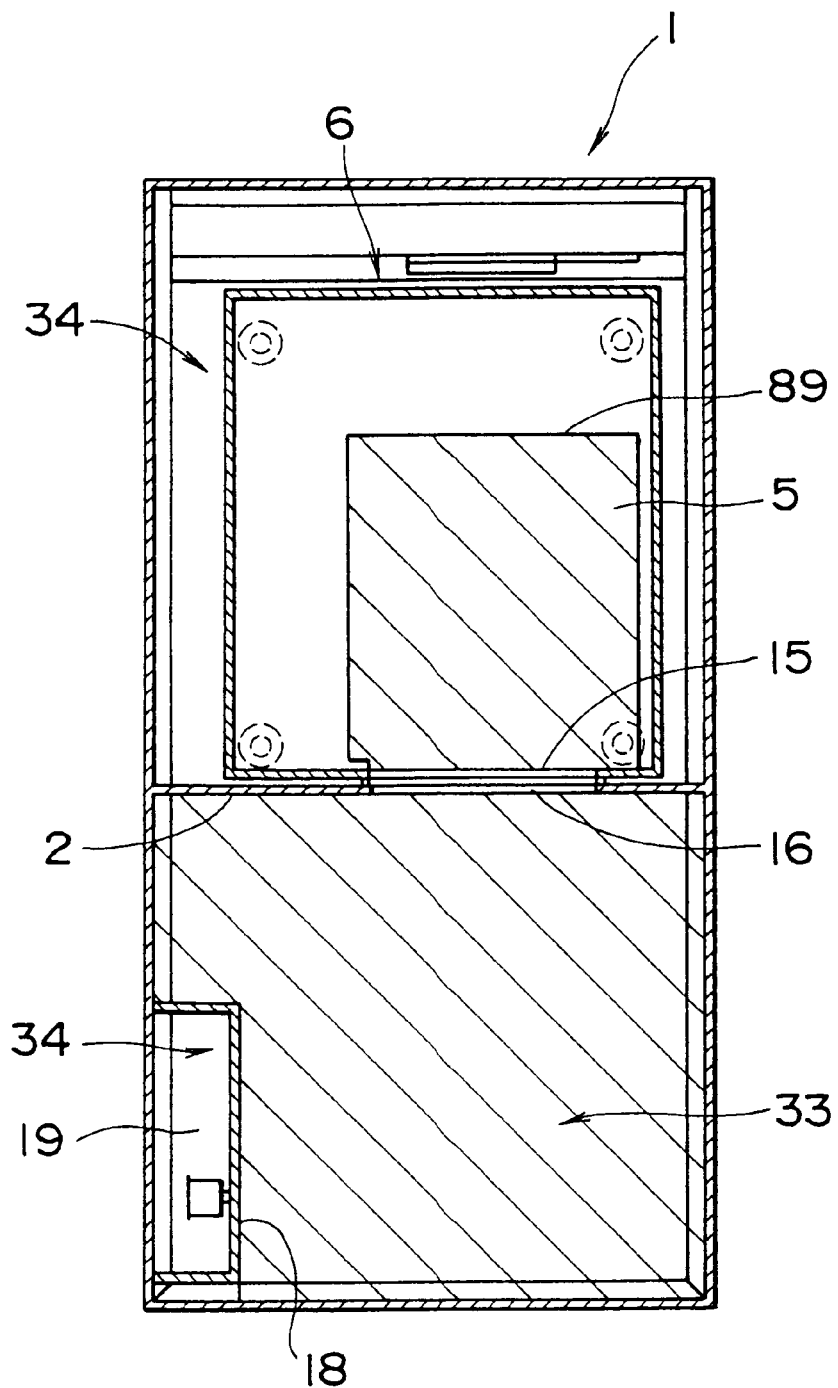
FIG. 18 is a top view taken on line A4—A4 of FIG. 17 for illustrating the sealed area and unsealed area in the disc changer.

The closed area and unclosed area formed in the changer body 1 are described referring to FIG. 17 and FIG. 18.

Disks 3 become dusty easily because bare discs 3 are used in this changer. Therefore, sufficient remediation to dust on discs 3 is required.

For remediation in this disc changer, in the internal of the changer body 1 the shaded area in FIG. 17 and FIG. 18 is completely sealed to form a sealed area 33, and the area other than the sealed area in the internal of the changer body 1 is not sealed to form an unsealed area 34.

In other words, the internal of the changer body 1 is divided to the sealed area 33 and the unsealed area by the partitions 2 and 18. In the sealed area 33 the one hundred step disc rack board 4, carrier 9, and carrier moving mechanism 13 are provided, and in the unsealed area 34 the eight step disc drive 6 and one disc-in-out port 7 are provided. In the unsealed area, main heat generating devices of an amplifier block 19 and interface block 20 are also provided.

As described hereinafter, the internal of recorders and/or regenerators 5 and the internal of the disc-in-out port 7 contained in the eight step disc drive 6 are structured to form sealed containers, and disc gates 15 are connected air-tightly to connecting gates 16 on the spacing 2 through dust-proof members. The tray gate 15 of the disc-in-out port 7 is also structured to form an air-tight sealed container with the same dust-proof member, and the penetration of dust into the sealed area 33 from the outside is prevented completely.

Therefore in this disc changer, all discs 3 charged from the disc-in-out port 7 to the internal of the changer body 1 is contained in the sealed area 33, and in the sealed area 33 the above described automatic changing of a disc 3 and recording and/or regeneration are operated.

Therefore, dust on the recording side of a disc 3 is eliminated completely, and malfunctions such as output decrease due to spacing loss are prevented to occur, thus a disc changer which provides high performance in recording and/or regenerating of a disc 3 is provided.

If, in the sealed area 33 in the internal of the changer body, main heat generating devices such as an amplifier block 19 and interface block 20 are contained, the temperature in the internal of the sealed area rises.

Main heat generating devices are contained in the unsealed area 34 of the changer body 1 to prevent the temperature rising in the internal of the sealed area 33, and the main heat generating devices in the unsealed area 34 are air-cooled using a fan, when, the fan does not cause the diffusion of dust in the sealed area 33, thus this structure not only prevents dust but also provides effective air-cooling of main heat generating devices.

Figure 19:
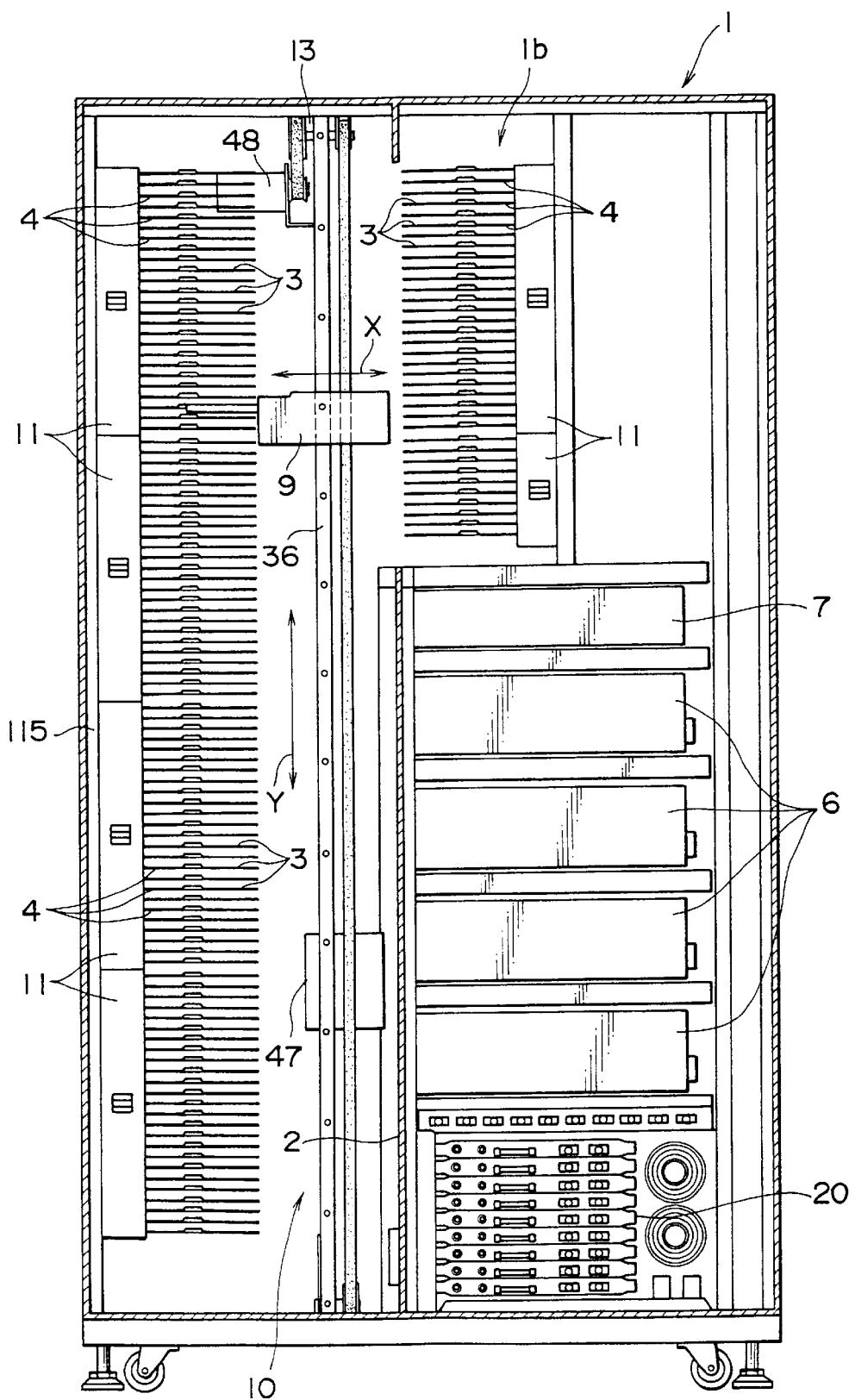
FIG. 19 is a partially cutaway rear elevation view for describing the first modification in arrangement of disc rack boards and disc drives of the disc changer.
Figure 20:
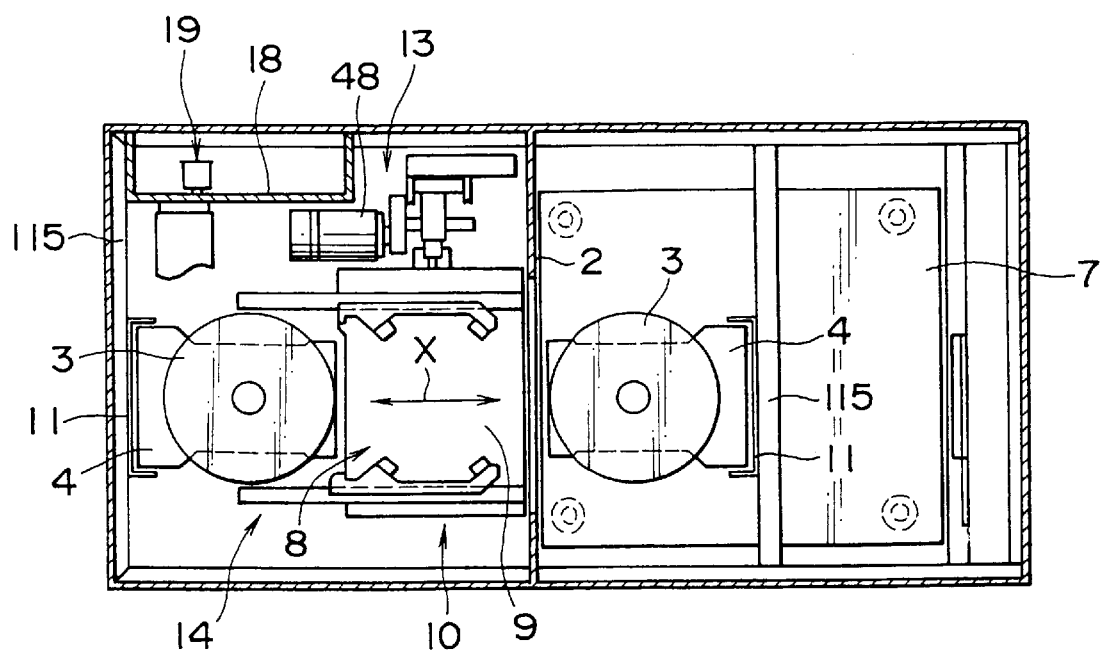
FIG. 20 is a partially cutaway top view of FIG. 19.

Description of the First Modification of Layout of the Disc Rack and Disc Drives As illustrated in FIG. 19 and FIG. 20, for structuring this modified changer, the eight step disc drives 6 are removed partially, for example, a plurality of vertical steps of disc rack boards 4 is provided above (or under) a plurality of vertical steps of disc drives 6 in the position facing to the one hundred step disc rack boards 4, and thus the capacity for containing the disc 3 can be increased.

Description of the Second Modification of Layout of a Disc Rack and Disc Drives

Figure 21:
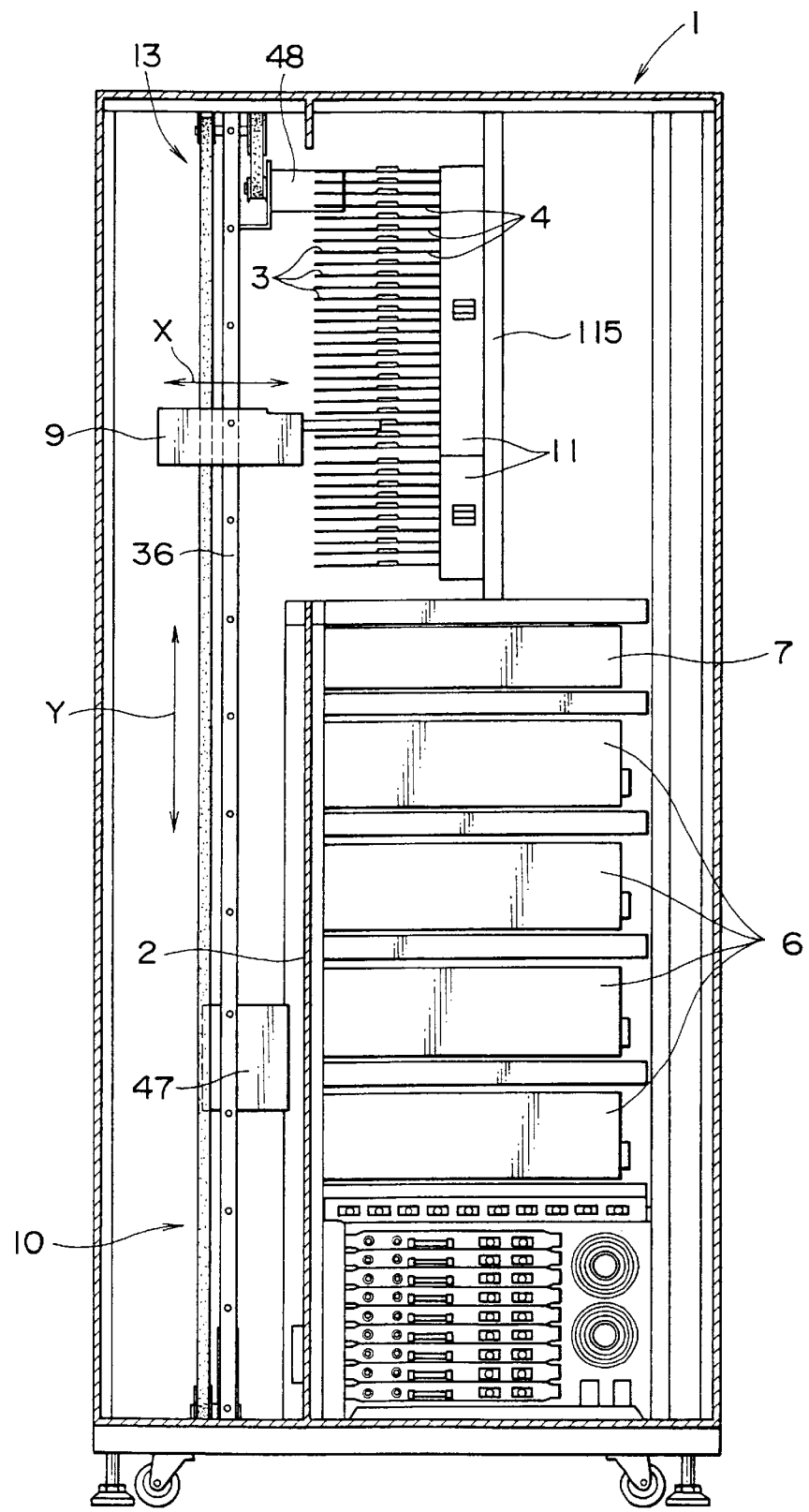
FIG. 21 is a partially cutaway rear elevation view for describing the second modification in arrangement of disc rack boards and disc drives of the disc changer.
Figure 22:
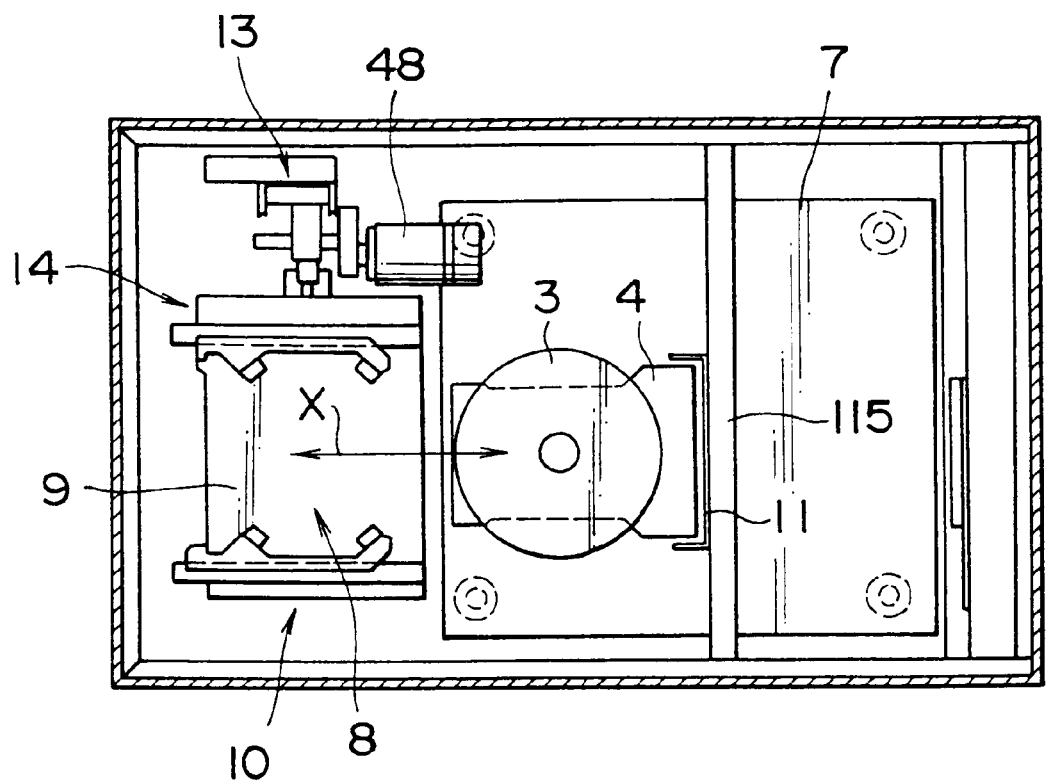
FIG. 22 is a partially cutaway top view of FIG. 21.

As illustrated in FIG. 21 and FIG. 22, for structuring this modified changer, a plurality of vertical steps of disc rack boards 4, a plurality of vertical steps of disc drives 6, and one disc-in-out port 7 are provided vertically on one side of the travelling passage 10 of the carrier, and thus the disc changer is minimized in size.

Description of the Carrier Moving Mechanism

Figure 23:
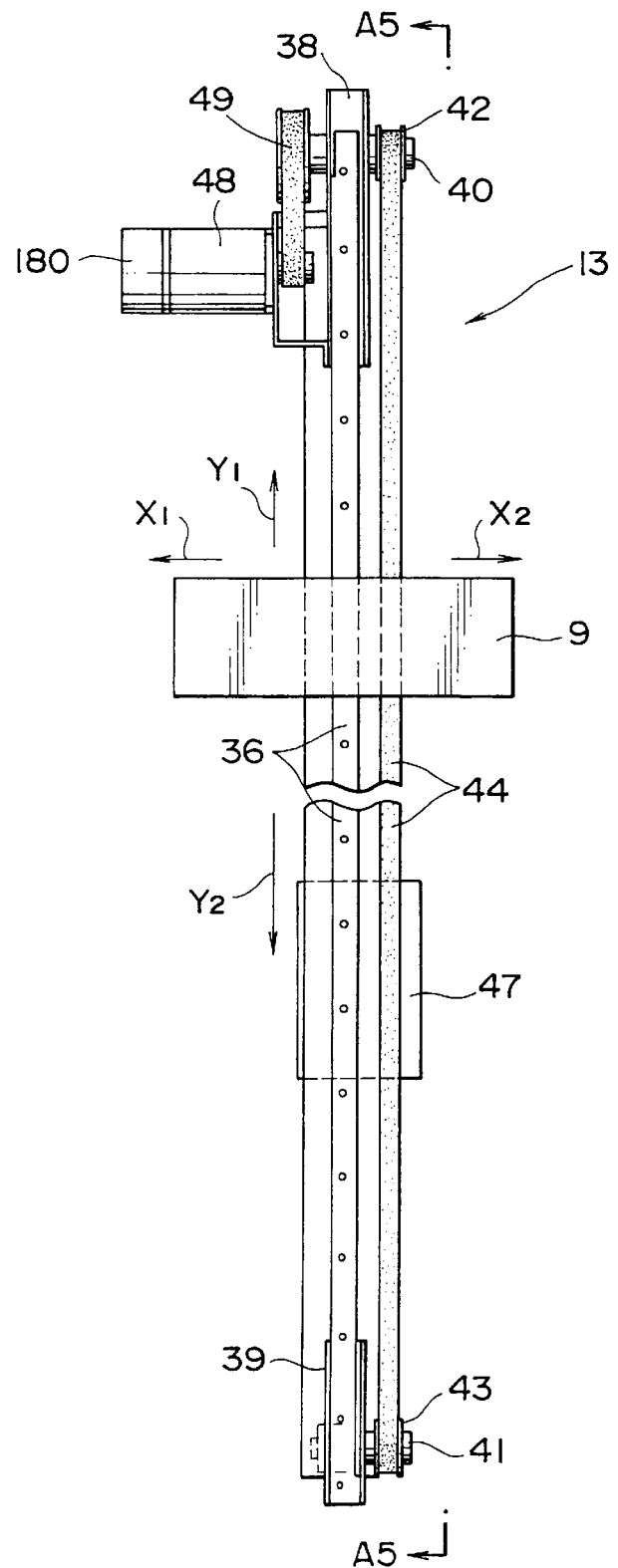
FIG. 23 is a rear elevation view for illustrating the carrier mechanism.
Figure 24:
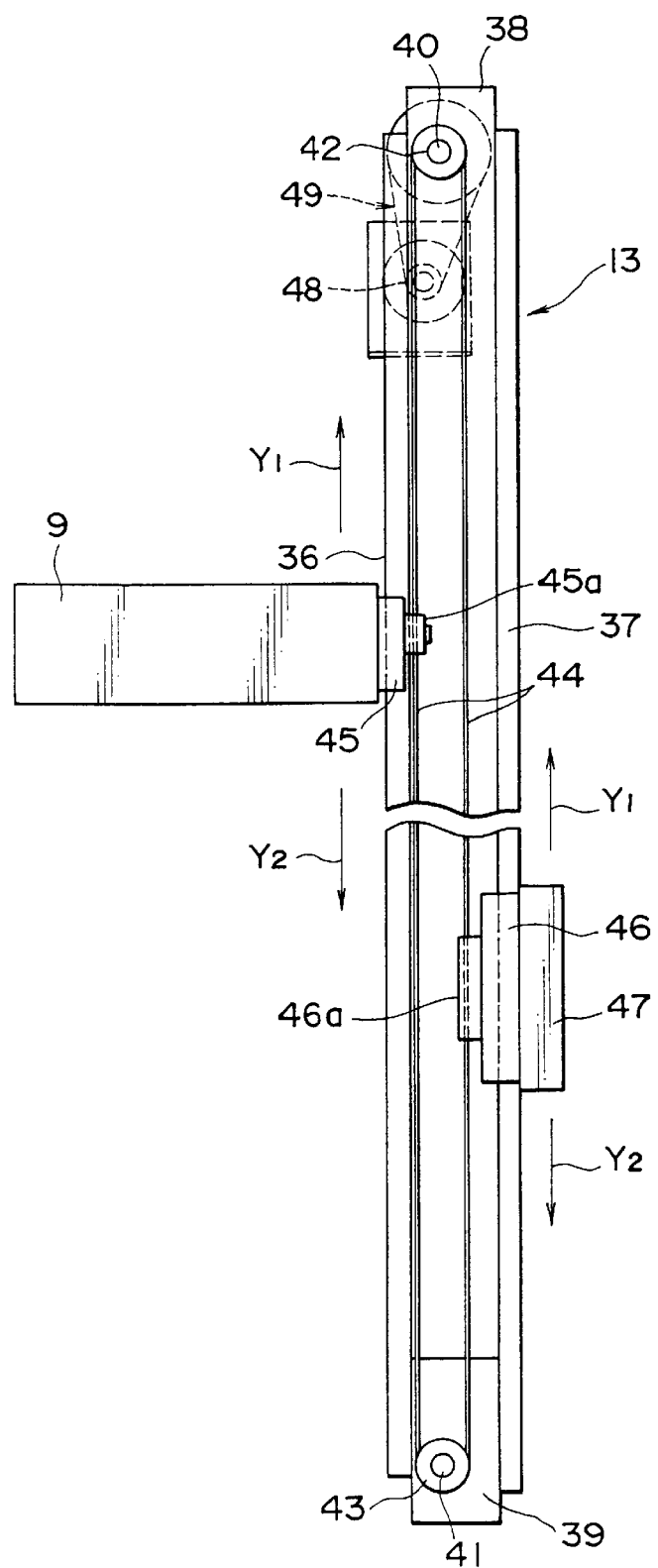
FIG. 24 is a side view taken on line A5—A5 of FIG. 23.

The carrier moving mechanism 13 for moving the carrier 9 vertically in Y direction along the vertical travelling passage 10 referring to FIG. 23 and FIG. 24.

This carrier moving passage 13 has a structure in which a pair of vertical parallel guide rails 36 and 37 is connected solidly at both top and bottom ends using a pair of top and bottom brackets 38 and 39, and this structure is contained vertically in the changer body 1. A pair of top timing pulley 42 and bottom timing pulley 43 is mounted rotatably with interposition of pulley shafts 40 and 41 respectively on the pair of top bracket 38 and bottom bracket 39, between the pair of timing pulleys 42 and 43 single timing belt 44 is hung and tightened, and a pair of sliders 45 and 46 engaged slidably in Y1 and Y2 directions along the pair of guide rail 36 and 37 is fixed to both hanging sides of the timing belt 44.

On one slider 45 a carrier 9 is fixed in cantilevered structure, and on another slider 46 a counter 47 is fixed. Using a motor 49 mounted on the side face of the top bracket 38, the top timing pulley 40 is driven clockwise and counterclockwise in FIG. 24 with speed reduction with interposition of a belt mechanism 50 which uses a timing belt, thereby the timing belt 44 is rotated clockwise and counterclockwise in Y1 and Y2 directions. he timing belt 44 moves slidably in Y1 and Y2 directions the pair of sliders 45 and 46 reversely along the pair of guide rails 36 and 37, and the carrier 9 is moved linearly in high speed in Y1 and Y2 directions along one guide rail 36 under weight-balanced condition between the carrier 9 and the counter weight 47.

Description of Hand Moving Mechanism

Figure 25:
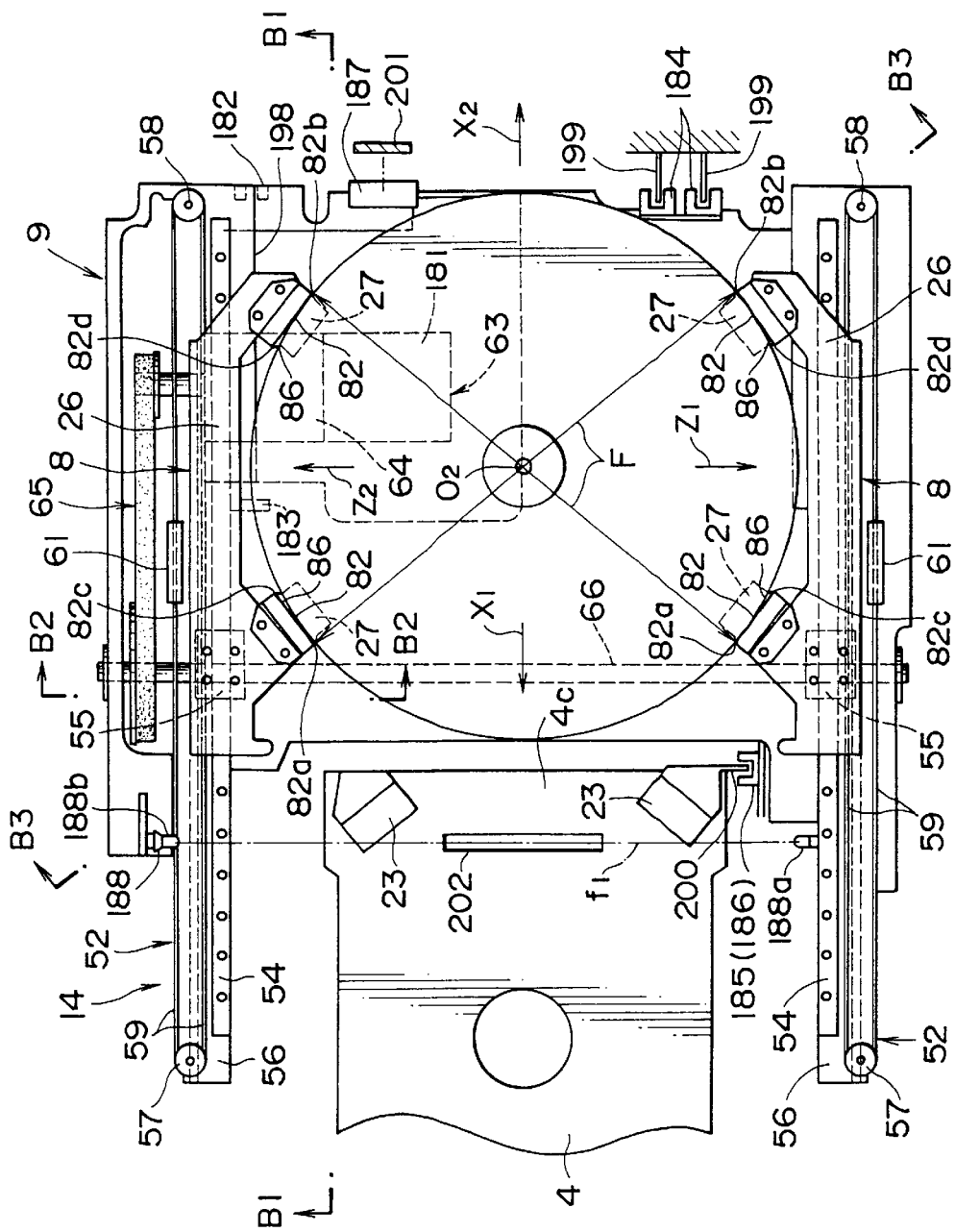
FIG. 25 is a top view for illustrating the hand moving mechanism on the carrier.
Figure 26:
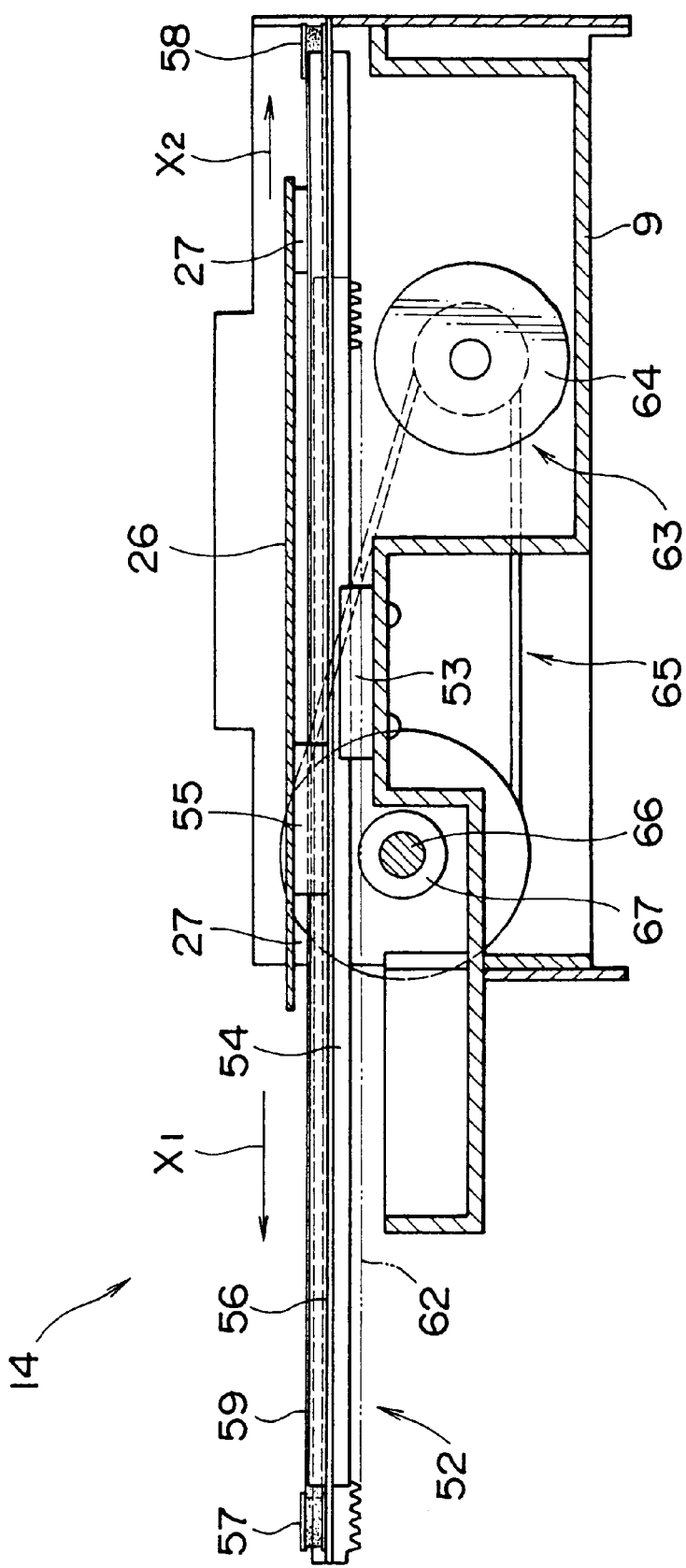
FIG. 26 is a partially cutaway side view taken on line B1—B1 of FIG. 25.
Figure 27:
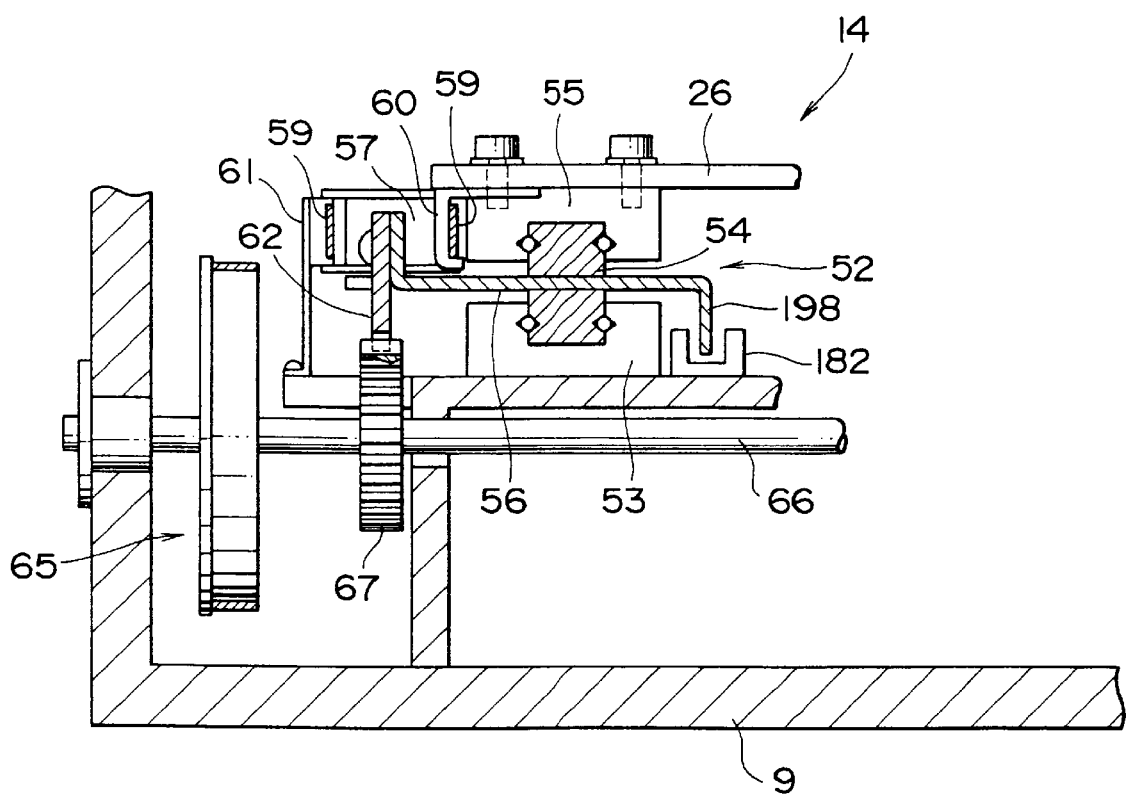
FIG. 27 is a cross-sectional view taken on line B2—B2 of FIG. 25.
Figure 28A:
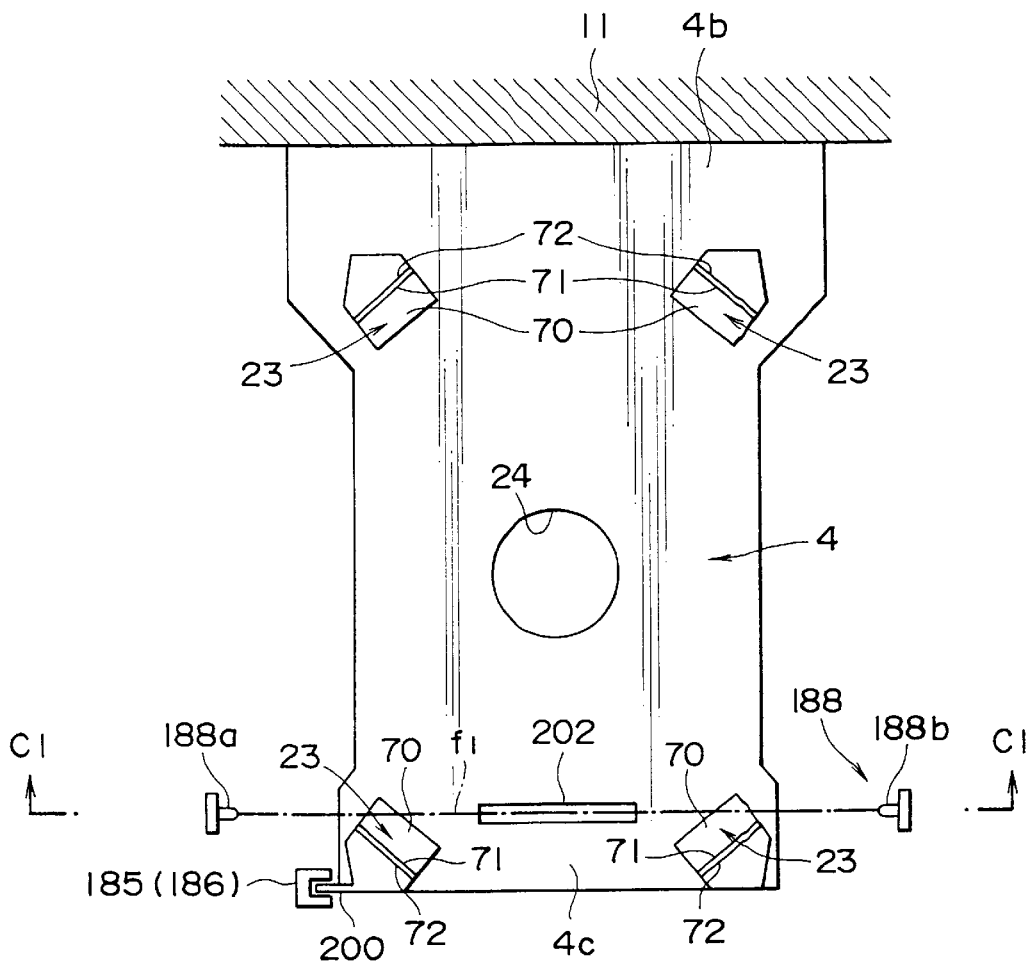
FIG. 28A is a top view of the disc detecting mechanism on a disc rack board when there is no disc.
Figure 28B:
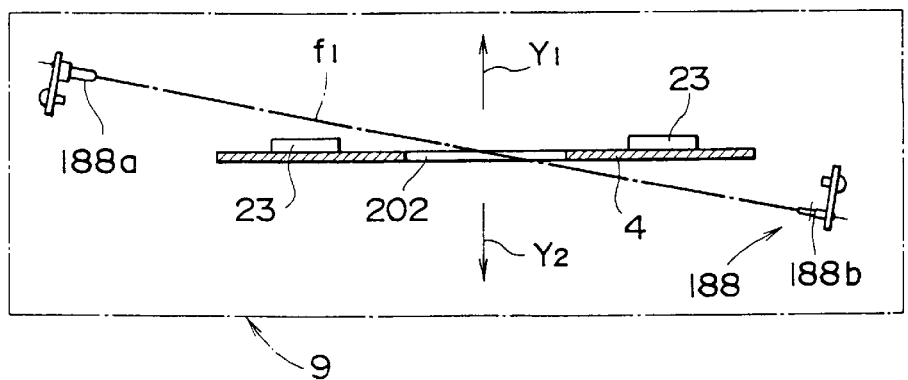
FIG. 28B is a cross-sectional view taken on line C1—C1 of FIG. 28A.

A hand moving mechanism 14 which moves a hand in X direction on the carrier 9 is described referring to FIG. 25 to FIG. 27.

A hand moving mechanism 14 is provided with a pair of slide units 52, which is a linearly sliding moving mechanism for sliding a pair of hand main members 26 synchronously in X1 and X2 directions, the each other, and the slide units 52 are mounted above the carrier 9 at the ends in Z1 and Z2 directions, with interposition of a distance C larger than the diameter B of a disc 3, in parallel to X1 and X2 directions, and horizontally.

The pair of slide units 52 is formed symmetrically each other, and the pair of slide units 52 is provided with slide bases 53 fixed flat on the carrier 9, slide rails 54 which slide horizontally in X1 and X2 directions on the slide bases 53, and a slide guide 55 which slides horizontally in X1 and X2 directions on the slide rails 54. On the slide guide, the hand main members 26 is fixed flat symmetrically.

The pair of slide unit 52 is provided with flat slide plates 56 combined firmly with slide rails 54, a pair of vertical timing pulleys 57 and 58 mounted rotatably on the top of both ends of the slide plates 56 in X1 and X2 directions, and timing belts 59 provided horizontally between the pair of timing pulleys 57 and 58. The timing belts 59 are fixed to the carrier 9 and the hand main members 26 at two points on the outside and inside of the timing belts 59 using a pair of clasps 60 and 61.

The pair of slide units is mounted vertically under the slide plates 56, and provided with racks 62 which are formed in parallel to X1 and X2 directions.

On the hand moving mechanism 14, a driving unit 63 which is mounted on the carrier and drives the pair of racks of the pair of slide units 52 synchronously each other in X1 and X2 directions is provided. The driving unit 63 is provided with a single driving shaft 66, which is provided horizontally in perpendicular to the pair of racks 62 driven rotatably clockwise and counterclockwise with speed reduction by a motor 64 with interposition of a belt driving mechanism 65 using a timing belt, and a pair of pinions 67, which is fixed on both ends of the driving shaft and drives the pair of racks 62 in X1 and X2 directions.

In the hand moving mechanism 14, when the motor 64 of the driving unit 63 drives rotationally in clockwise or counterclockwise in FIG. 26 with speed reduction with interposition of the belt driving mechanism 65, the pair of pinions 67 is driven rotationally clockwise or counterclockwise with the driving shaft 66, and drives the pair of racks 62 of the pair of slide units 52 synchronously in X1 and X2 directions each other.

Then, the pair of slide rails 54 with the pair of racks 62 is slid synchronously in X1 and X2 directions each other on the pair of slide bases 53, and the pair of timing belts 59 are driven rotationally in reverse direction each other between a pair of timing pulleys 57 and 58 respectively while the pair of timing belts 59 fixed on the carrier 9 at the outside portions of the belts 59 with clasps 60 is being slid synchronously in X1 and X2 directions each other with the pair of slide rails 54.

Then, the pair of hand main members 26, which is fixed with a clasp 61 on the inside of the pair of timing belts 59, is slid synchronously in X1 and Y1 directions each other on the pair of slide rails 54 by the pair of slide guide 55.

In this case, the pair of hand main members 26 is moved at a speed double of moving speed of the pair of slide rails 54 in the same direction as the pair of slide rails 54, in other words, moving distance of the hand main members 26 is 2S corresponding to the moving distance S of the pair of slide rails 54.

Therefore, by using the hand moving mechanism 14, the hand 8 having the hand main members 26 can be moved at high speed in linear motion horizontally in X1 and X2 directions to the carrier 9. The pair of hand main members 26 can be moved at a seed double of the moving speed of the pair of slide rails 54, thereby, the moving stroke of the hand 8 in X1 and X2 directions can be designed to be long.

As described hereinbefore, the hand 8 transfers a disc 3 advantageously at high speed in X1 and X2 directions between the carrier 9 and a disc rack board 4 and between the carrier 9 and a disc drive 6 and the disc-in-out port 7, in addition, the hand 8 is adoptable to equipments which have different space in X1 and X2 directions to a travelling passage of a carrier 9.

The hand moving mechanism 14 is structured simple, small-sized, and light-weight, and moreover, the moving stroke of the hand 8 can be designed to be long. Therefore, the whole weight of the carrier 9 can be reduced, and also, the carrier 9 can be moved at high speed in Y1 and Y2 directions by the carrier moving mechanism 13.

Detailed Description of the Disc Supports of a Disc Rack Board 4

The structure of the total four disc supports 23 mounted on a disc rack board 4 is described in detail referring to FIG. 25, and FIG. 28A to FIG. 30A.

The total four disc supports 23 formed of synthetic resin is constituted solidly of a taper section 70 for supporting a disc flat on which section the back side 3b of peripheral edge 3c of a disc is placed from above, a vertical section 71 rising from the periphery of the taper 70, and a disc inducing taper 72 formed on the outer periphery at the top of the vertical section 71.

On the bottom side of each four disc support, a projection 73, nail 74, and positioning pin (not shown in figures) are formed solidly, these four disc supports 23 are mounted from the above at four positions on the disc rack board 4 described already referring to FIG. 1 to FIG. 12.

In this case, the projection 73 of each disc support 23 is engaged in an engaging hole 76 of a disc rack board 4, the nail 74 is fixed in an fixing hole 77 of the disc rack board 4, and the positioning pin is engaged in a positioning hole (not shown in figures) of the disc rack board 4, thus each disc support 23 is structured so as that a disc support 23 is mounted on a disc rack board 4 with simple one touch action.

A taper section 70 for disc supporting of these four disc supports 23 has a configuration that the plane is tapered gradually more gentle toward the center O1. The disc inducing taper section 72 formed on the periphery as required has a configuration that the plane is tapered gradually steeper toward the center O1.

The minimum inside diameter D of the inside of the vertical section 71 formed by the total four disc supports is sufficiently larger than the diameter B of a disc 3, there are slacks E between the minimum inside diameter D and the diameter B of a disc 3.

A disc 3, which is put on flat from the above in Y2 direction on the disc rack board 4 by the hand 8, is inserted in the inside of the vertical sections 71 of the total four disc supports 23, and placed horizontally on the taper sections 70 for disc supporting. There are small clearances 79 between the bottom side 3b of the disc 3 and the upper surface 4a of the disc rack board 4.

In this case, the recording surface 3d formed on the bottom side 3b will not be damaged because the peripheral edge 3c of the bottom side 3b of the disc 3 is placed on the four taper section 70.

The four taper sections 70 function to settle automatically the disc 3 at the center O1 of the total four disc supports 23 under gravitation.

In this case, there are clearances 2E between the minimum inside diameter D inside the vertical section 71 of the total disc supports 23 and the diameter B of a disc 3, therefore, a disc is inserted with sufficient allowance of 2E when the disc 3 is inserted horizontally in Y2 direction to the inside of the vertical sections 71 of the total four disc supports 23 by the hand 8 without happening of collision of a portion of the periphery of the disc 3 against a vertical section 71, thus a disc 3 is placed smoothly and safely on the total four disc supports 23.

Disk inducing taper sections 72 on the outer periphery of the total four disc supports are not necessarily required, and the clearance of a disc rack board 4 can be reduced if the taper section 72 is removed.

Detailed Description of Disc Holder of Hand

Total four disc holders 27 mounted on the inside of the hand main member 26 of the hand 8 are described in detail referring to FIG. 25 and FIG. 28B to FIG. 30B.

Each of total four disc holders 27 formed of synthetic resin is constituted solidly of a disc holding taper section 81, a vertical section 82 rising from the outer periphery of the taper section 81, and a disc inducing taper section 83 formed on the top outer periphery of the vertical section 82.

Each of these total four disc holder 27 is screwed on the inside portion of the hand main member 26 comprising a flat metal plate with at the flange 84 extending solidly from the disc holder 27.

The disc holding taper section 81 of each of total four disc holders 23 has a configuration that the plane is tapered gradually more gentle toward the center O2 (taper which is the same angle as that of the disc supporting taper section) The disc inducing taper section 83 has a configuration that the plane is tapered gradually steeper toward the center O2.

The minimum inside diameter F of the inside vertical section 82 of each of four disc holders 27 is approximately equal to the diameter B of a disc 3, that is, there is scarce clearance between the minimum inside diameter F and the diameter B. The width 2G in radial direction of the disc inducing taper sections 83 on the periphery of four disc holders 27 is larger than the slack 2E of four disc supports 23 to the diameter B of a disc 3.

When a disc 3 on the disc rack board 4 is lifted flat in Y1 direction from the under and held by the hand 8, the disc 3 is induced by the disc inducing taper section 83 of the four disc holders 27, inserted in the inside of the vertical sections 27, and placed on the disc holding tapers 81.

In this case, the peripheral edge 3c of the bottom side of the disc 3 is placed on the four taper sections 81, therefore, the recording surface 3d formed on the bottom side 3b of the disc 3 will not damaged.

Then, the disc 3 is settled automatically at the center O2 of the four disc holders 27 by the four vertical sections 82.

Therefore, the four disc holding members 27 of the hand 8 settle a disc at the center O2 position, and the hand 8 transfers the disc holding it stably without slipping.

A disc 3 is placed flat with a certain allowance of a slack 2E around the diameter B of the disc on the four disc supports 23 on a disc rack board 4, but on the other hand, a disc 3 is placed flat without slack around the diameter B of the disc on the four disc holders 27 of the hand 8.

Figure 2:
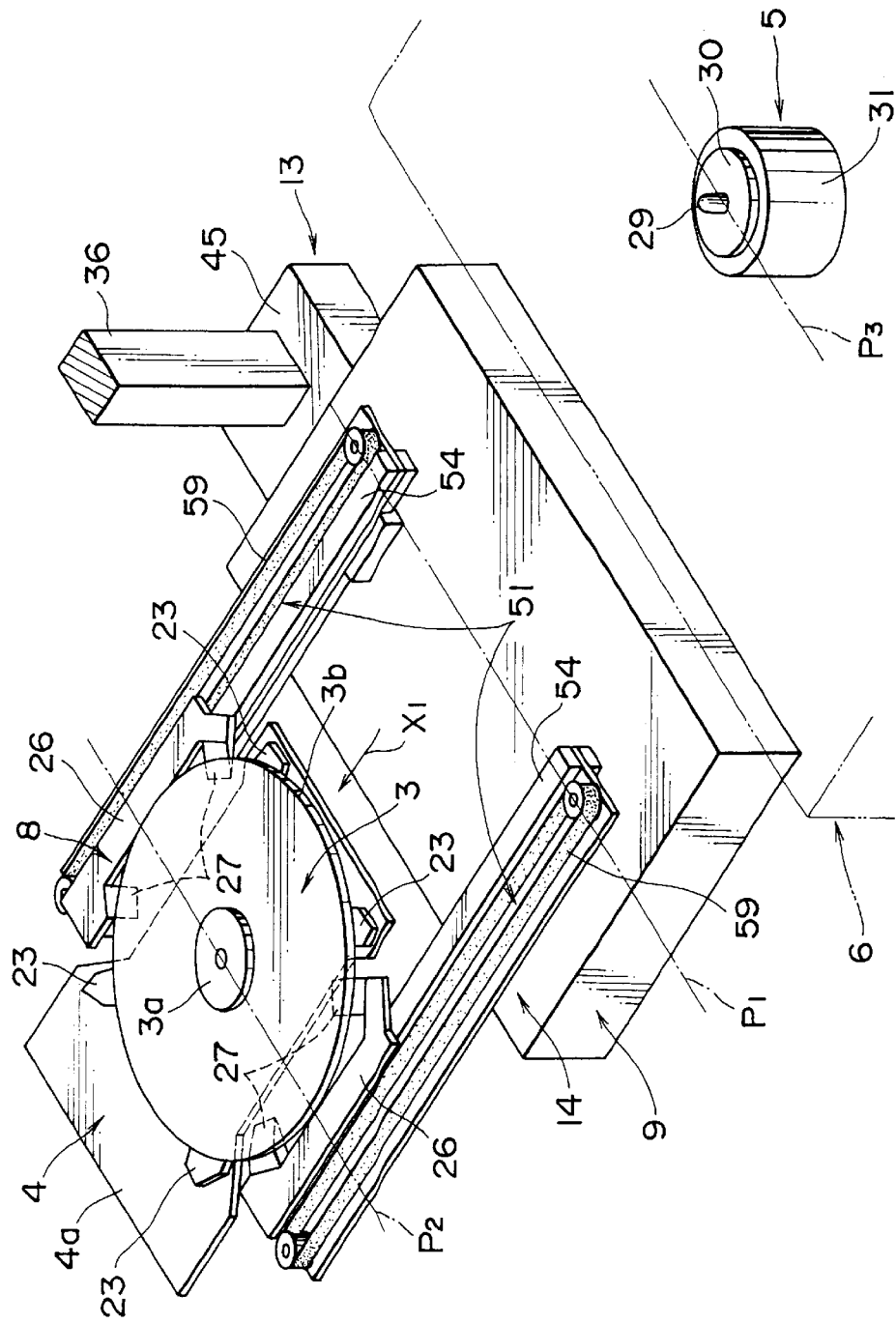
FIG. 2 is a perspective view for illustrating the operation for taking out a disc from a disc rack board by the hand on the carrier following to FIG. 1.
Figure 9:
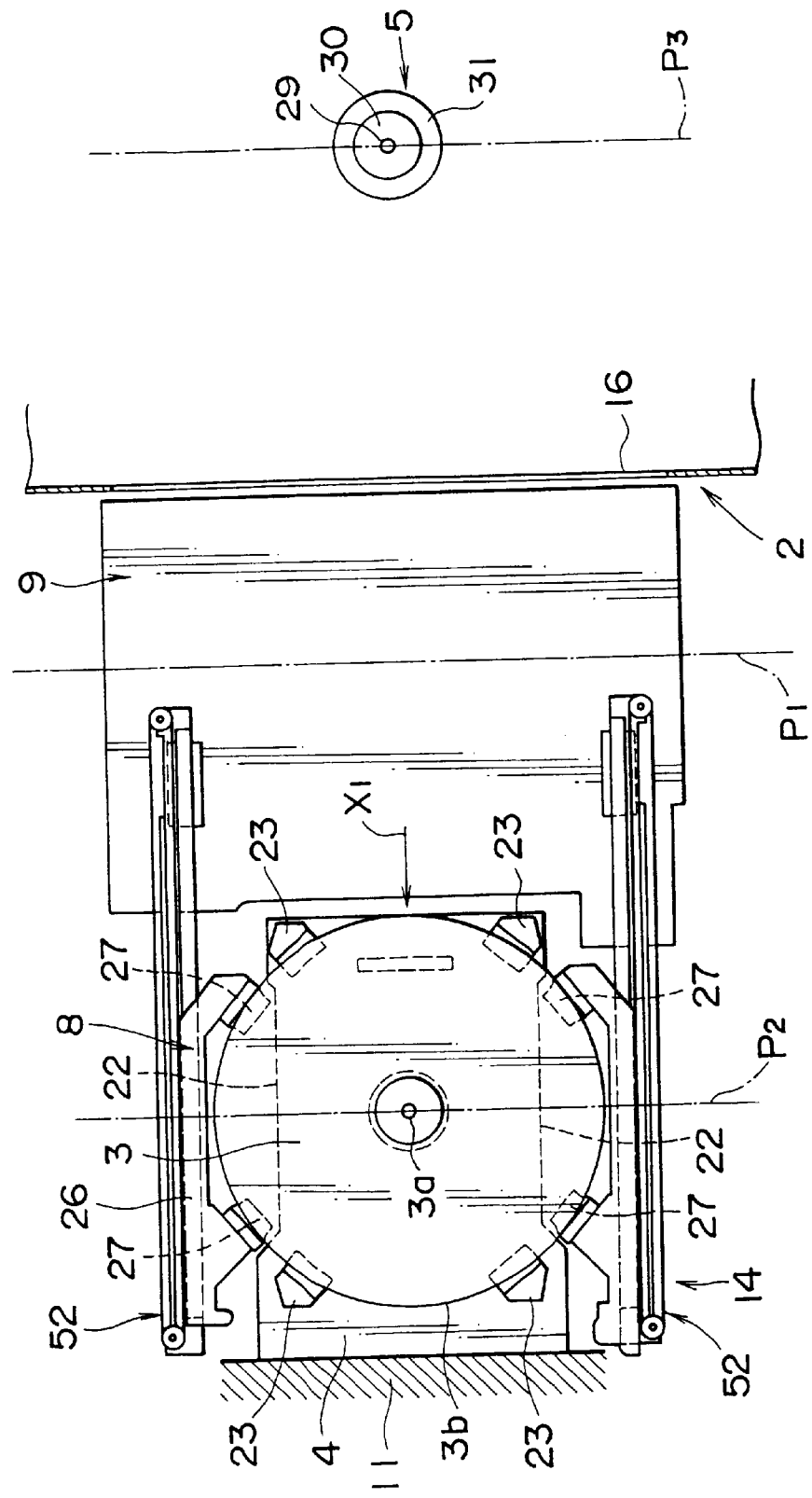
FIG. 9 is a top view of each of FIG. 2 and FIG. 3.

Therefore, the position on the four disc supports 23 of a disc rack board 4 where a disc is placed is controlled by the four disc holders 27 of the hand 8, thus the disc 3 is placed consistently and stably on the four disc supports 23 of the disc rack board 4 at the center in a horizontal plane to the four disc holders 26 of the hand 8 (as shown in FIG. 2 and FIG. 9, the center refers to the central position O2 of the four disc holders 26 of the hand when the hand 8 is positioned at the withdrawing position P2 of the disc rack board 4.

As the result, as described referring to FIG. 1 through FIG. 12, when a disc 3 is transferred to or from a disc rack board 4 by the hand 8, the deviation of placement in a horizontal plane of the disc 3 on the disc supports 23 of the disc rack board 4 and the disc holders 26 of the hand 8 is eliminated, and the partial wearing at certain positions of discs 3 on disc holders and disc supports 23 is prevented.

As illustrated in FIG. 30A, a disc 3 can be deviated horizontally from the central position O1 of the four disc supports 23 within the slack of 2E on the disc rack board 4. However, as shown in FIG. 30B, the taper sections 83 of the four disc holders 27 of the hand 8 has a slack of 2G which is larger than 2E, if the disc 3 is placed with a deviation horizontally on a disc rack board 4, the taper sections 83 induces the disc 3 consistently in the inside of the vertical sections when the hand 8 receives the disc 3 on the disc rack board 4 from Y1 direction. Therefore, the receipt of a disc 3 on a disc rack board 4 by the hand 8 is possible.

Then, as illustrated in FIG. 30A, when the hand 8 returns a disc 3 onto the four disc supports 23 of a disc rack board 4 from Y2 direction, if the central position O2 of the four disc holders 27 of the hand 8 happens to deviate horizontally from the central position O1 of the disc supports 23 within the slack of 2E, the disc 3 is placed consistently in the inside of the vertical section 71 of the disc supports 23.

In this case, the general repetition accuracy involving the deviation of the central position O2 of the four disc holders 27 of the hand 8 from the central position O1 of the four disc supports 23 of a disc rack board 4 is far higher than the absolute position accuracy. Therefore, if the central position O2 deviates from the central position O1 when a disc 3 is returned at the first time onto a disc rack board 4 by the hand 8, the disc is placed with the same accuracy in the every following returnings. Therefore, when the hand 8 receives the disc 3 on the disc rack board 4 every time after the first receiving from Y2 direction, the four disc holders 27 of the hand 8 can induce the disc 3 inside consistently the vertical sections 82 without the taper sections 83.

The four disc holders 26 of the hand 8 can hold a disc without positional deviation in horizontal plane, therefore, as described referring to FIG. 5, FIG. 6, and FIG. 11, the hand 8 places a disc 3 accurately and consistently on the spindle 29 and disc table 30 in the recorder and/or regenerator 5 in a disc drive 6 from Y2 direction, thus the mis-loading is prevented reliably.

As illustrated in FIG. 25, out of the four vertical sections 82 of the four disc holders 26, the edge 82a in X1 side of the pair of vertical sections 82 provided on X1 side and the edge 82b in X2 side of the pair of vertical sections 82 provided on X2 side define the above-mentioned minimum inside diameter F.

As the result, the edges 82c and 82d facing each other of these pair of vertical sections 82 and the periphery of a disc 3 form a triangular gap 86 for inducing a disc, and the co-operation of the taper section 81 for disc inducing with this gap 86 allows a disc 3 to be induced smoothly into the inside of the four vertical sections 82.

Description of the First Modification of Disc Supports on a Disc Rack Board

Then, The disc changer in accordance with the present invention may be a disc changer having disc supports on a disc rack board which are located on three places as illustrated in FIG. 31.

Description of the Second Modification of Disc Supports on a Disc Rack Board

The disc changer in accordance with the present invention may be a disc changer having disc supports on a disc rack board which are located on two places along the periphery of a disc 3 as illustrated in FIG. 32.

Detailed Description of the Sealed Structure in a Disc Drive

Figure 33:
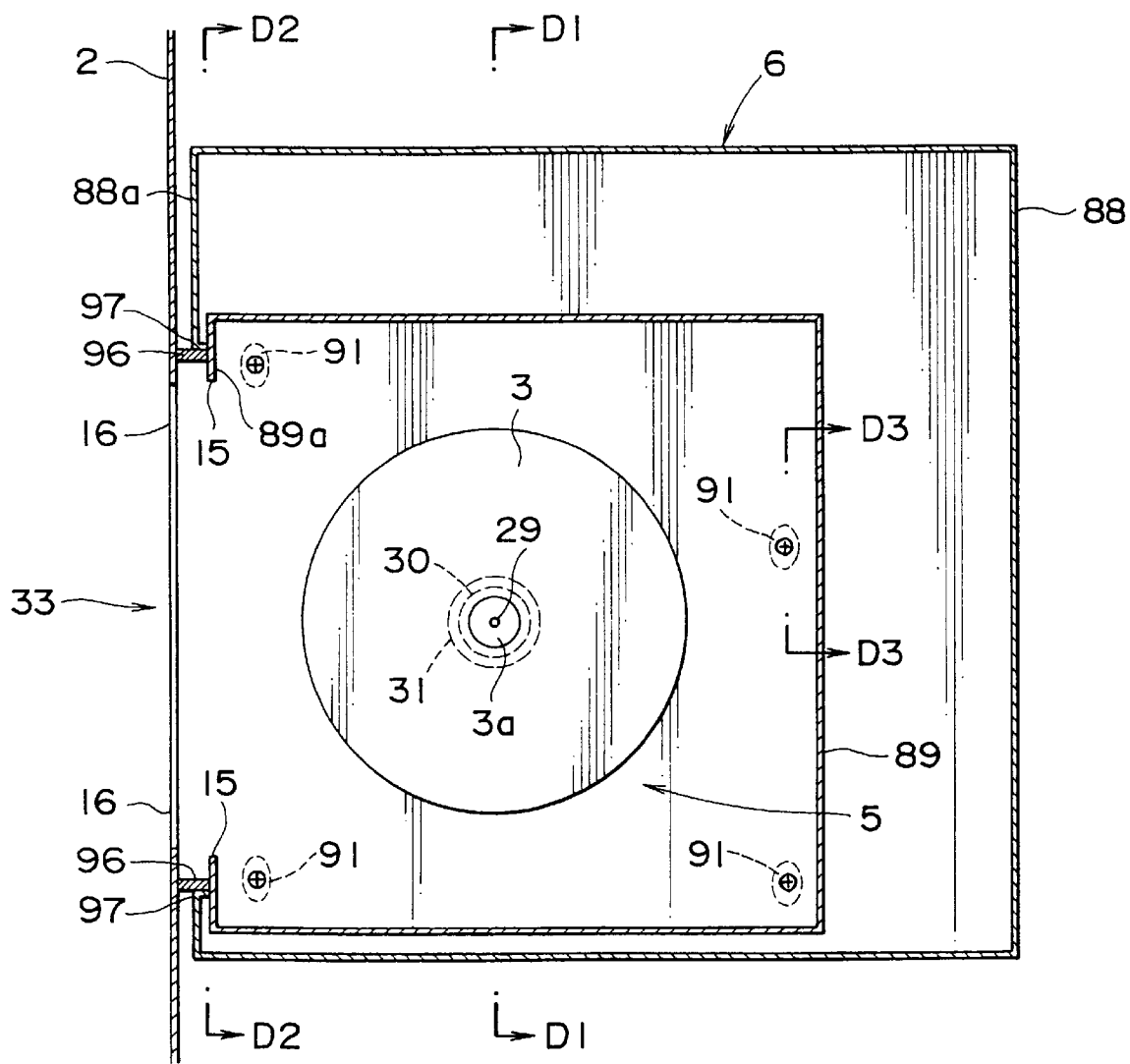
FIG. 33 is a partially cutaway top view for illustrating the sealed structure for the recorder and/or regenerator of a disc drive.
Figure 34A:
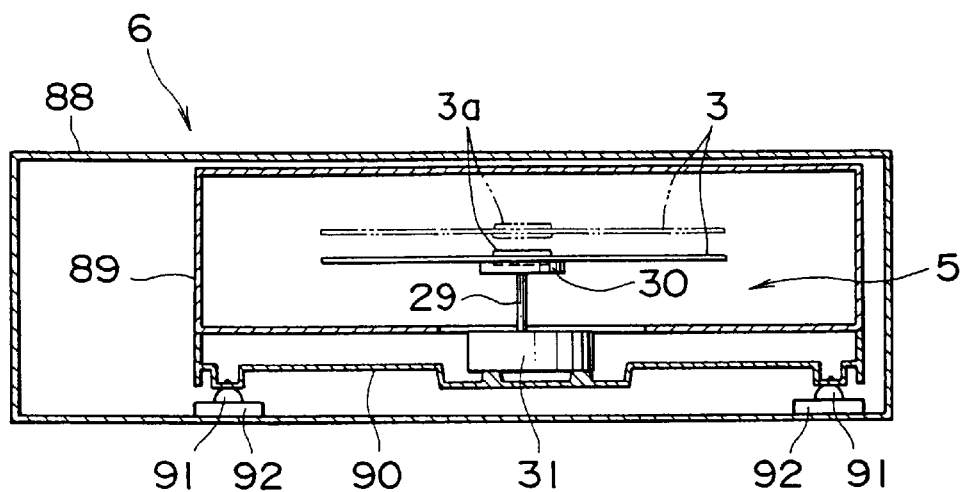
FIG. 34A is a partially cutaway side view taken on line D1—D1 of FIG. 33.
Figure 34B:
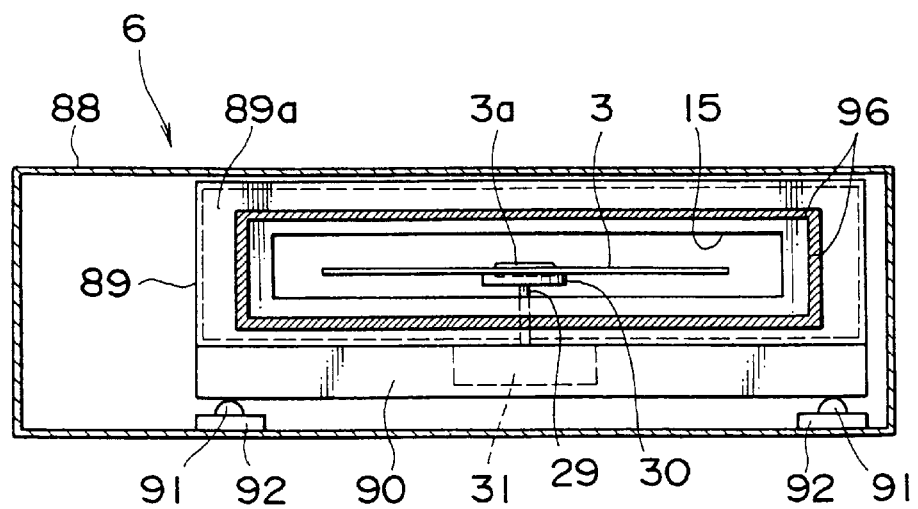
FIG. 34B is a partially cutaway side view taken on line D2—D2 of FIG. 33.
Figure 35A:
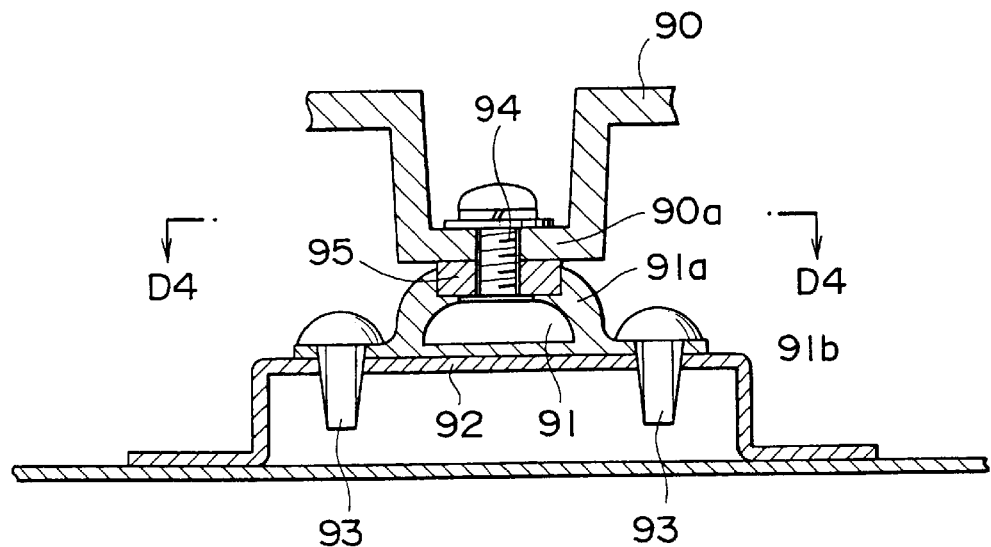
FIG. 35A is an enlarged cross-sectional view taken on line D3—D3 of FIG. 33 for illustrating the damper of a disc drive.
Figure 35B:
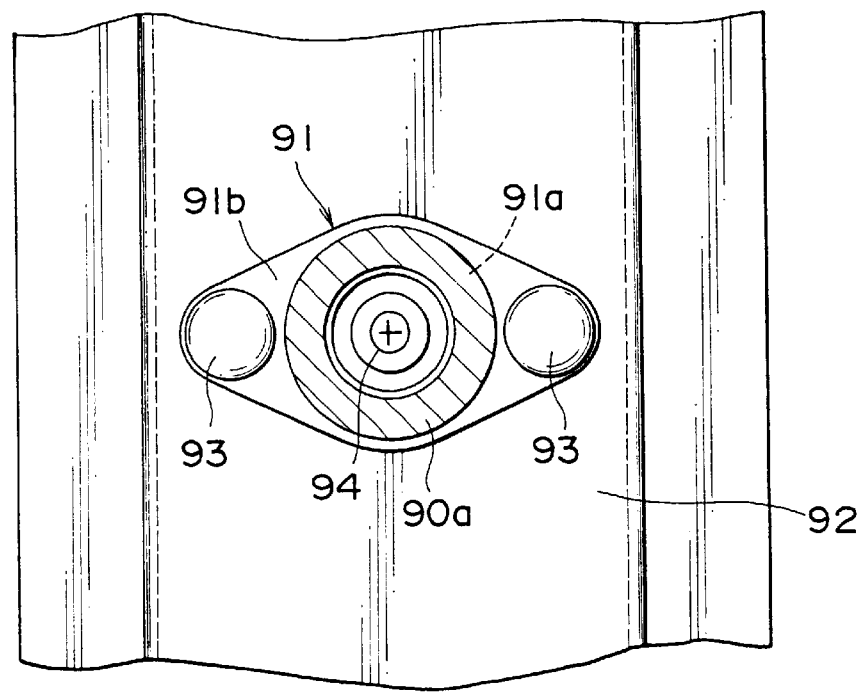
FIG. 35B is a partially cutaway top view taken on line D4—D4 of FIG. 35A.
Figure 36:
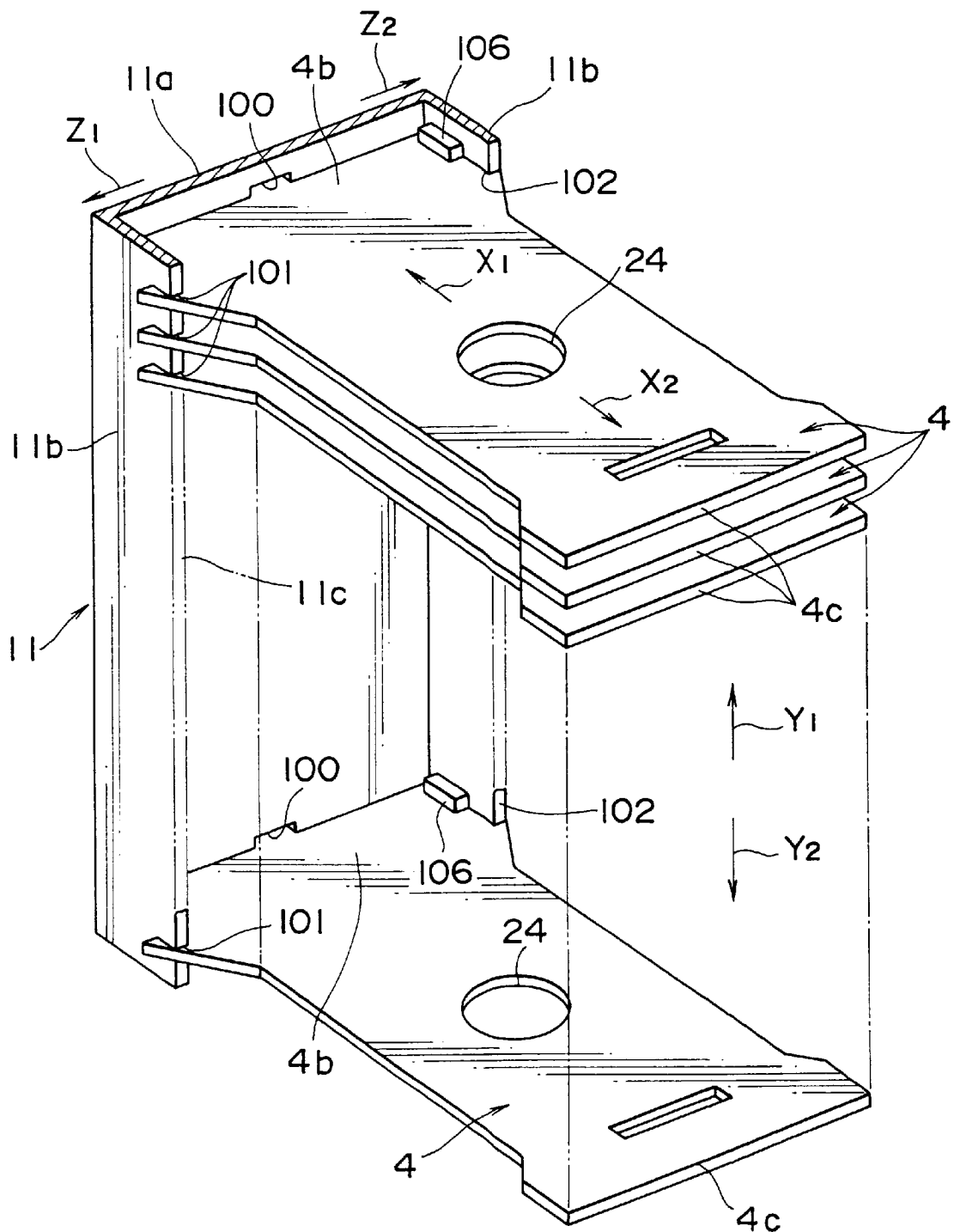
FIG. 36 is a perspective view for illustrating the mounting mechanism for mounting a disc rack board to a board base.
Figure 37:
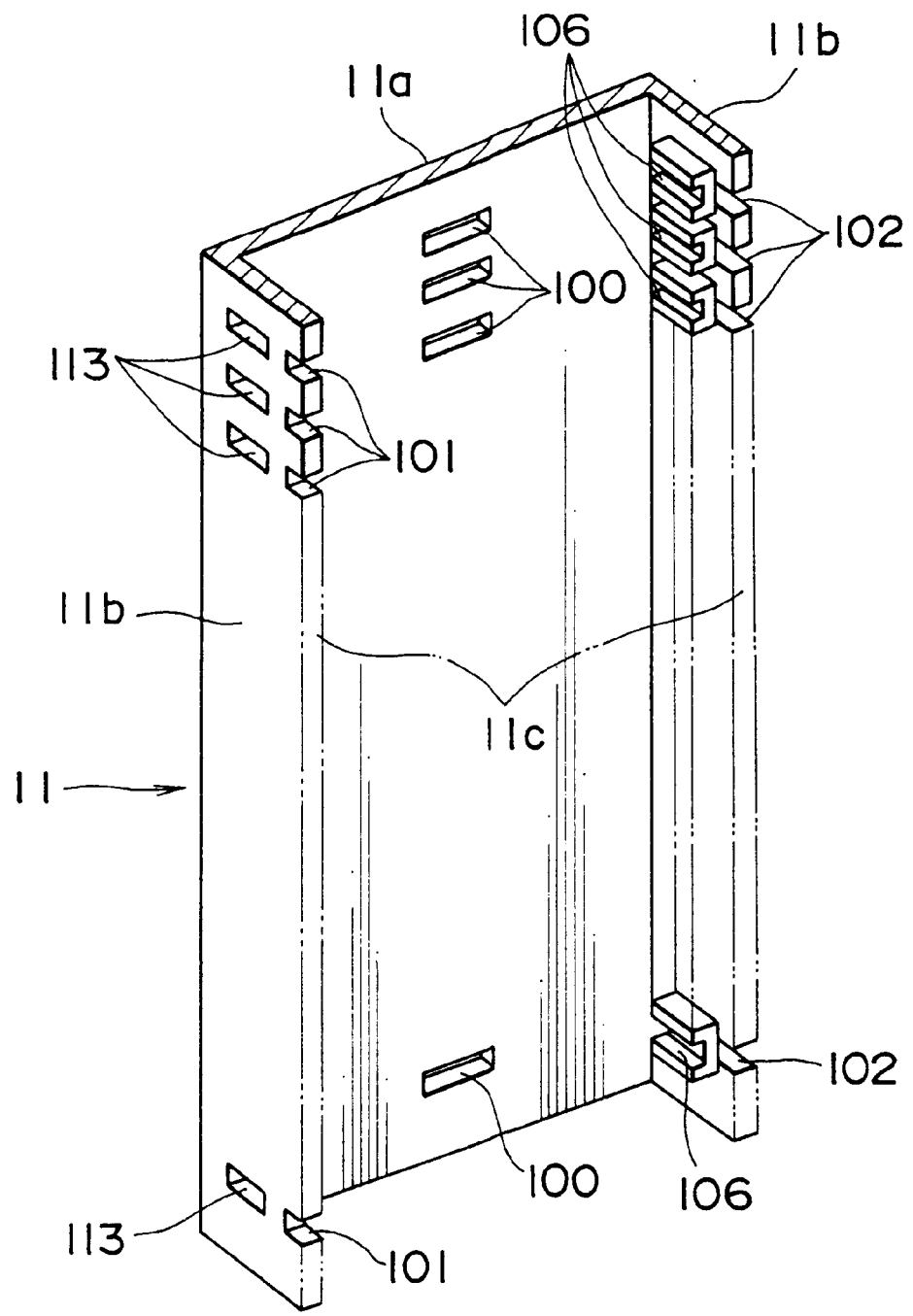
FIG. 37 is a perspective view of a board base in FIG. 36.

The sealed structure of the recorder and/or regenerator 5 provided in a disc drive 6 is described referring to FIG. 33 to FIG. 35.

The disc drive 6 is provided with a body enclosure 88 and a dust-proof box 89 with a sealed structure provided in the internal thereof, the recorder and/or regenerator 5 is contained in the dust-proof box.

The dust-proof box 89 is located on the mechanical chassis 90 horizontally and air-tightly, and the bottom four corners of the mechanical chassis 90 and 89 are supported elastically on the bottom chassis 92 of the body enclosure 88 with interposition of four vibration-proof dampers 91 made of rubber. A spindle 29, disc table 30, and spindle motor 31, optical pick-up and outer magnetic head which is used as required (these are not shown in figures) which constitute the recorder and/or regenerator are provided in the dust-proof box 89 above the mechanical chassis 90.

The four dampers 91 are structured in a configuration in which, for example, a damper comprises a semi-spherical damper main section 91 and bottom flange section 91b formed solidly of elastic material such as rubber. The bottom flange 91b is secured horizontally on the bottom chassis 92 with a pair of clasps 93 such as a snap pin, and damper contacts 90a formed at the bottom four corners of the mechanical chassis 90 are placed on the damper main sections 91a. A screw 94 inserted into the damper contact 90a vertically from the above is screwed tightly to a nut 95 which is insert-molded at the top of the damper main section 91a.

Therefore, if the body enclosure 88 is vibrated horizontally or vertical due to external vibration loaded to the body enclosure 88, the external vibration is absorbed by the four dampers 91, the whole dust-proof box 89 is prevented from vibration. Dampers with various configurations may be used as the damper 91.

On the other hand, to keep a dust-proof box 89 air-tight, a disc gate 15 of each disc drive 6 is opened on the side 89a facing to the partition 2 of a dust-proof box, the disc gate 15 is connected air-tightly to a connecting gate 16 on the partition 2 facing each other with interposition of a dust-proof member 96.

The disc gate 15 formed on the side 89 of a dust-proof box 89 is connected to each connecting gate 16 through an opening 97 formed on the side facing to the partition 2 of the body enclosure 88.

On the inside of the opening 97, the peripheries of the disc gate 15 and connecting gate 16 are joined air-tightly with a rectangular ring dust-proof member 96. The dust-proof member 96 consists of flexible elastic material such as neoprene sponge, molto-prane sponge, rubber, and filtering paper.

Therefore, by using this disc drive 6, a recorder and/or regenerator 5 are prevented from vibration because the recorder and/or regenerator 5 is contained in the internal of a dust proofing box 89 and supported elastically on four dampers 91, and the recorder and/or regenerator 5 is kept air-tightly and dust-proof because the recorder and/or regenerator 5 in the dust-proof box 89 is connected air-tightly to the sealed area 33 in the changer body 1 as illustrated in FIG. 17 and FIG. 18 using flexible elastic dust proofing material 96 for connecting air-tightly between peripheries of the disc gate 14 of the dust-proof box 89 and the connecting gate 16 of the partition 2.

Description of Attaching Mechanism for Attaching Disc Rack Boards to a Board Base An attaching mechanism for attaching disc rack boards 4 to a board base 11 is described referring to FIG. 36 to FIG. 42.

Figure 14:
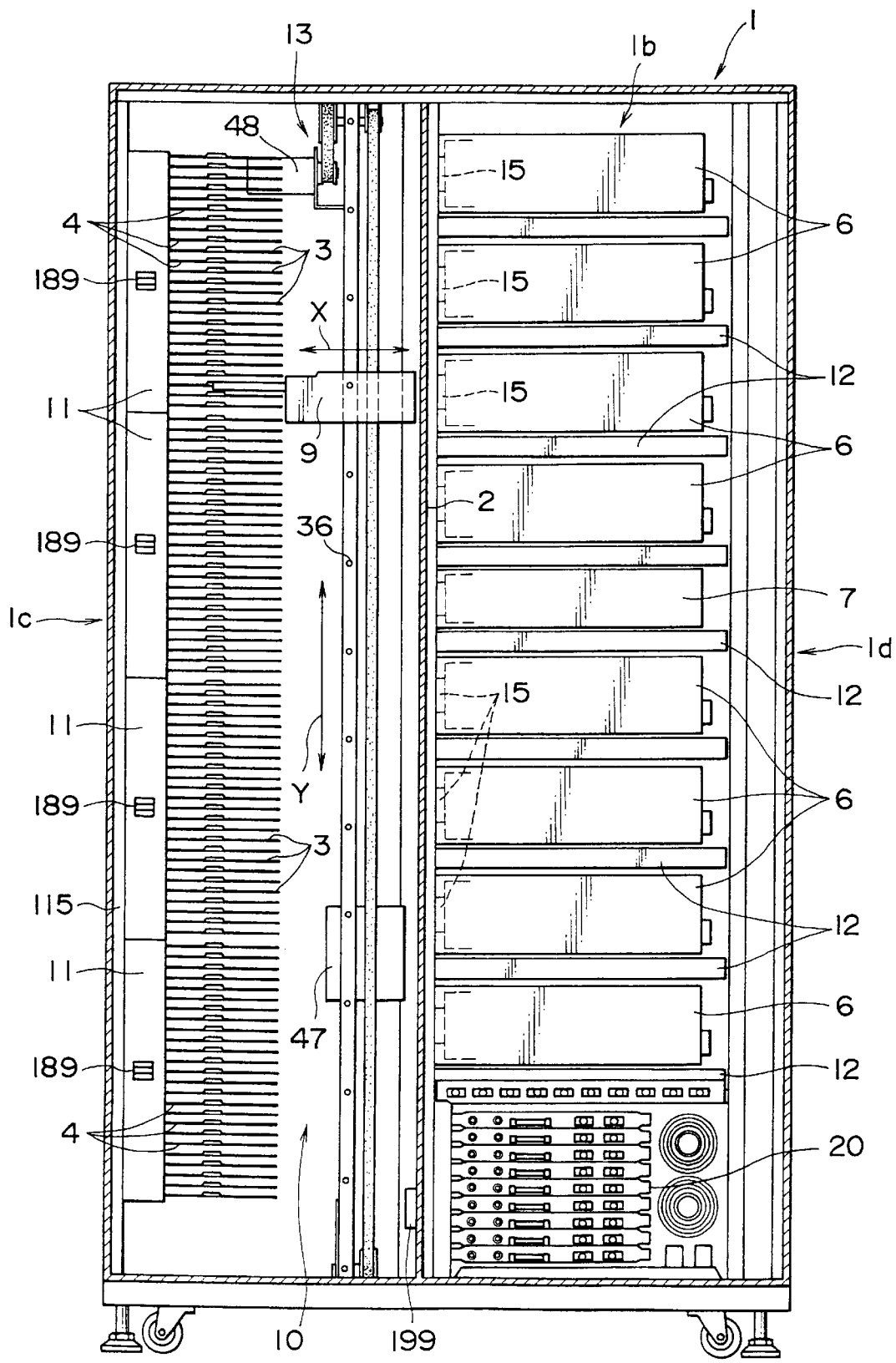
FIG. 14 is a partially cutaway rear view of a whole disc changer taken on line A1—A1 of FIG. 13.
Figure 15:
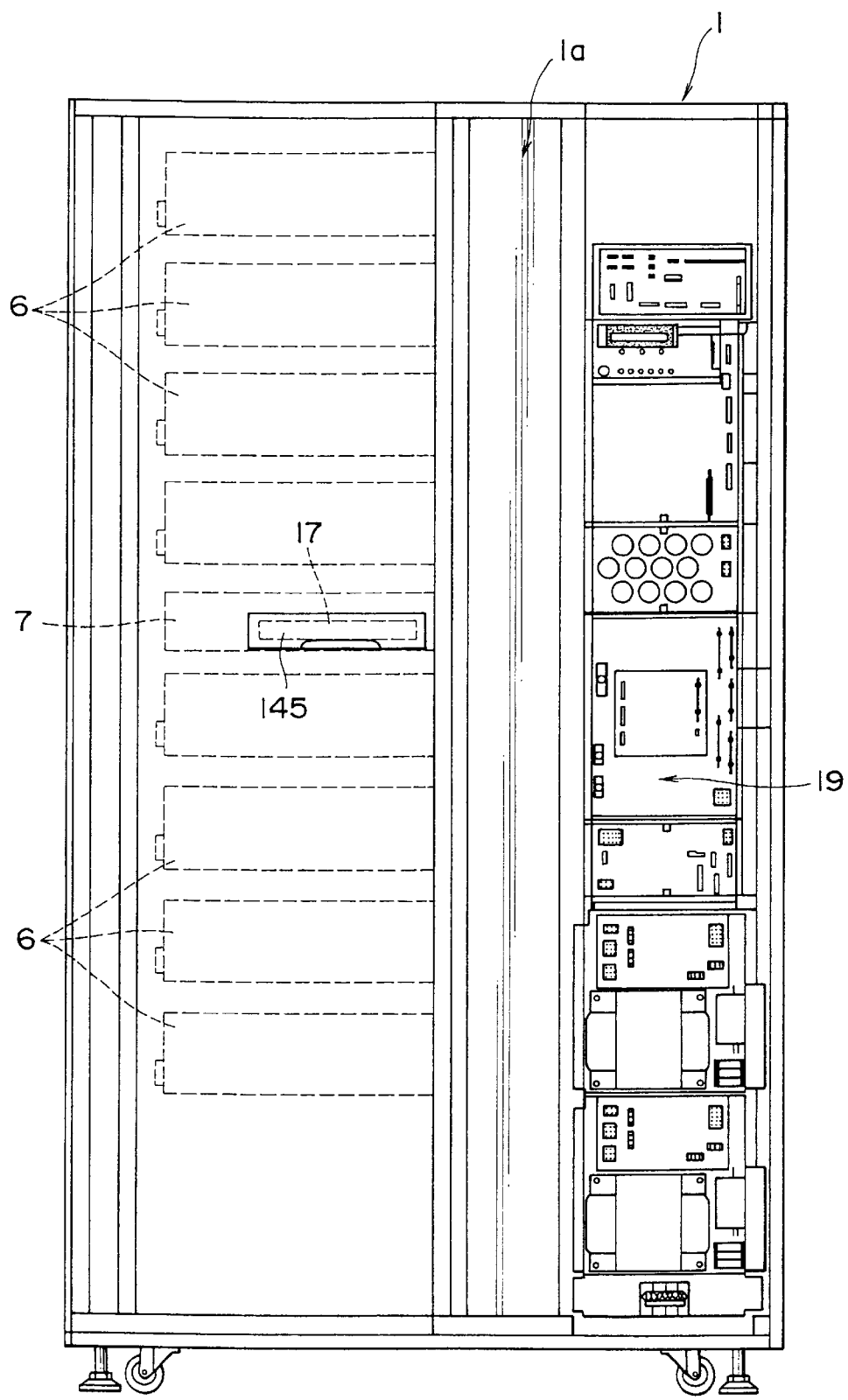
FIG. 15 is a front elevation view of a whole disc changer taken on line A2—A2 of FIG. 13.
Figure 16:
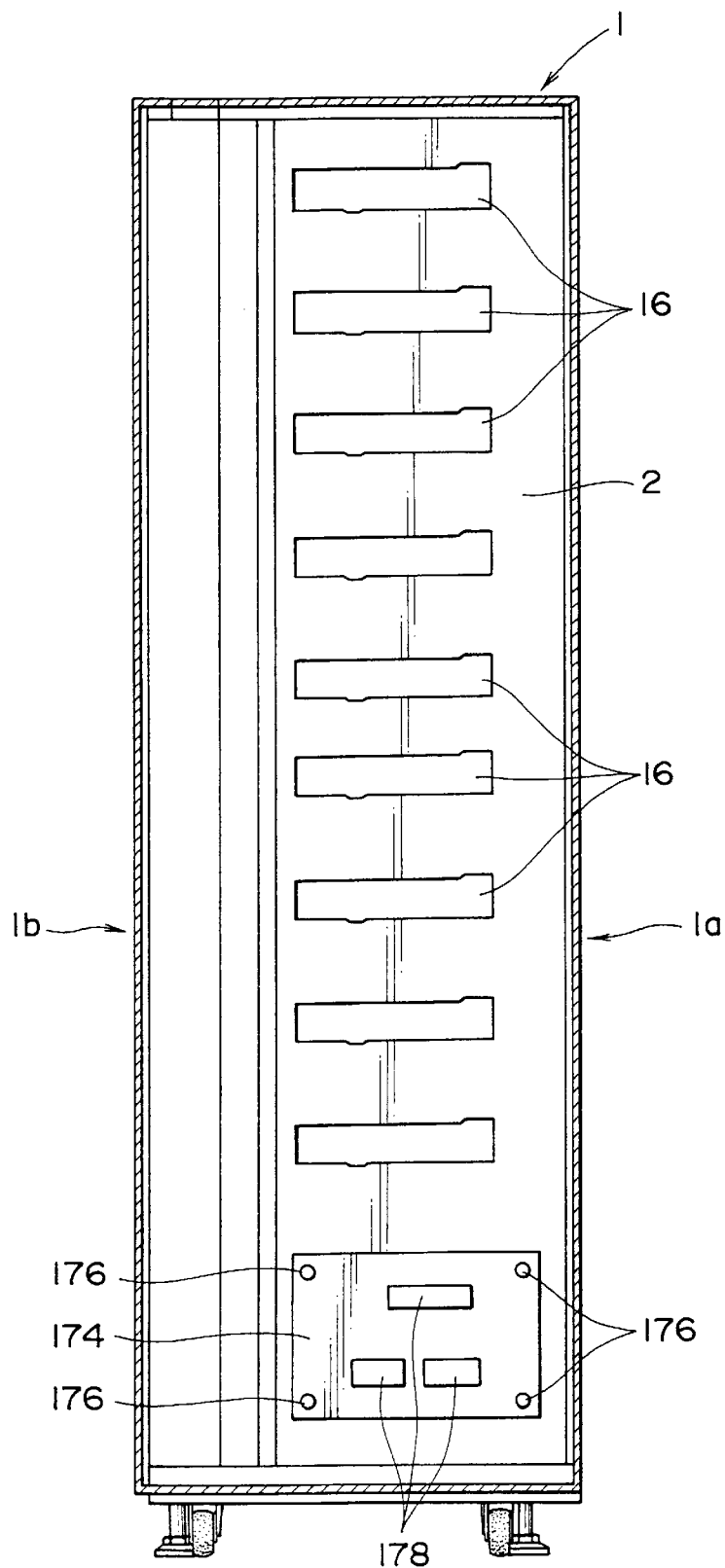
FIG. 16 is a partially cutaway side elevation view taken on line A3—A3 of FIG. 14 for illustrating the partition in the disc changer.

As illustrated in FIG. 14, on a vertical board base 11 twenty five disc rack boards 4 are cantilevered horizontally with a certain interval. The board base 11 comprises a back plate 11a and a pair of side plates 11b facing each other in parallel provided perpendicular to the back plate 11a so as that the horizontal cross-section of the board base 11 is nearly in U-shaped, and the board base 11 has a certain length and provided vertically.

The board base 11 is structured so as that a disc rack board 4 is attached to the board base 11 through one touch operation, that is, the base section 4b of a disc rack board 4 locating on the opposite side from the carrier 9 side is inserted horizontally between a pair of right and left side plates 11b of the board base 11 with U-shaped cross-section from X1 direction.

On the back plate 11a of a board base 11 along the vertical center line of the back plate 11a, twenty five horizontal grooves 100 are provided with a certain interval, and on the right and left side plates 11b of the board base 11 along the vertical edge 11c on X2 side facing to the carrier 9, twenty five horizontal grooves 101 and 102 are provided on each edge 11c respectively with the same interval as that of the grooves on the back plate 11a, a set of the three grooves on the back plate 11a and on the side plates 11b having the same step number is positioned in a horizontal plane, and these grooves are served as positioning grooves. Ends of a pair of right and left positioning grooves 101 and 102 are opened at the end faces 11c of the right and left side plates 11b.

On each disc rack board 4, three insert projections 103, 104, and 105 are formed solidly and symmetrically with respect to the center line between both side plates 11b so as that three insert projections are inserted from X1 direction to the corresponding three positioning grooves, that is, an insert projection 103 provided at the center of the end face 4d of the base section 4b of the disc rack board 4 on X1 side is inserted to the groove 100, two insert projections 104 and 105 provided on right and left end faces 4e are inserted to the grooves 101 and 102 respectively. On the outside of right and left insert projections, a pair of small projections 104a and 105a to be inserted from X1 direction to the outside of the right and left side plates 11b of the board base 11 is formed.

Flat twenty five insert guides 106 formed solidly of synthetic resin are provided vertically with the same interval as that of the grooves respectively on either right and left side plates 11b facing to the inside locating near the back plate 11a side, a set of two insert guides with the same step number is positioned in the same plane and positioned in the same plane as that of three positioning grooves 100, 101, and 102 having the same step number.

Figure 40:
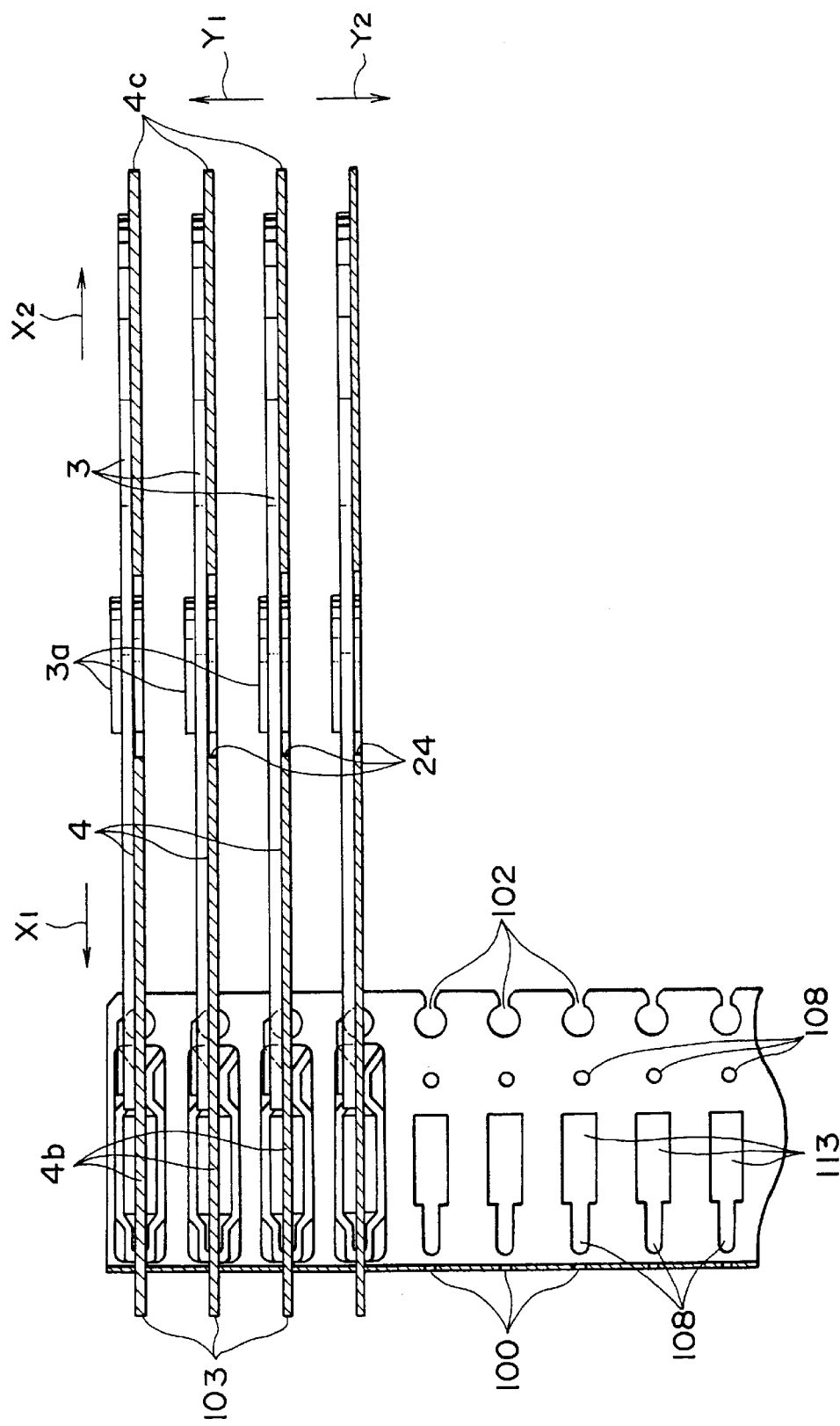
FIG. 40 is a partially cutaway side view taken on line E2—E2 of FIG. 38.
Figure 41:
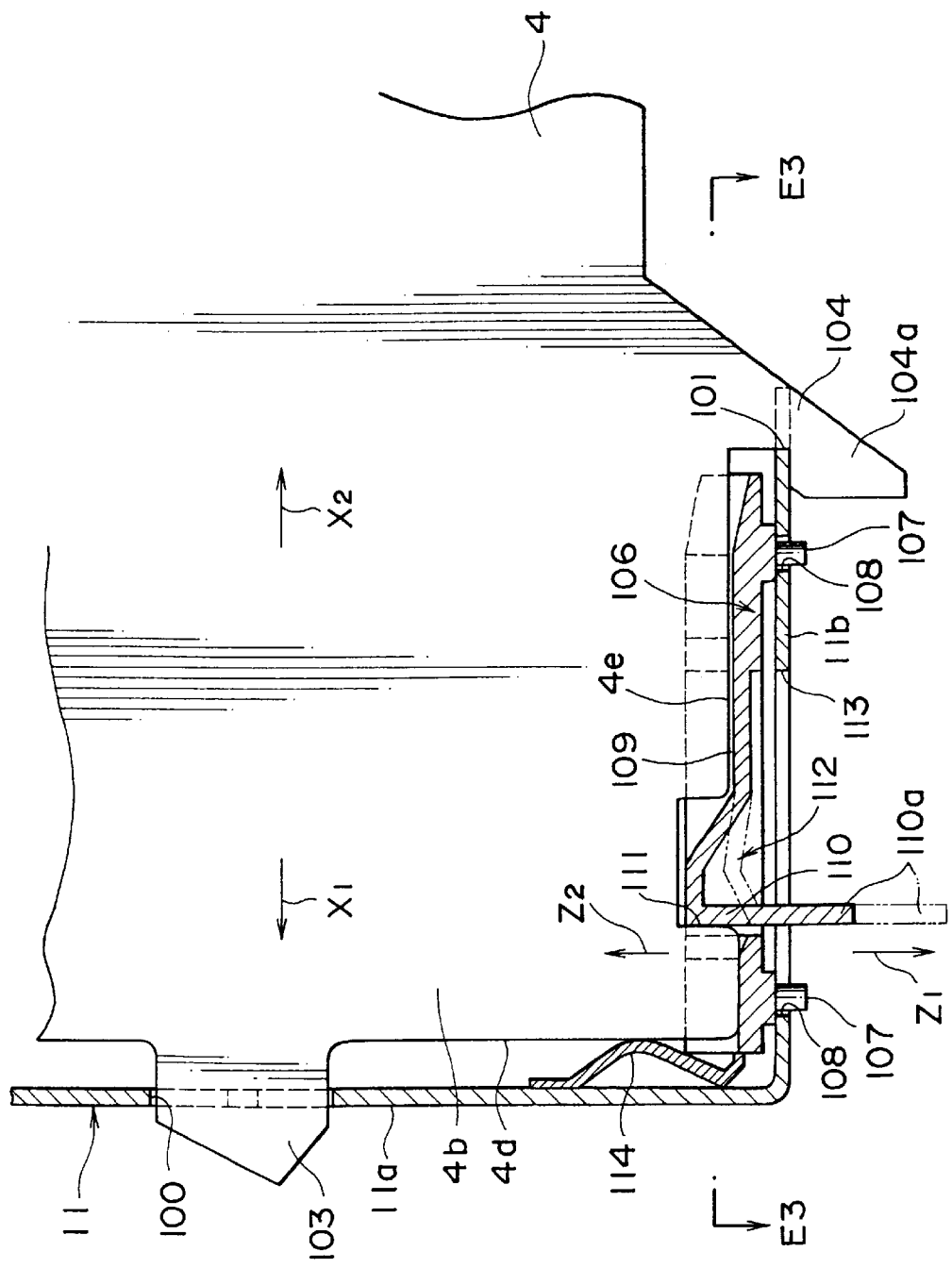
FIG. 41 is an enlarged partially cutaway top view for illustrating the inserting guide for inserting a disc rack board.

As illustrated in FIG. 41 and FIG. 40, these insert guides 106 can be attached on the inside on the right and left plates 11b through one touch operation by inserting from Z1 and Z2 directions a pair of nails 107 formed solidly on the outside of both ends of these insert guides 107 into a pair of holding holes 108 formed on the right and left plates 11b. On the inside facing surfaces of these pair of right and left insert guides 106, a pair of horizontal right and left insert guide grooves 109 are formed.

A pair of right and left leaf springs 110, which are block members formed solidly on a pair of right and left insert guides 106, and a pair of right and left cutting off 111 formed on the right and left end faces 4e of the base section 4b of each disc rack board 4 constitute a pair of right and left locking mechanism 112. These pair of right and left leaf springs 110 is formed in L-shaped symmetrically, and free ends 110a of the leaf springs 110 project in Z1 and Z2 directions through a pair of right and left grooves 113 provided on the right and left side plates 11b to the outside of these right and left side plates 11b. A pair of right and left leaf springs 114 which are served as pressure members is formed on the ends on X1 side of a pair of right and left insert guides 106. These leaf springs 114 are formed in small sized, and contact on the inside of the back plate 11a of the board base 11.

By using the attaching mechanism for attaching disc rack boards 4 to a board base 11 structured as described above, as illustrated in FIG. 36 to FIG. 40, each disc rack board 4 is attached to a board base 11 through one touch operation by only inserting the base section 4b of each disc rack board 4 from X1 direction horizontally between right and left side plates of the board base 11 to insert horizontally from X1 direction three insert projections 103, 104, and 105 into three positioning grooves 100, 101, and 102.

Figure 42:
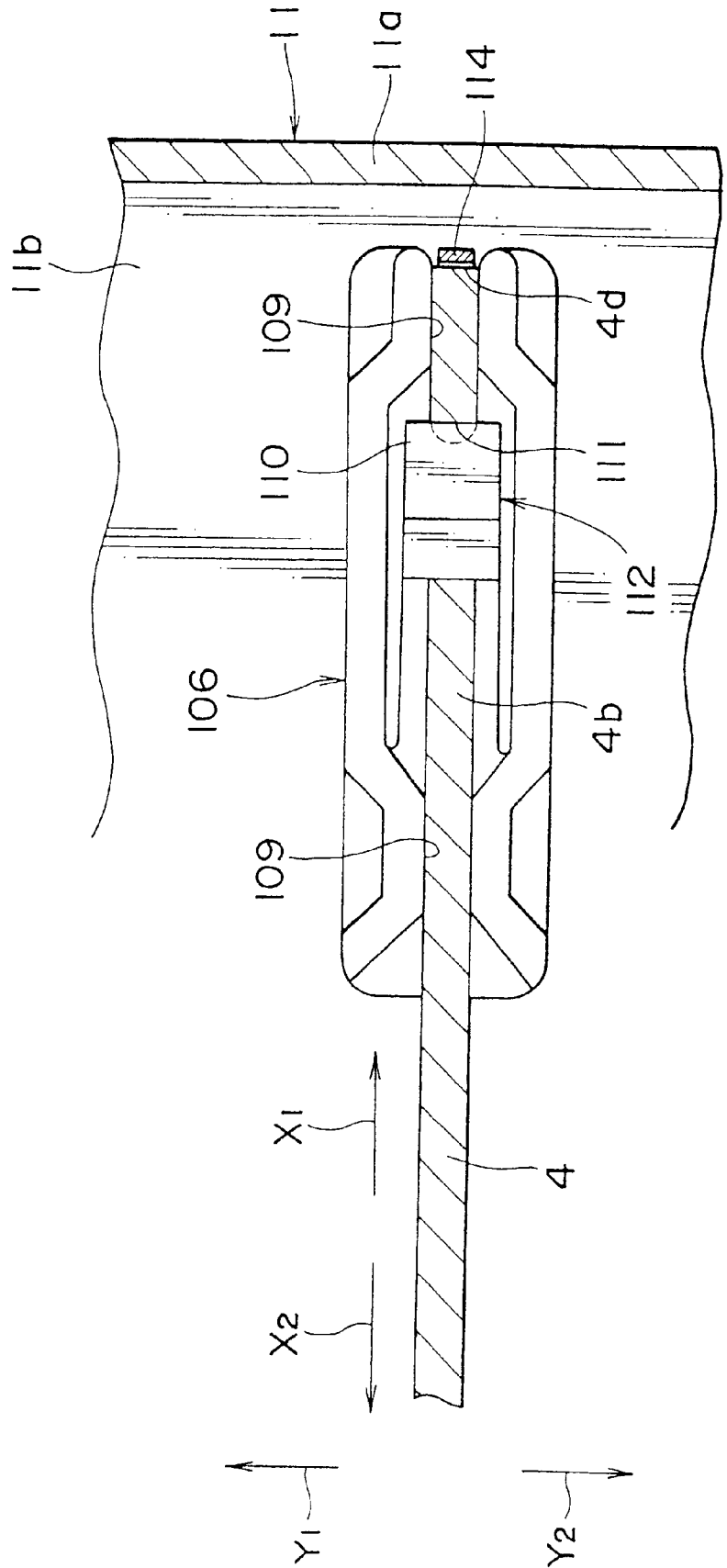
FIG. 42 is a side view taken on line E3—E3 of FIG. 41.

When as illustrated in FIG. 41 and FIG. 42, right and left both ends faces 4e of the base section 4b of the disc rack board 4 are inserted from X1 direction to insert guide grooves 109 of a pair of right and left insert guides 106, a pair of right and left leaf springs 110 of the lock mechanisms 112 are temporarily released in Z1 direction against the elastic force as shown in FIG. 41 with dashed line.

Then, the three insert projections 103, 104, and 105 are completely inserted in X1 direction in the three positioning grooves 100, 101, and 102, a pair of right and left leaf springs 110 returned elastically in Z2 direction as shown with solid line in FIG. 41, thereby, engaged automatically in a pair of right and left engaging cutting off 111 of the disc rack board 4, thus the disc rack board is locked on the board base 11 and the disc rack board 4 is prevented from falling down in X2 direction from the board base 11. When as illustrated in FIG. 38, a pair of right and left small projections 104a and 105a are inserted simultaneously from X1 direction in the outside of the right and left side plates of the board base 11 so as that the right and left side plates 11b are not forced to be pushed out in Z1 and Z2 directions toward outside in FIG. 38.

In this case, the end face 4b of the base section of the disc rack board 4 pushes from X1 direction a pair of right and left leaf springs 114 against elastic force to the back plate 11a of the board base 11. Thereby, the disc rack board 4 is pushed in X2 direction, which is the opposite direction against the insert direction, by the reaction pushing force of a pair of right and left leaf springs to remove the looseness between a pair of right and left leaf springs 110 and engaging cutting off 111.

Therefore, a disc rack board 4 is positioned accurately at the standard position in respect of vertical and horizontal directions, namely Y1 and Y2 directions, Z1 and Z2 directions, and X1 and X2 directions, with aid of the three positioning grooves 100, 101, and 102, and attached stably and firmly without any looseness.

Figure 38:
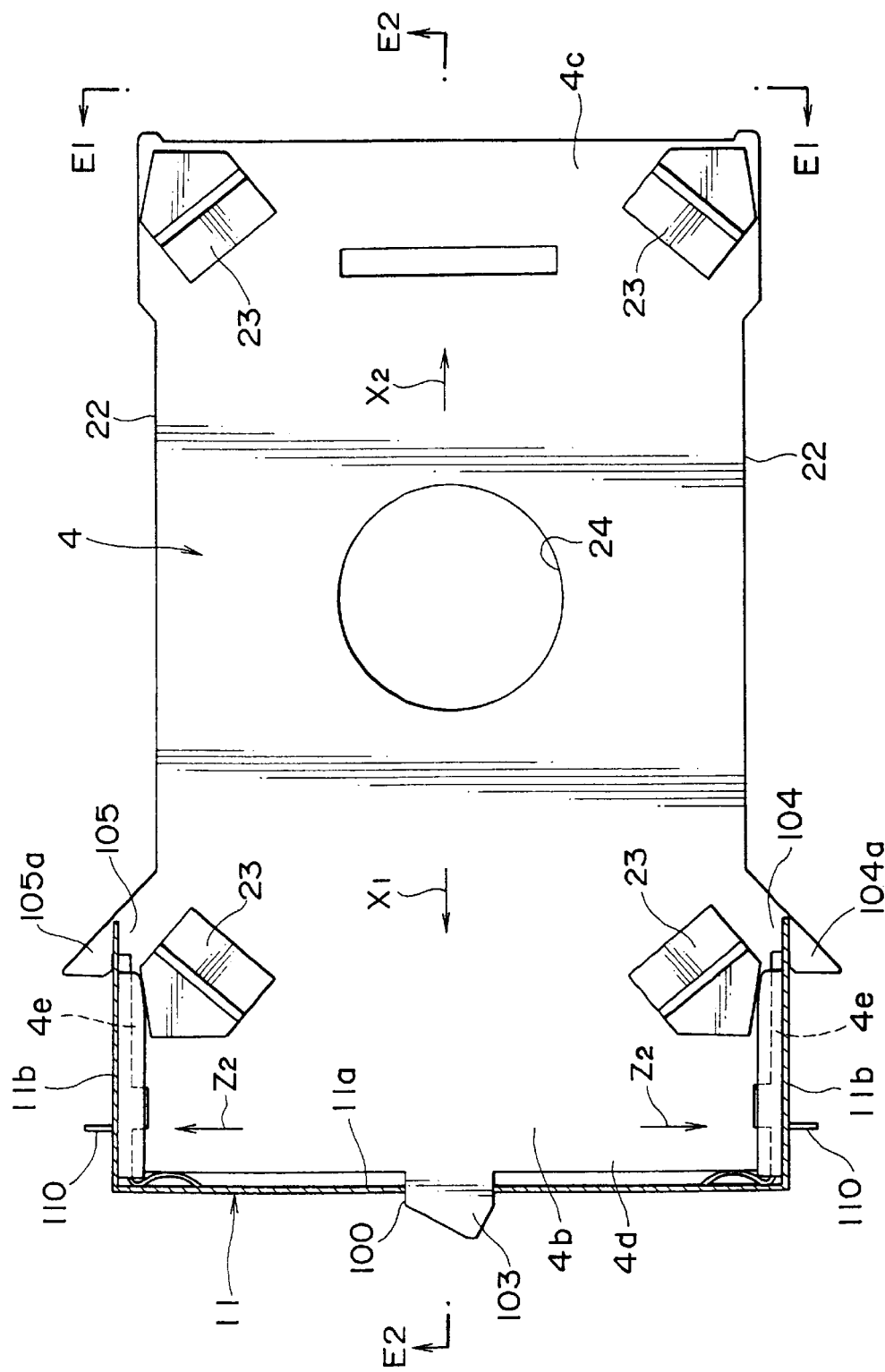
FIG. 38 is a top view of FIG. 36.
Figure 39:
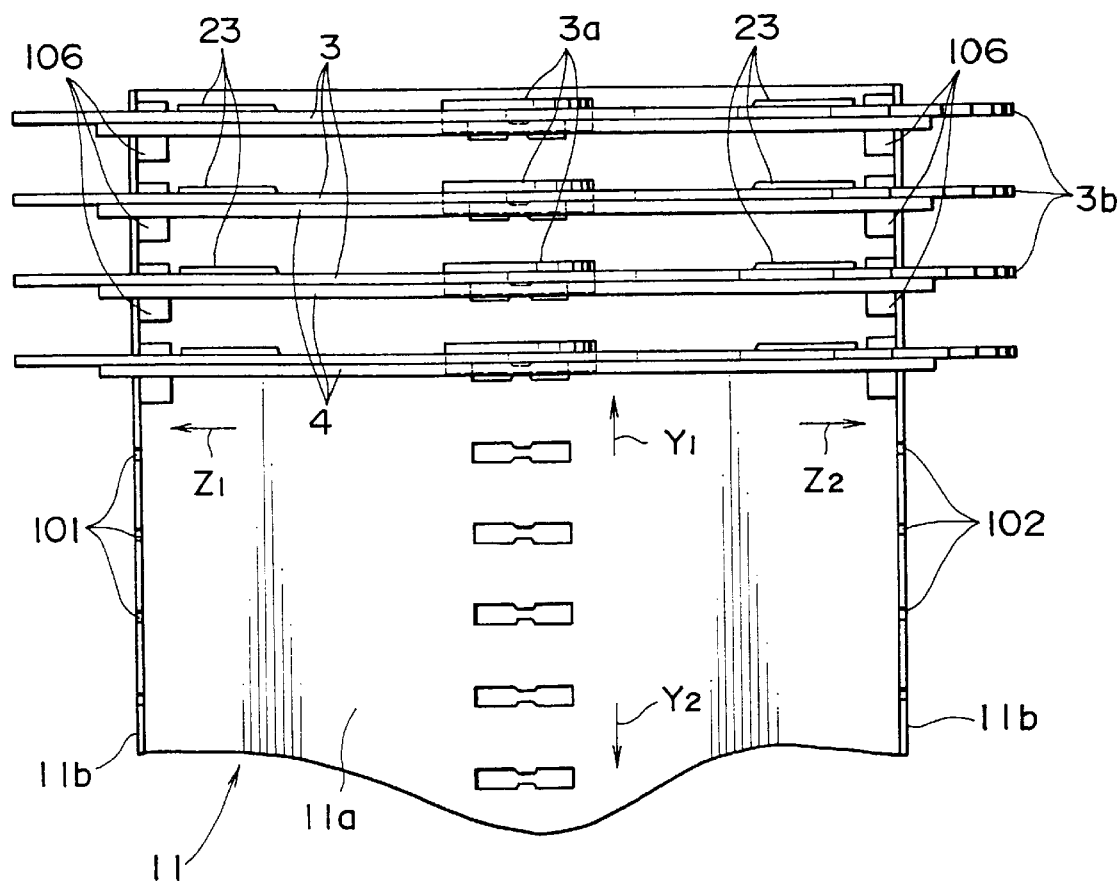
FIG. 39 is a front elevation view taken on line E1—E1 of FIG. 38.

To detach a disc rack board 4 from a board base 11, as illustrated in FIG. 41 with dashed line, free ends 110a of a pair of right and left leaf springs 110 are pulled in Z1 and Z2 directions in FIG. 38 toward the outside of right and left side plates 11b of the board base 11 to disengage the pair of right and left leaf springs 110 from the pair of right and left engaging cutting off 111 of the disc rack board 4 outside, and the disc rack board 4 is automatically pushed out from the board base 11 in X2 direction by pushing force of the pair of right and left leaf springs 114 in X2 direction of the disc rack board 4. Therefore, a disc rack board 4 is detached from a board base 11 simply through one touch operation.

As illustrated in FIG. 14, FIG. 13, FIG. 19, FIG. 20, FIG. 21, and FIG. 22, a vertical board base 11 is fixed on the vertical frame 115 for mounting board base in a changer body 1 with, for example, screws.

Description of Disc Floating Prevention Structure on Carrier

Figure 43:
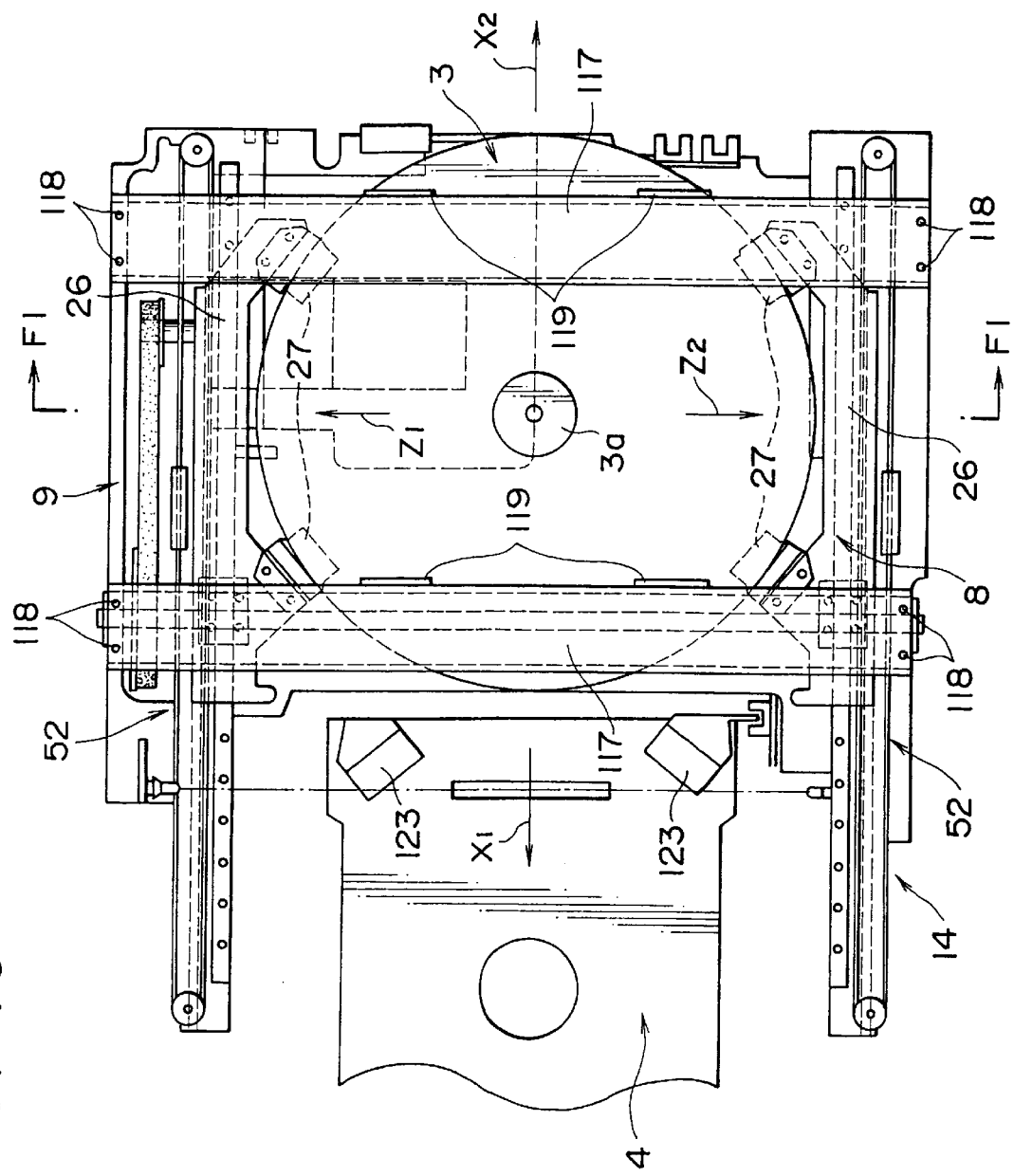
FIG. 43 is a top view for illustrating the floating preventing mechanism on the carrier.
Figure 44:
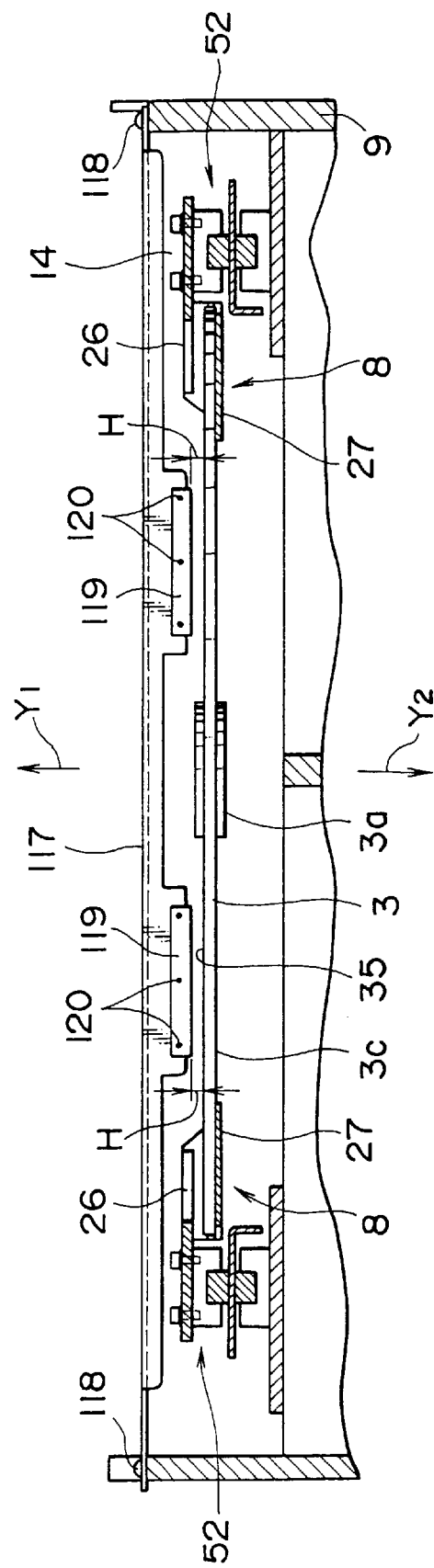
FIG. 44 is a partially cutaway side view taken on line F1—F1 of FIG. 43.

Structure for preventing the upward floating of a disc 3 supported flat in the carrier 9 by the hand 8 is described referring to FIG. 43 and FIG. 44.

On the carrier 9, for example, two horizontal parallel ceiling frames 117 is provided across a space above the hand 8 in Z1 and Z2 directions, both ends in the longitudinal direction of the ceiling frames 117 are screwed with a plurality of screws 118 on the carrier 9 so as that the ceiling frames spun both sides of a pair of right and left slide units 52 of the hand moving mechanism 14 described hereinbefore.

On the bottom of the ceiling frames 117, four disc brace 119 are fixed flat through adhesion or screwing with screws 120. The disc braces 119 are formed of elastic material such as rubber, and provided preferably at a certain height from the upper face 3f of the disc 3 held horizontally by the hand 8, the disc braces constituted with brush may contact continuously on the upper face 3f of the disc 3.

Accordingly, if, under unusual conditions such as emergency halt of high speed motion in Y1 direction of a disc 3 by the carrier 9 to happen to exceed the acceleration of gravity of the disc 3 or abnormal vibration of the carrier 9 during transferring of a disc 4 in Y1 or Y2 direction, when the disc 3 are about to float in Y1 direction from the four disc holder 27 of the hand 8, the disc 3 is pressed by four disc braces 119 toward Y2 direction. Thereby, a disc 3 is prevented from floating and falling down in Y1 direction from the four disc holders 27 of the hand 8.

Description of Drive Mounting Mechanism onto Drive Table

A drive mounting mechanism for mounting a disc drive 6 onto a drive table 12 shown in FIG. 14 is described referring to FIG. 45 to FIG. 50.

Figure 45:
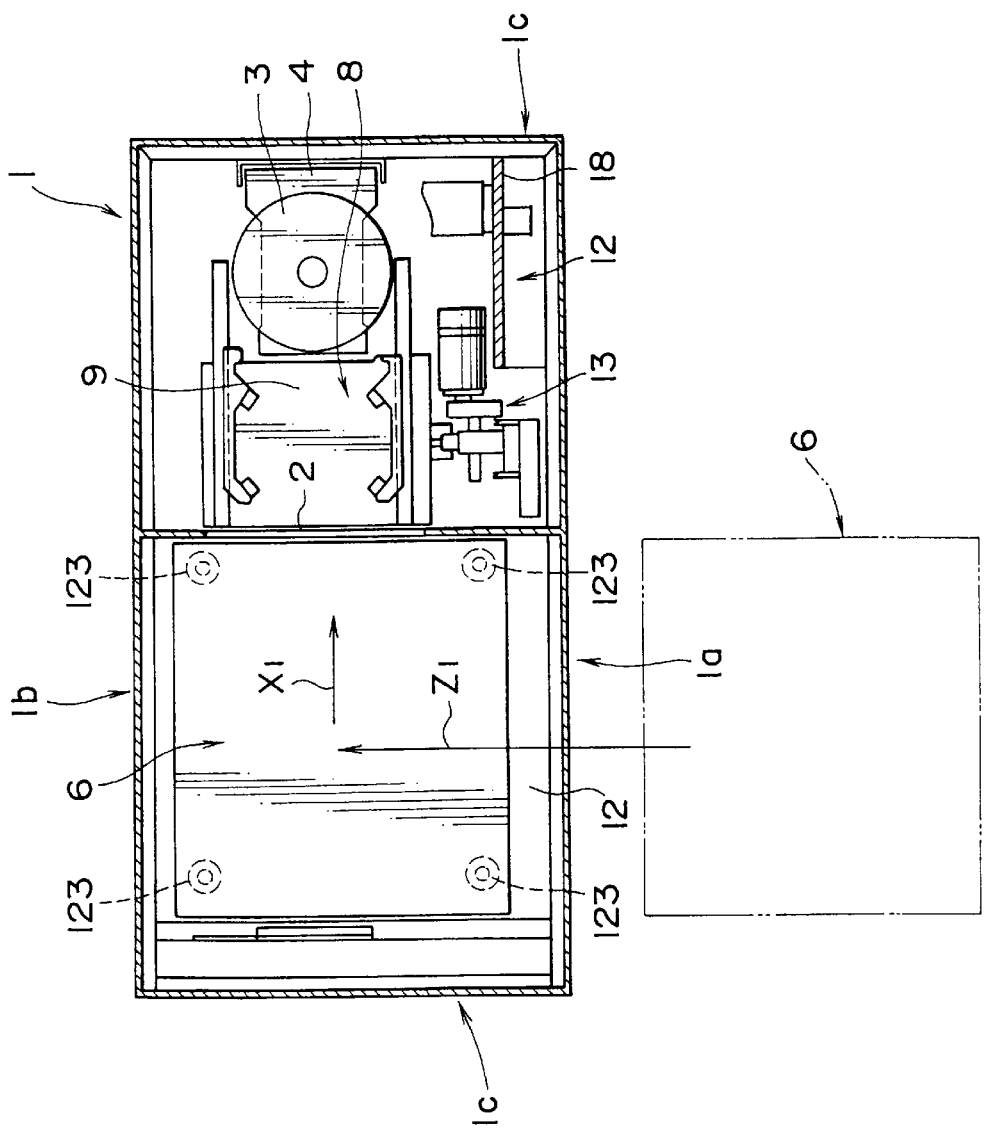
FIG. 45 is a partially cutaway top view of the whole disc changer for illustrating the mounting method for mounting a disc drive on a drive table.
Figure 46:
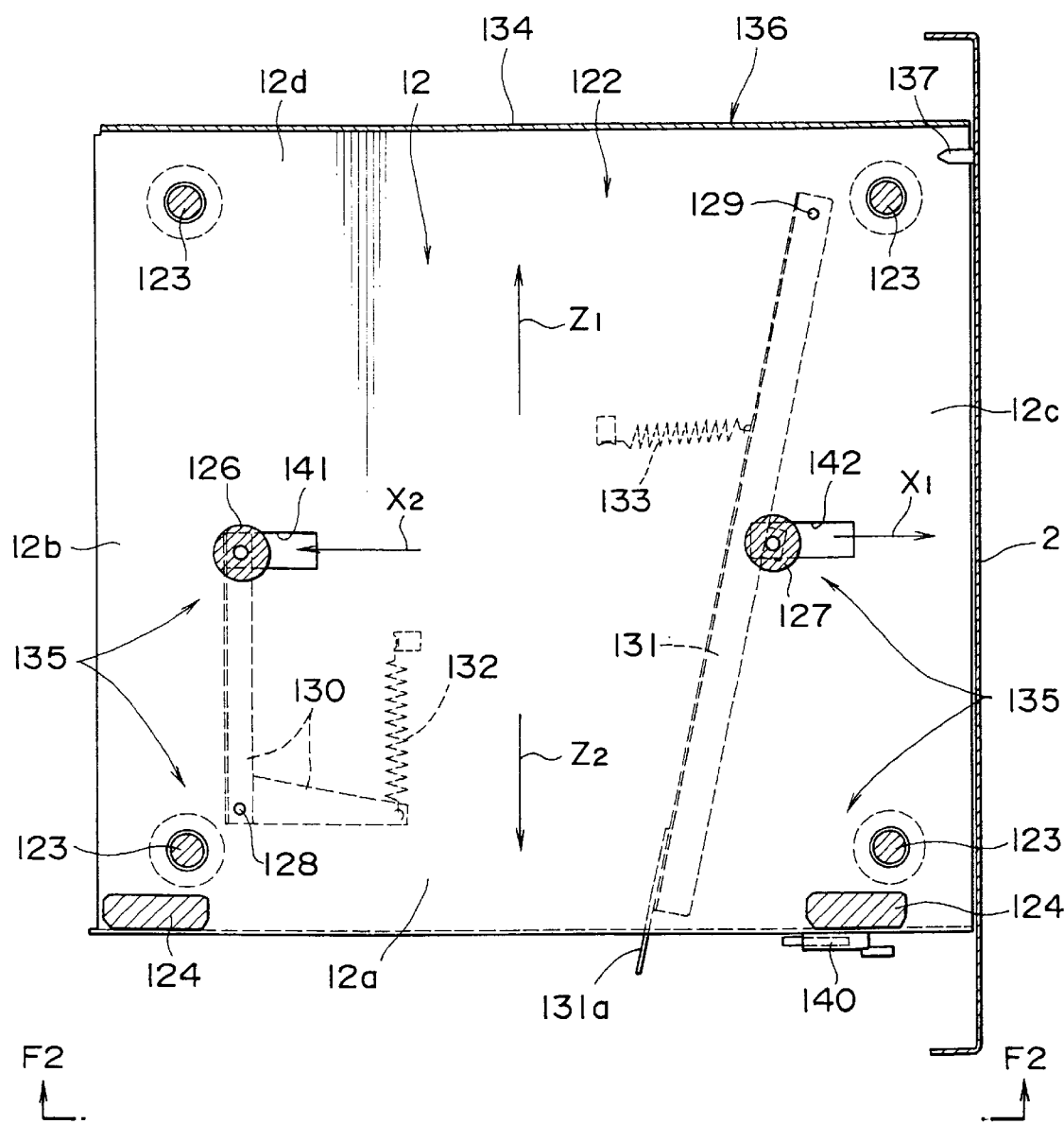
FIG. 46 is a partially cutaway top view for illustrating the mounting mechanism for mounting a disc drive on a drive table.

FIG. 45 illustrates the L-shaped mounting method of this drive mounting mechanism. A disc drive 6 is inserted from the front side 1a of the changer body 1 to the rear Z2 direction to place flat on the drive table 12, then, the disc drive 6 is slid on the drive table 12 toward the partition 2 side in X1 direction perpendicularly, and the disc drive 6 is positioned with positioning pins provided on the partition 2.

A drive sliding mechanism 122 for sliding a disc drive toward two directions, namely front and rear Z1 and Z2 directions and right and left X1 and X2 directions is described.

This drive sliding mechanism comprises four ball casters fixed on the four corners on the drive table 12, a pair of fixed guides 124 made of synthetic resin fixed on the Z2-end side 12a of the drive table 12 with interposition of a space, a pair of guide rails 125 with U-shaped vertical cross-section which are bend metal sheets mounted parallel each other with interposition of the same space as that of the pair of fixed guides 124 under the bottom side 6a of the disc drive 6 in parallel, a guide roller 126 provided around the center of the X2-side end 12b of on the drive table 12, a guide roller 127 provided around the center of the X1-side end 12c on the drive table 12, a pair of levers 130 and 131 provide under the drive table 12 for moving a pair of guide rollers 126 and 127 around fulcrum shafts 128 and 129 through holes 141 and 142 in X1 and X2 directions passing through holes 141 and 142, a pair of helical tension springs 132 and 133 which are position maintaining means for maintaining the position rotationally of the pair of levers 130 and 131 in X2 direction, and a guide wall 134 provided perpendicular to the partition 2 rising upward from the Z1-side end 12d on the drive table 12.

The pair of fixed guides 124, pair of guide rails 125, and pair of guide roller 126 and 127 constitute a guide mechanism 135 for guiding a disc drive 6 in Z1 and Z2 directions, and the guide wall constitutes a guide mechanism for guiding a disc drive 6 in X1 and X2 directions.

A positioning pin projecting horizontally in X2 direction horizontally in parallel to the front side 1a of the changer body 1 on the drive table 12 side at the Z1-side end of the partition 2. A pair of positioning plates 138 is mounted on both Z1 and Z2 side ends of the X1-side 6b of the disc drive 6, a positioning hole 139 which is to be inserted into the positioning pin 137 is formed on the Z1-side positioning plate 138. A lock mechanism 140 of latch type, which is locked by hooking the tip 131a of the lever 131 is mounted on the outside of the Z2 side end of the drive table 12.

Mounting operation of a disc drive 6 onto a drive table 12 is described.

Figure 47:
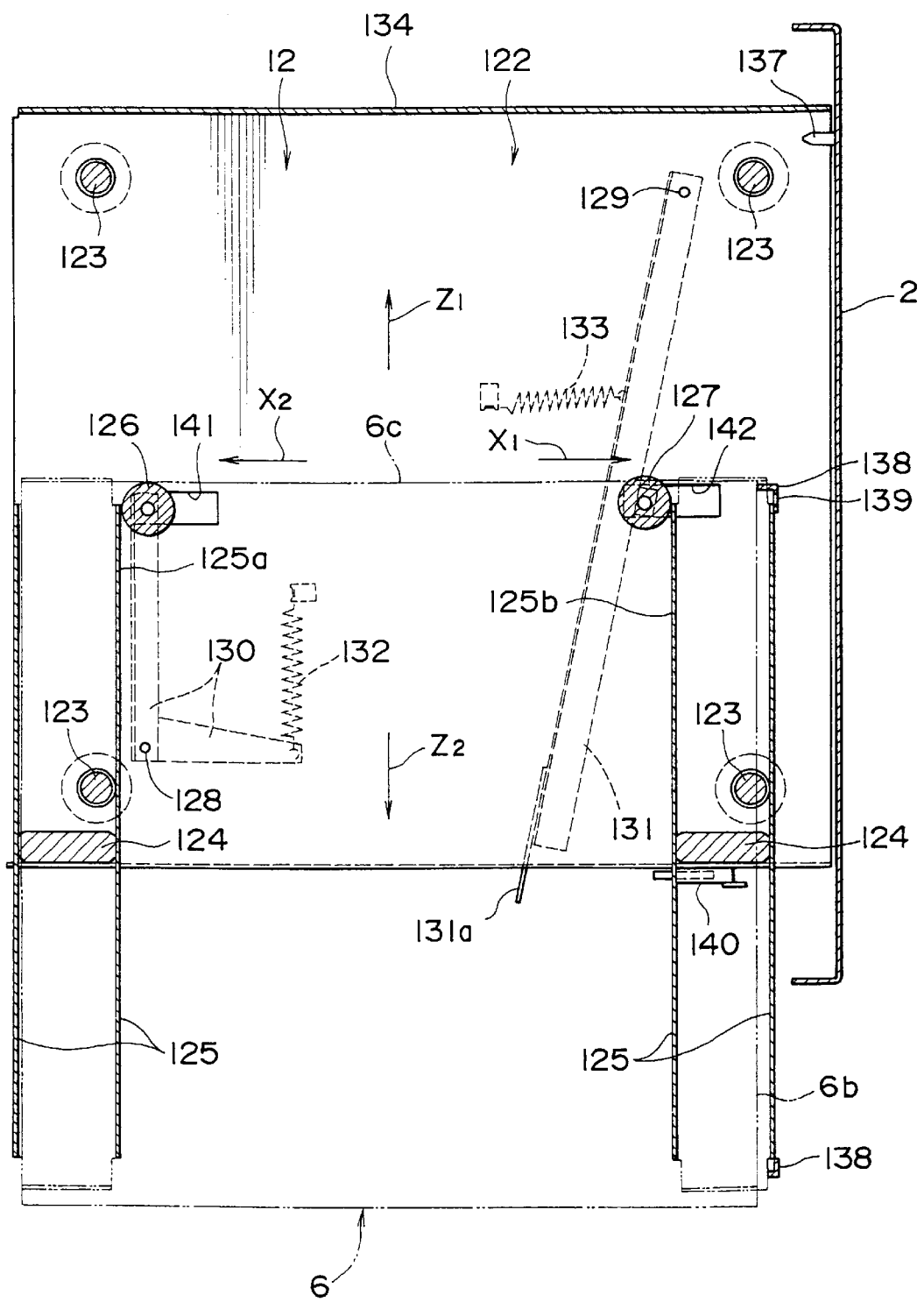
FIG. 47 is a partially cutaway top view for illustrating the starting of mounting operation for mounting a disc drive on a drive table.
Figure 50A:
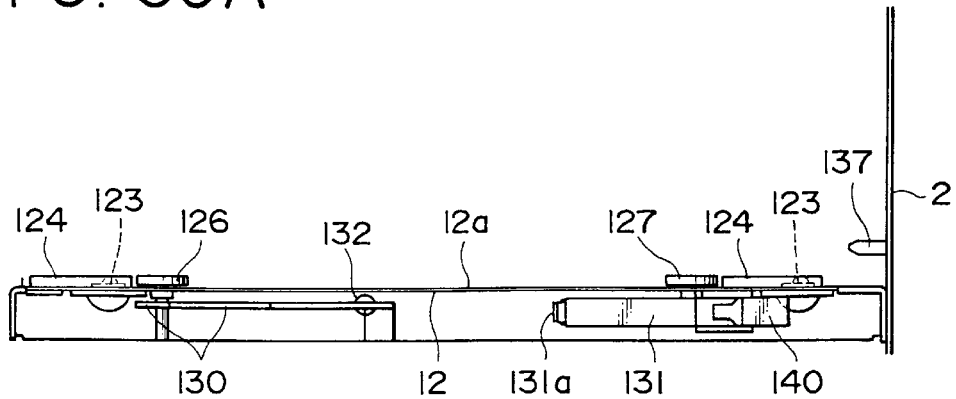
FIG. 50A is a top view taken on line F2—F2 of FIG. 46.
Figure 50B:
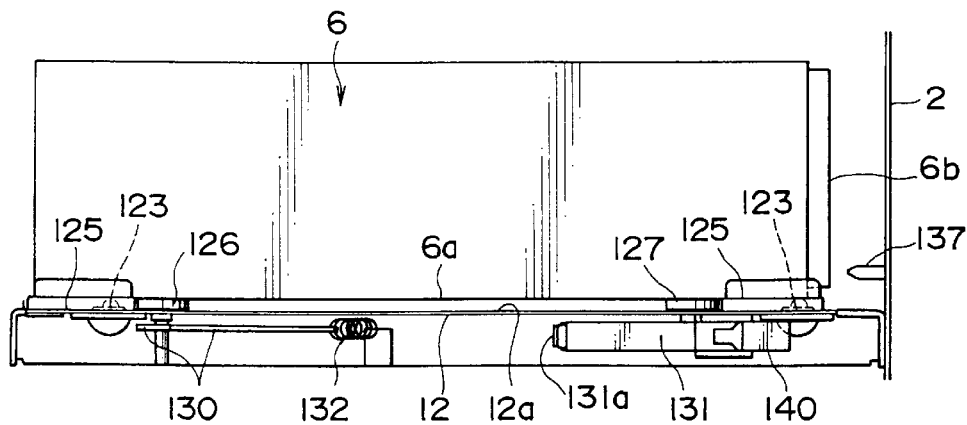
FIG. 50B is a front elevation view taken on line F3—F3 of FIG. 48.

As illustrated in FIG. 47 and FIG. 50B, a disc drive 6 is placed from Z1 direction on the end 12a of a drive table 12, a pair of guide rails 125 is inserted from the above on the pair of fixed guides 124, and the pair of guide rails 125 is placed on a pair of ball casters 123 of the end 12a side.

Figure 48:
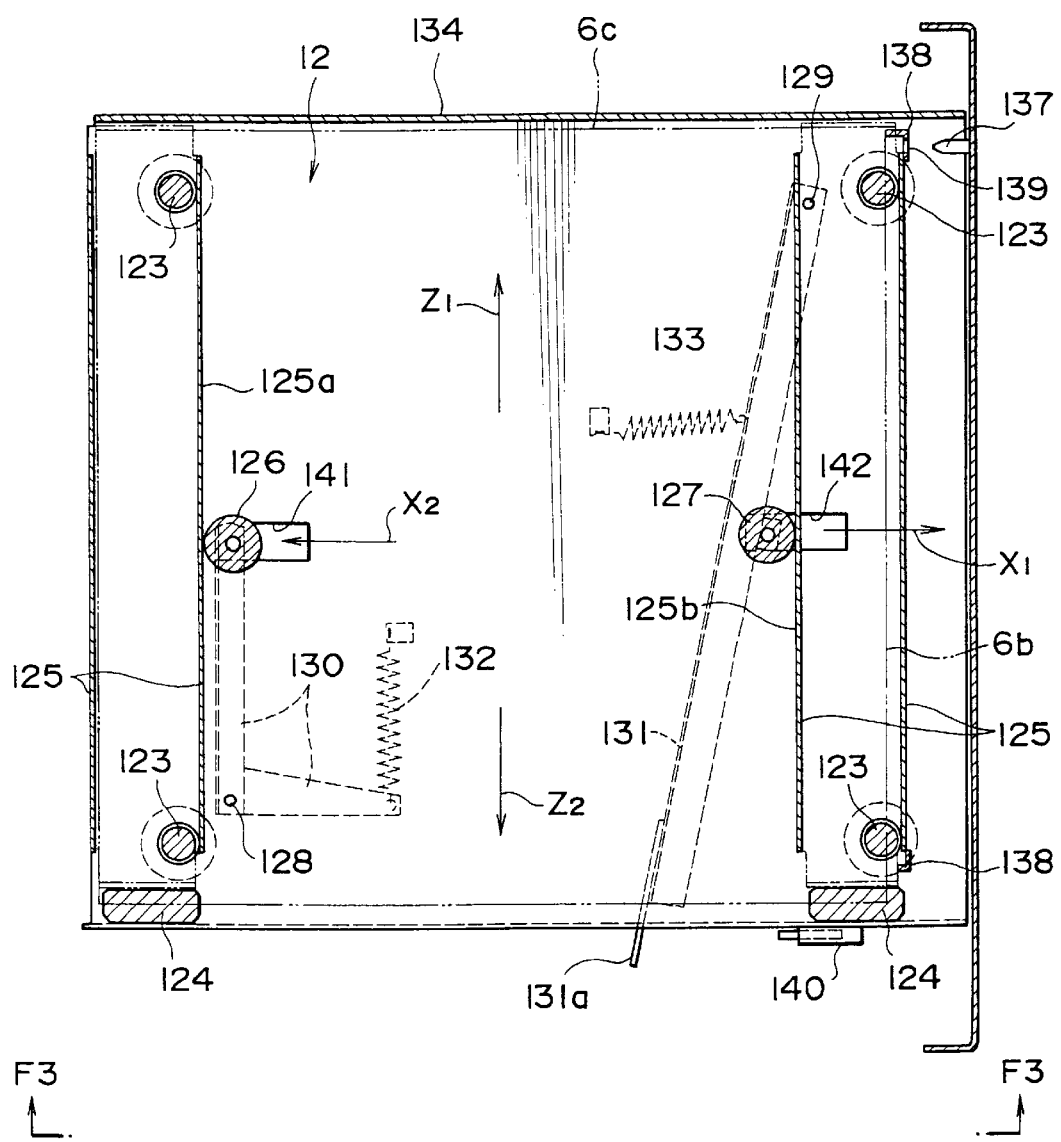
FIG. 48 is a partially cutaway top view for illustrating the operation on the way for mounting a disc drive on a drive table following FIG. 47.

Then as illustrated in FIG. 48, the pair of guide rails 125 is slid lightly on the pair of ball casters 123 utilizing rolling friction action of these ball casters 123, and thus the disc drive 6 is inserted horizontally in Z1 direction onto the drive table 12.

In this case, the pair of guide rails 125 is guided by the pair of fixed guides 124, and X1-side 125a of the X2-side guide rail 125 and X2-side 125b of the X1-side guide rail 125 are guided by the pair of guide rollers 126 and 127 which are forced in X2 direction by the pair of helical tension springs 132 and 133, and thus the disc drive 6 is inserted horizontally in Z1 direction on the drive table 12.

As illustrated in FIG. 48, when disc drive 6 is inserted completely from Z1 direction on the drive table 12, the Z1 and Z2-side ends of the pair of guide rails 125 are place completely on the four ball casters 123, the pair of fixed guides 124 are pulled out in Z2 direction from the Z2-side end of the pair of guide rails 125, also the Z1-side 6c of the disc drive 6 contacts on the guide wall 134 in parallel.

The setting shown in FIG. 48 is the mounting position, and in this position the pair of guide rails 125 is placed on the four ball casters 123, and the disc drive 6 is slid in two directions of Z2 direction and X1 and X2 directions on the drive table 12 smoothly through rolling friction action of these ball casters 123.

Figure 49:
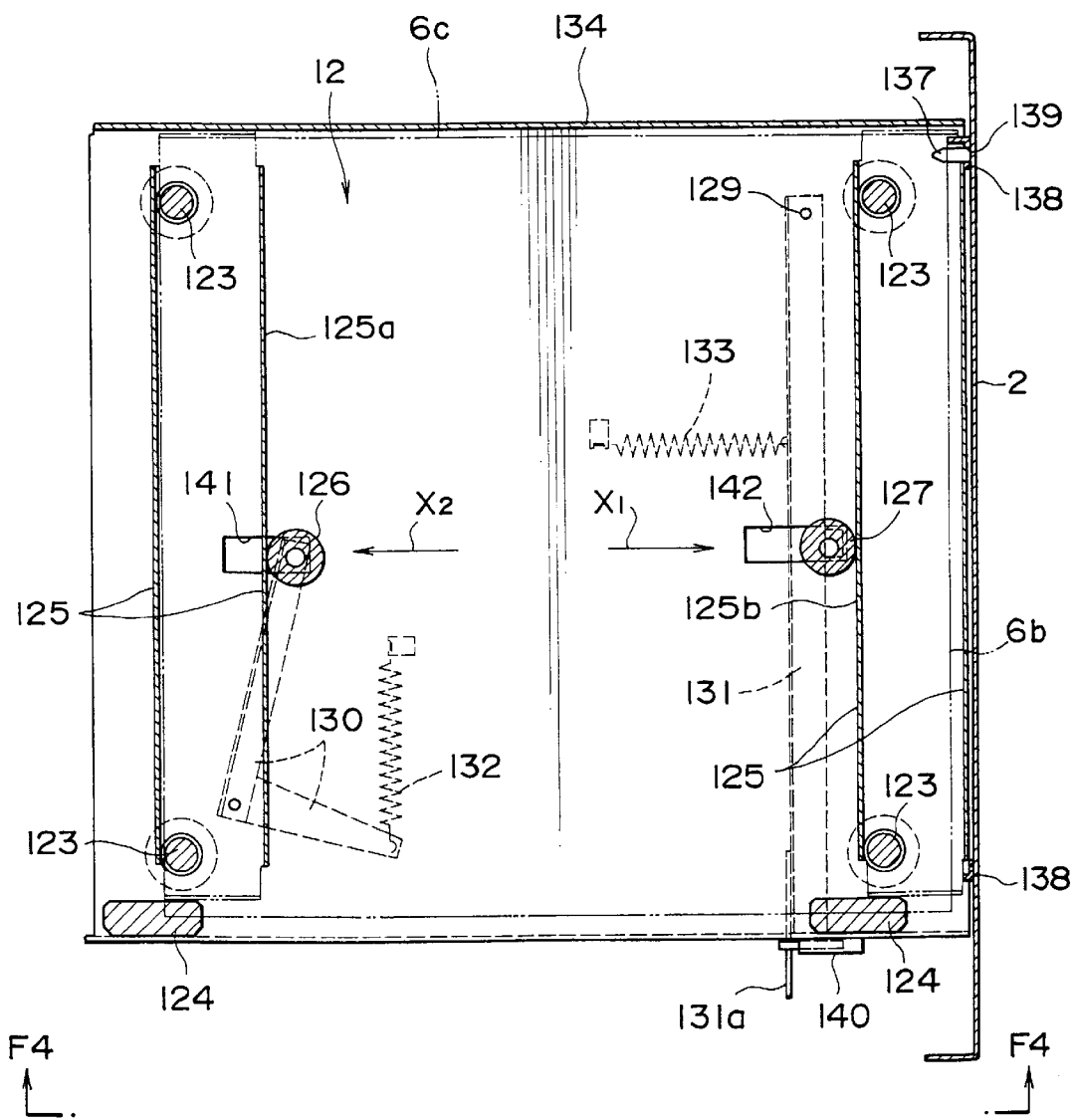
FIG. 49 is a partially cutaway top view for illustrating the finishing of operation for mounting a disc drive on a drive table following FIG. 48.
Figure 50C:
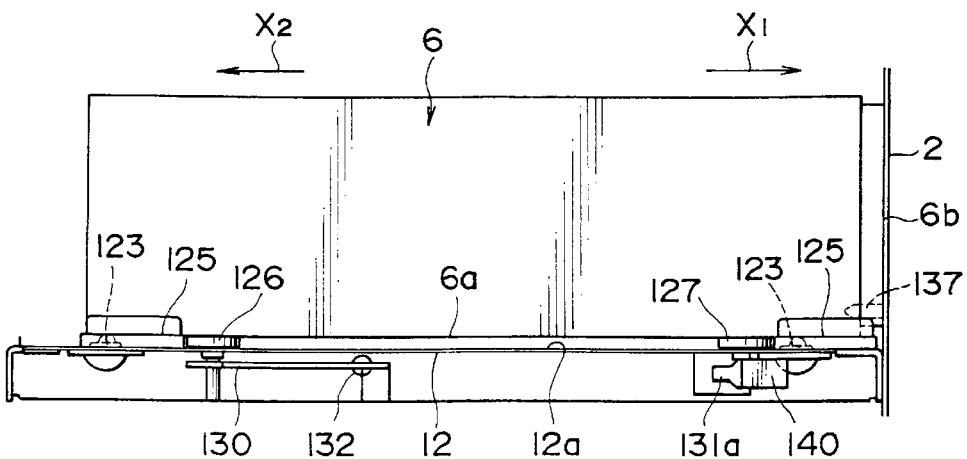
FIG. 50C is a front elevation view taken on line F4—F4 of FIG. 49.

Then, as illustrated in FIG. 49 and FIG. 50C, the lever 131 is rotated in X1 direction around the fulcrum 129 against the tension of the helical tension spring 133 with taking the tip 131a of the lever 131.

The guide roller 127 pushes in X1 direction the portion around the center in the Z1 and Z2 directions of the X2-side 125b of the X1-side guide rail 125, the disc drive 6 is slid lightly in X1 direction in parallel to the guide wall 134, the pair of positioning plates 138 contacts on the partition 2 from X1 direction, the positioning hole 139 of one positioning plate 138 is inserted to the positioning pin 137 from X1 direction, the disc drive 6 is positioned accurately at the standard position on the drive table 12. In this case, the guide roller 126 is released in X1 direction against the helical tension spring 132.

By locking the tip 131a of the lever 131 with the lock mechanism 140, the disc drive 6 is fixed on the drive table 12 completely, the mounting operation of a disc drive 6 on a drive table 12 is finished.

The setting shown in FIG. 49 and FIG. 50C is the positioning position, when a disc drive 6 is taken out from the drive table 12, the locking of the lever 131 with the lock mechanism 140 is released to return the pressing roller 127 in X2 direction with aid of the helical tension spring 133. The disc drive 6 is slid in X2 direction on the four ball casters 123 along the guide wall 134 to the mounting position illustrated in FIG. 48. In this case, the mounting position of the disc drive 6 is set utilizing the guide roller 127 as a stopper, and the pair of guide rails 125 is positioned at the same phase as the pair of fixed guides 124. Then, the disc drive 6 is withdrawn in Z2 direction from the drive table 12 freely.

By using a drive mounting mechanism structured as described herein above, only putting on a heavy disc drive 6 on a drive sliding mechanism 122 on a drive table 12 allows the disc drive 6 to be slid in Z1 and Z2 directions and X1 and X2 directions very easily.

Accordingly, the mounting operation of a disc drive 6 on a drive table 12 and the positioning operation of a disc drive 6 using positioning pin 137 are conducted very easily. In this case, after insertion of the disc drive 6 in Z1 direction on the drive table 12 from the front side 1a of the changer body 1, the disc drive 6 is slid perpendicular X1 direction to be inserted in the horizontal positioning pin 137 from X1 direction, the disc drive 6 is slid in L-shaped, thereby, even when a plurality of changer bodies 1 are installed side 1c by side 1c, a disc drive 6 is mounted or taken out for the front side 1a of the changer bodies 1. Accordingly, the maintenance of the disc drive 6 is easy.

In this embodiment, the positioning hole 139 of the disc drive 6 is inserted for positioning to the positioning pin 137 fixed on the partition 2 from X1 direction, but reversely, the positioning pin 137 fixed on the disc drive 6 may be inserted for positioning in the positioning hole 139 from X1 direction. This drive mounting mechanism is also adopted to a mounting device for mounting a disc-in-out port 7 on a drive table 12.

Description of Disc-in-out Port

A disc-in-out port 7 is described referring to FIG. 51 to FIG. 56.

Figure 51:
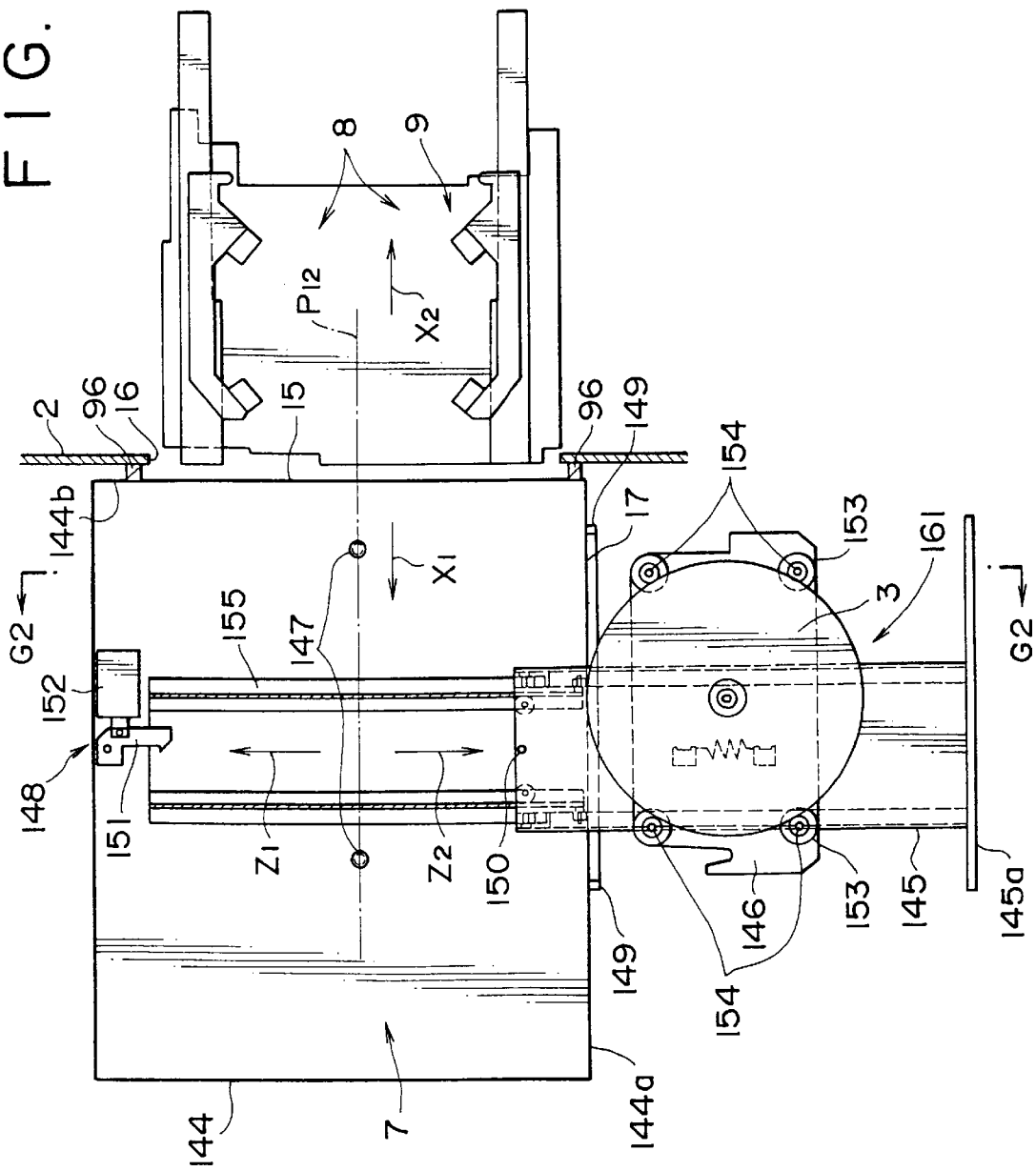
FIG. 51 is a partially cutaway top view for illustrating the withdrawing of the disc tray of the disc-in-out port.

As illustrated in FIG. 51 to FIG. 53, the disc-in-out port 7 is contained in the internal of the dust proofing box 144 which is structured air-tight. The front side 144a is facing to the front side of the changer body 1, and the tray gate 17 is provided on the front side 144a. The disc gate 15 provided on the partition 2-side 144b of the dust proofing box 144 is connected to the connecting gate 16 of the partition 2 with interposition of dust proofing material 96 air-tightly in the same manner as described in FIG. 33 and FIG. 34 for a disc drive 6.

For the disc-in-out port 7, a slide type disc tray 145 which is transferred horizontally in front rear Z1 and Z2 directions by a tray sliding mechanism 155 described hereinafter is used. As illustrated in FIG. 51 and FIG. 53A, an operator withdraws a disc tray 145 from the internal of the disc-in-out port 7 in Z2 direction through the tray gate 17 and places flat a disc 3 on the disc support 145 on the disc tray 145, subsequently, as illustrated in FIG. 52B and FIG. 53B, an operator inserts the disc tray 145 in the internal of the disc-in-out port 7 in Z1 direction, thus the disc 3 is set flat in the disc-in-out port 7.

In this case, the disc support 146 on the disc tray 145 is positioned at the prescribed position in the disc-in-out port 7 by the pair of positioning pins 147 with aid of a limiter mechanism 161, the disc 3 is positioned at the center P12 of the hand 8 on the carrier 9, and the disc tray 145 is locked by the electro-magnetic lock mechanism 148 utilizing plunger solenoid.

Afterwards, the hand 8 on the carrier 9 is inserted horizontally in X1 direction into the disc-in-out port 7 through the connecting gate 16 and disc gate 15, and the disc 3 on the disc support 146 of the disc tray 145 is taken out in X2 direction to the carrier 9.

Figures 52A, 52B:
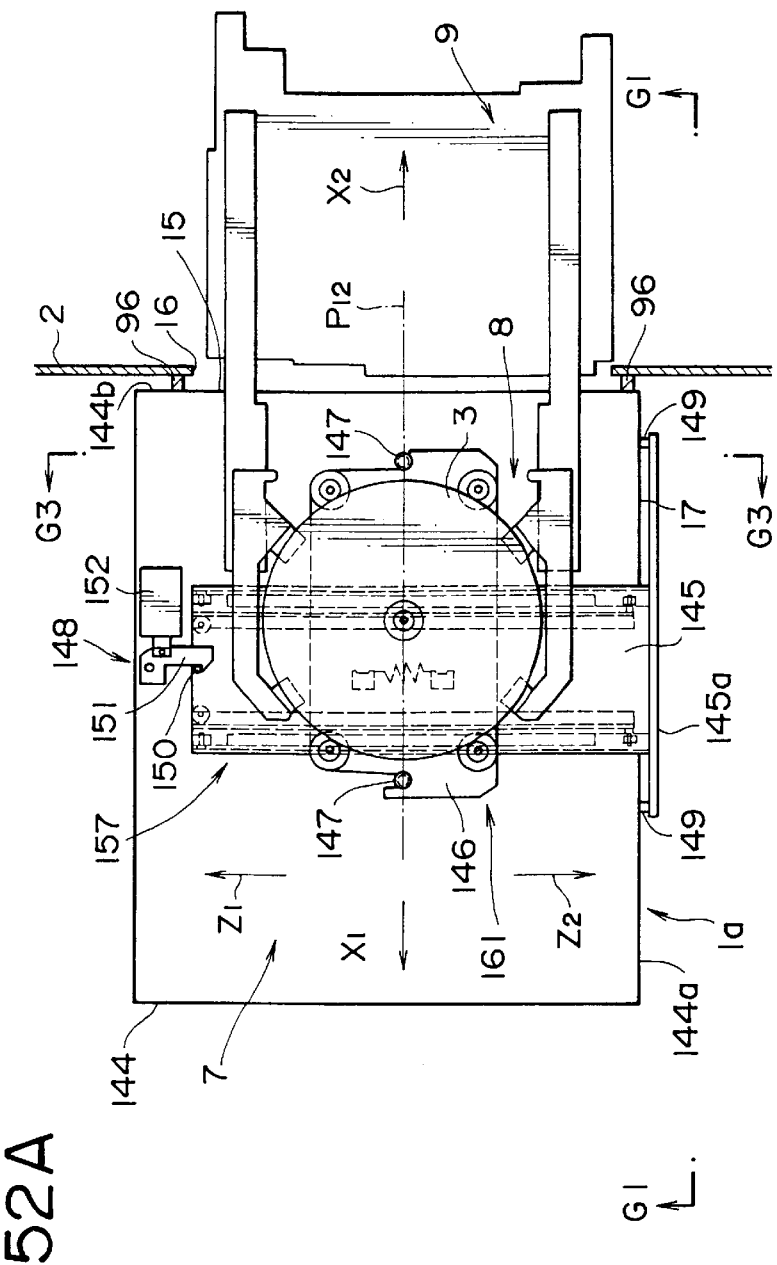
FIG. 52A is a partially cutaway top view for illustrating the insertion of the disc tray of the disc-in-out port.
FIG. 52B is a side view taken on line G1—G1 of FIG. 52A.

As illustrated in FIG. 52A and 53A, when the disc tray 145 is inserted in Z1 direction into the dust proofing box 144 and locked by the electromagnetic lock mechanism 148, the front panel 145a of the disc tray 145 is pressed to Z1 direction on the rectangular ring dust proofing member 149 (the same dust proofing material 96 as used in FIG. 33 and FIG. 24 is used) provided along the periphery of the tray gate 17, and thus the tray gate 17 is sealed air-tightly.

Accordingly, when the disc 3 is set in the disc-in-out port 7 by the disc tray 145, the internal of the disc-in-out port 7 is completely sealed, and this sealing is the same condition as described in FIG. 17 and FIG. 18 in which the sealed area 33 in the internal of a changer body 1 is connected air-tightly.

For excluding a disc 3 on a disc rack board 4 in the changer body 1 to the outside of the changer body 1, the disc 3 taken out form the disc rack board 4 by the hand 8 and carrier 9 is excluded in X1 direction on the disc tray 145 in the disc-in-out port 7, and the disc 3 is excluded in Z2 direction to the outside of the disc-in-out port 7 by the disc tray 145.

Accordingly, by using this disc-in-out port 7, even in service of the disc changer, a disc 3 is charged and discharged safely and freely from or to the outside of the changer body 1 to or from a disc rack board in the changer body 1.

The electro-magnetic lock mechanism 148 comprises a lock lever 151 engaged automatically with a locking pin 150 fixed on the Z1-side end of the disc tray 145 by spring means, and a plunger solenoid 152 for locking the lock lever 151 and the locking pin 150 in locked condition.

The electromagnetic lock mechanism 148 prevents a disc tray 145 from happening to jump out to X2 direction outside the disc-in-out port 7, and prevents a disc tray 145 from happening to slide in Z1 and Z2 directions during transferring of a disc 3 in X1 and X2 directions between the disc-in-out port 7 and carrier 9 by the hand 8.

The tray gate 17 has a size slightly larger than the outside diameter of a disc 3, therefore, a human hand can not be inserted in the disc-in-out port 7 from the tray gate 17. Such structure prevents a human hand from touching on servo systems such as the carrier 9 and hand 8.

Figure 54:
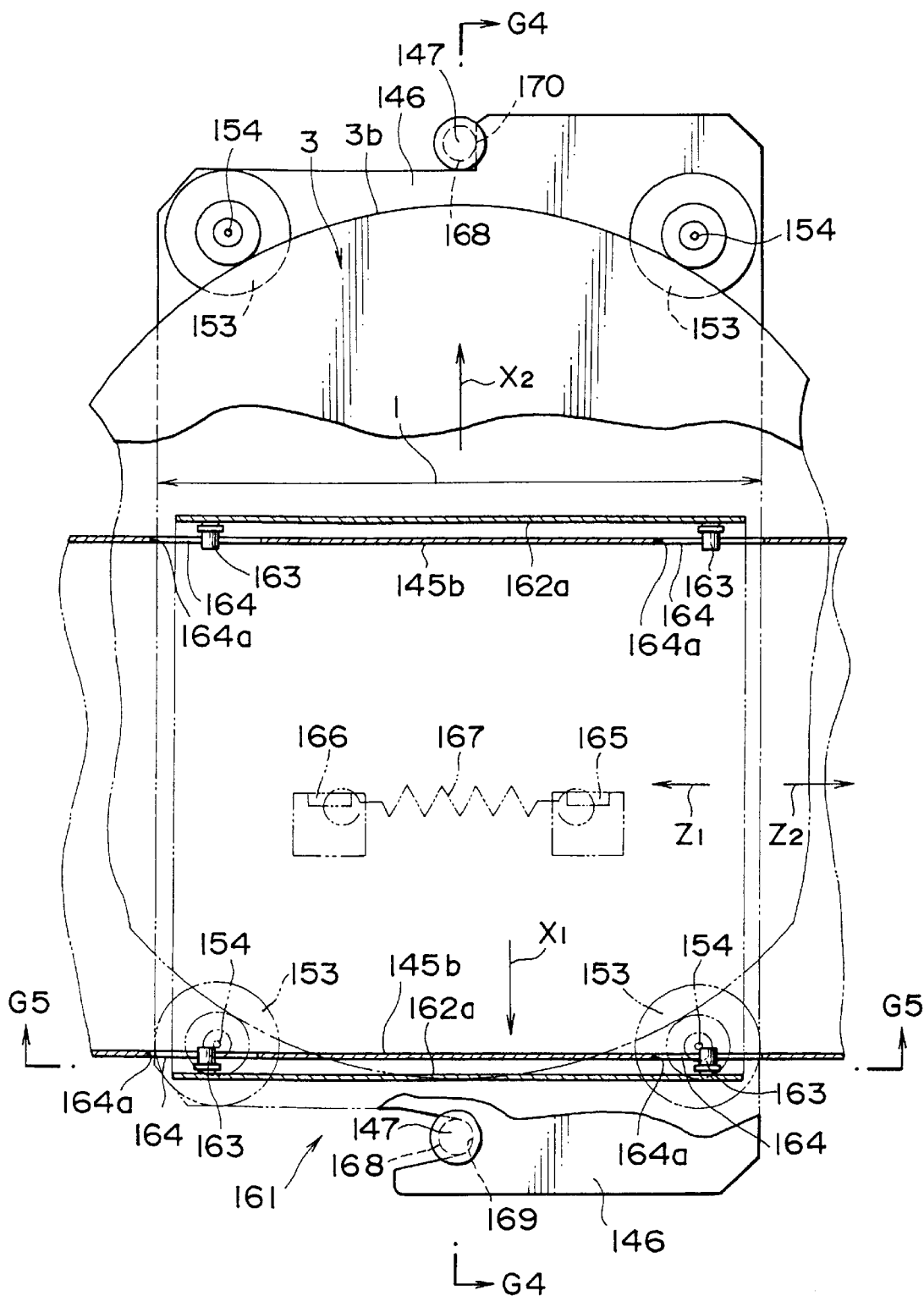
FIG. 54 is a top view for illustrating the limiter mechanism of the disc tray of the disc-in-out port.
Figure 55:
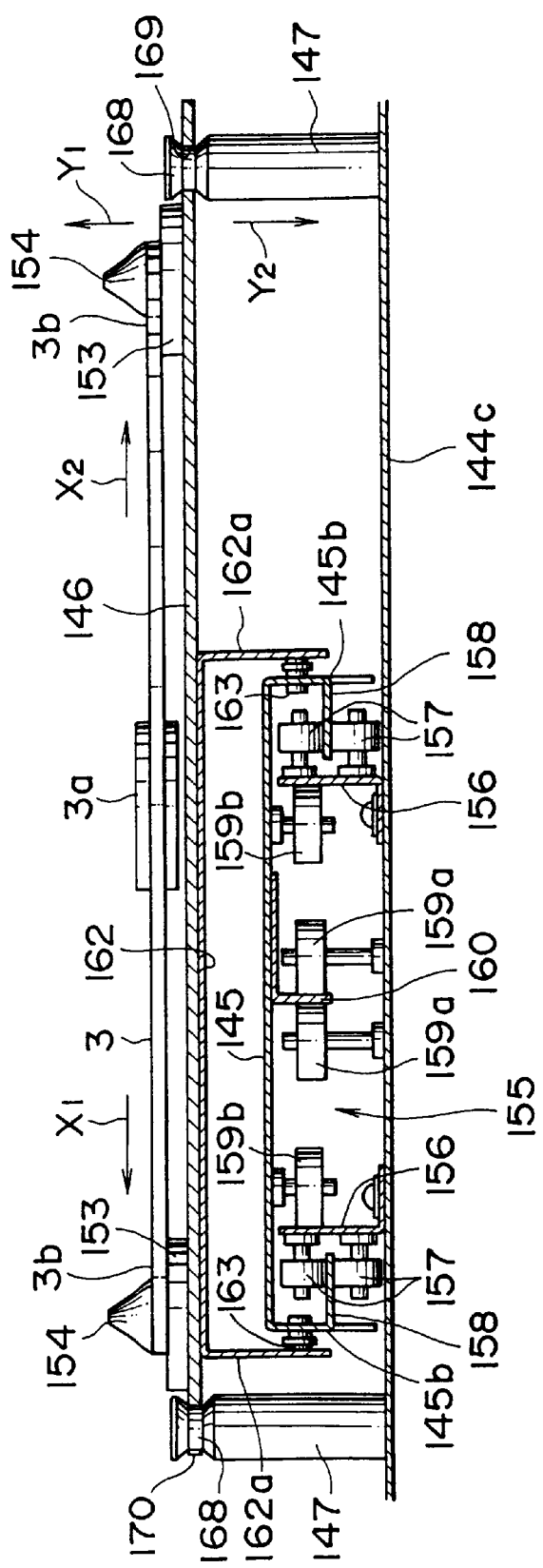
FIG. 55 is a partially cutaway side view taken on line G4—G4 of FIG. 54.
Figure 56:
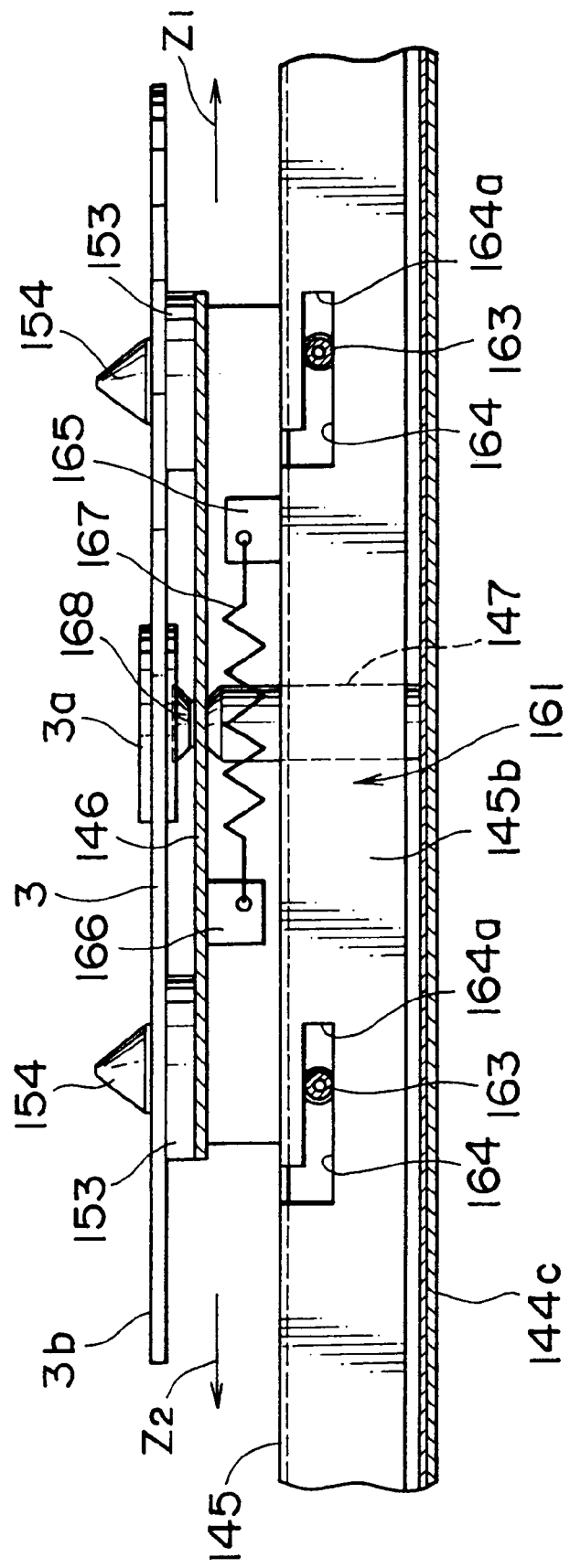
FIG. 56 is a partially cutaway side view taken on line G5—G5 of FIG. 54.

A Disc Tray 145 is Described in Detail Referring to FIG. 54 to FIG. 56

Figure 8:
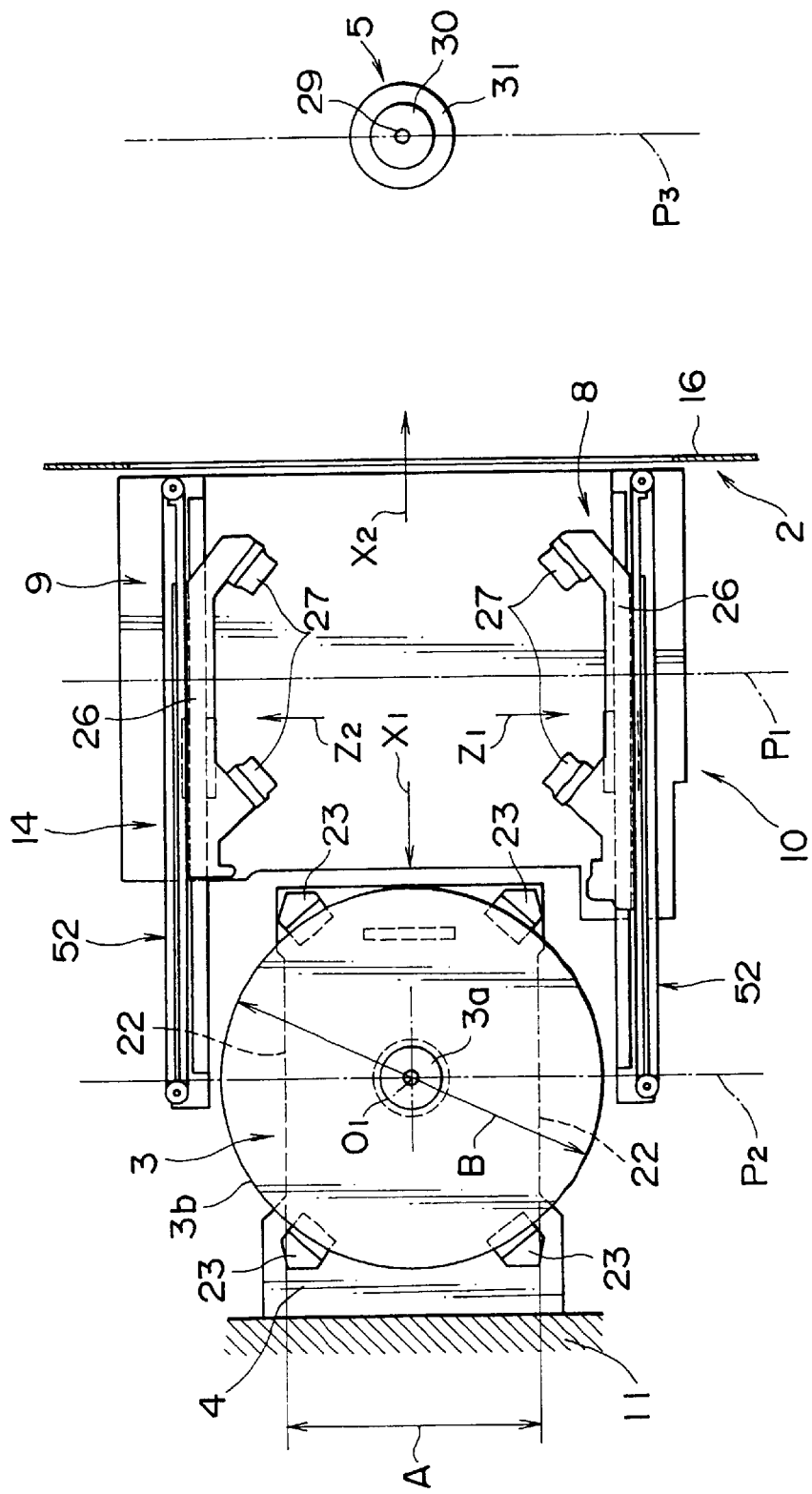
FIG. 8 is a top view of FIG. 1.

As illustrated in FIG. 54 to FIG. 56, a disc table 146 comprises a rectangular flat plate with a width I approximately the same as the width A of a disc rack board 4 shown in FIG. 8. At the four corners of a disc table 146, circular disc supports 153 are fixed, and at each center of these disc supports 153 a centering guide 154 having a sharp tip of circular cone-shaped is fixed respectively. The periphery 3b of a disc 3 is put on the inside of the four centering guides 154 to be centered, and the disc is settled horizontally on the four disc supports 153.

The disc support is formed in a tapered shape inclining downward toward the center of a disc 3, illustration is omitted, this configuration functions to center a disc 3 and also functions to prevent the recording surface 3e on the bottom side 3c of the disc 3 from damaged.

Then, as illustrated in FIG. 55, a tray sliding mechanism 155 for sliding a disc tray 145 into or from the disc-in-out port 7 with a long stroke in Z1 and Z2 directions comprises a pair of right and left vertical guide rails 156 fixed in parallel to Z1 and Z2 directions with interposition of a space in X1 and X2 directions on the bottom 144c in a dust proofing box 144, a pair of horizontal guide rollers provided adjacent vertically on the outside of these a pair of right and left guide rails 156 with interposition of a certain space in Z1 and Z2 directions, horizontal guide rails 158, which are guided horizontally between the horizontal rollers 157 provided vertically adjacent each other, and which are bends bending inward horizontally from the bottom end of both X1 and X2 sides 145b of the disc tray 145, a vertical guide 160 in parallel to Z1 and Z2 directions fixed on the bottom side of the disc tray 145 at the center in X1 and X2 directions, right and left two vertical guide rollers 159a for guiding the vertical guide rail 160, which vertical guide rollers 159a are provided on right and left both sides of the vertical guide rail 160 on the bottom 144c with interposition of a certain space in Z1 and Z2 directions, and right and left two vertical guide rollers 159b, which guide the insides of the pair of right and left vertical guide rails 156, and which are fixed on the bottom side of the disc tray 145 with contact on the inside of a pair of right and left vertical guide rails with interposition of a certain space in Z1 and Z2 directions.

Accordingly by using this tray sliding mechanism 154, a disc tray 154 is slid without vibration and rattling, and a disc tray 154 is slid in Z1 and Z2 directions stably with a long stroke.

As illustrated in FIG. 54 to FIG. 56, a limiter mechanism 161 has a structure in which a disc table 146 is fixed horizontally on sliding table 164 with a reversed U-shaped vertical cross-section, four guide rollers 163 are provided on the inside of vertical right and left side plates 162a of the sliding table 162 with interposition of a certain space in Z1 and Z2 directions, four guide grooves 164 are formed on right and left both sides 145b of the disc tray 145 with interposition of a certain space in Z1 and Z2 directions, and the four guide rollers 163 are inserted slidably in Z1 and Z2 directions in the four guide grooves 164. The disc table 146 is supported at a certain height with the slide table 162 above the disc tray 145, the disc table 146 is assembled slidably combined with the sliding table 162 in the range (within the range of length of the guide groove 164) in Z1 and Z2 directions. A limiter spring 167 consisting of a tension spring is attached between a pair of spring stoppers 165 and 166 formed solidly on the top side of the disc tray 145 and the bottom side of the sliding table 162, the disc table 146 is forced in Z1 direction slidingly onto the disc tray 145, and the four guide rollers 163 are positioned at Z1-side end 164 of the four guide grooves 164.

The pair of positioning pins 147 are planted vertically on the bottom 144c of the dust proofing box 144 at both X1 and X2 sides of the disc tray 145, and a tapered groove 168 is formed at the top of these pair of positioning pins. At both X1 and X2-side ends of the disc table 146, a V-shaped groove 169, which is engaged to contact from Z1 direction to the tapered groove 168, and step 170 are formed.

Accordingly, by using this limiter mechanism 161, as illustrated in FIG. 52 and FIG. 53, the disc tray 145 is inserted from Z1 direction in the disc-in-out port 7, just before the locking pin 150 is locked with the electromagnetic lock mechanism 148 the V-shaped groove 169 of the disc table 146 and the step 170 are engaged with pressure against the limiter spring 167 from Z1 direction in the tapered groove 168 of the pair of positioning pin 147 as illustrated in FIG. 54 and FIG. 53. The disc table 146 is positioned accurately for X1 and X2 directions, Y1 and Y2 directions, and Z1 and Z2 directions, and a disc 3 is positioned accurately on the center P12 of the hand 8.

Immediately afterwards, the disc tray 145 is slightly slid in Z1 direction to the disc table 146 against the limiter spring 167, and the locking pin 150 is locked with the electromagnetic lock mechanism 148. The disc table 146 is maintained forced from Z1 direction against the pair of positioning pin 148.

Accordingly by using this disc-in-out port 7, the long sliding stroke of the disc tray 145 using the tray sliding mechanism 155 allows a disc 3 to be charged or discharged easily, and also the pair of positioning pins 147 and the limiter mechanism 168 allow a disc to be positioned accurately at the center P12 of the hand 8, thus a disc 3 is transferred smoothly in X1 and X2 directions between the disc-in-out port 7 and the carrier 9 by the hand 8.

Figure 70:
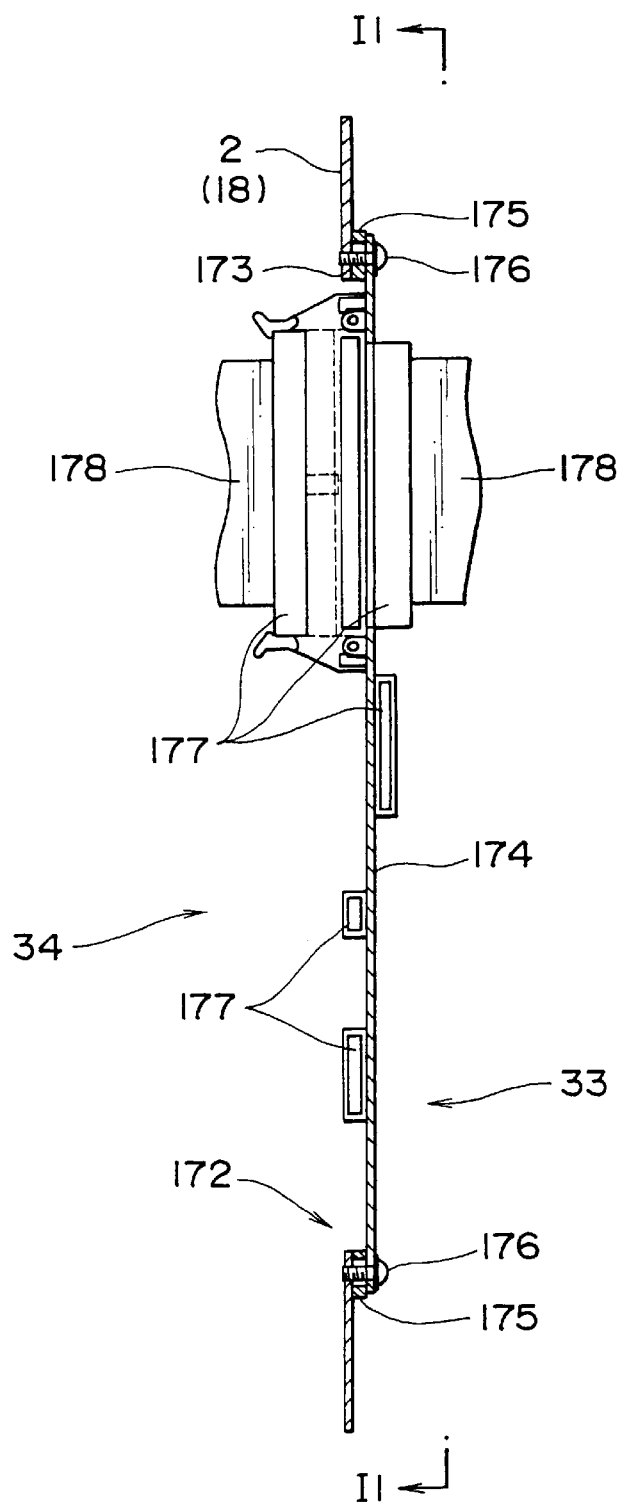
FIG. 70 is a partially cutaway top view for illustrating the sealed structure of the cable insertion through the partition of the disc changer.
Figure 71:
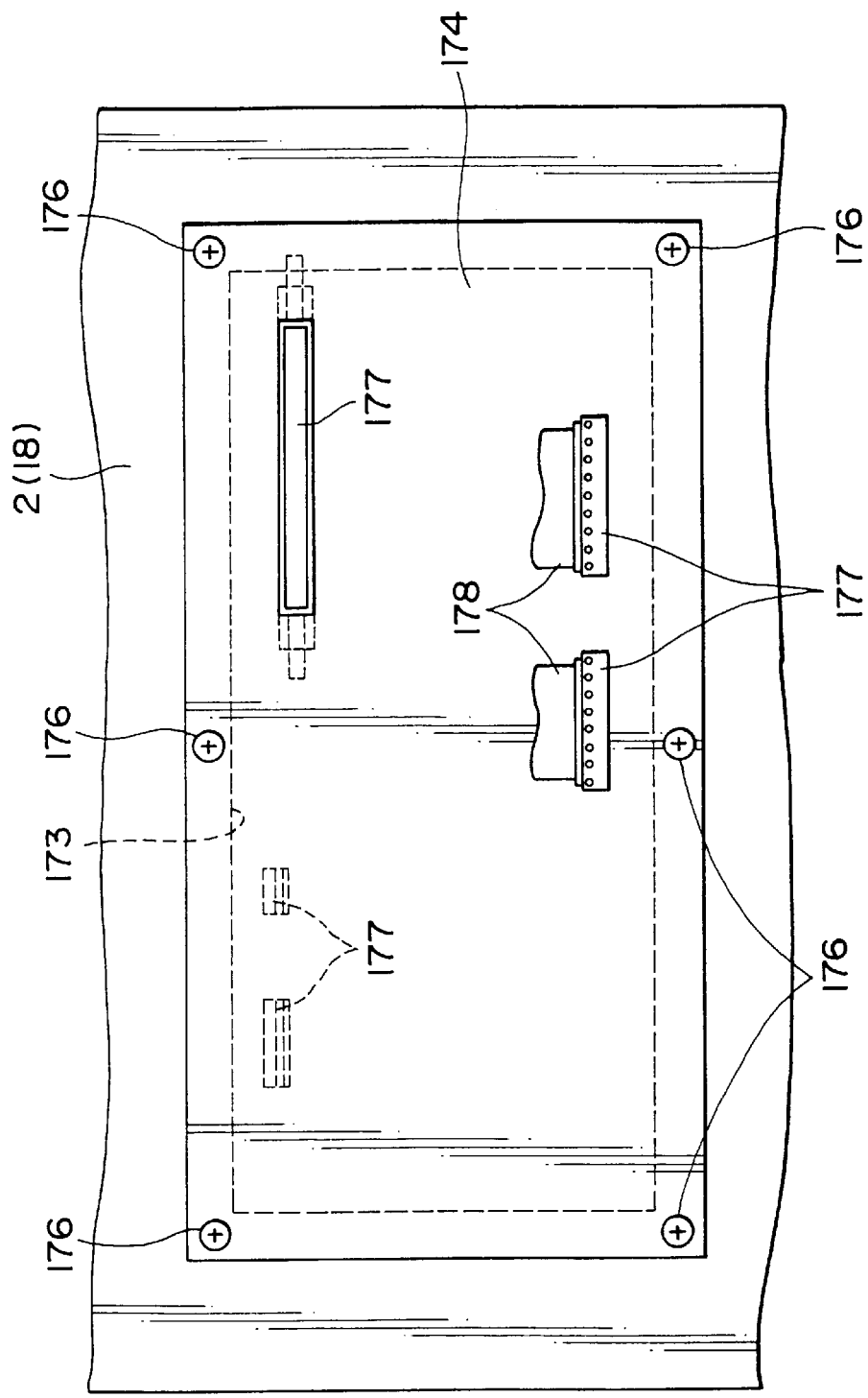
FIG. 71 is a side view taken on line I1—I1 of FIG. 70.

Description of Sealed Structure of Cable Insertion on the Partition of a Changer Body The sealed structure of cable insertion on the partition 2 of a changer body 1 is described referring to FIG. 70 and FIG. 71.

As illustrated in FIG. 17 and FIG. 18, the internal of the changer body 1 of this disc changer is divided to the sealed area 33 and unsealed area 34 with the partition 2. hen a cable 178 is to be connected between the internal of the sealed area 33 and unsealed area 34 through the partition 2 and 18, the insertion may cause a dust proofing problem in the sealed area.

As illustrated in FIG. 70 and FIG. 71, an opening 173 is provided at the cable insertion 172 on the partitions 2 and 18, the opening 173 is sealed with a connector base plate 174 and dust proofing material 175, which connector base plate 174 and dust proofing material 175 are secured on the partitions 2 and 18 with a plurality of screws 176. The connector insertion 172 of the sealed area 33 is easily maintained dust proofing by structuring the connection in which a plurality of connectors 177 is provided on the connector base plate 174 on both sealed area 33 and unsealed area 34 sides of the connector base plate 174, and a plurality of cables are connected to the connectors 177. This connector base plate 174 is provided in the position, for example, shown in FIG. 16.

Description of a Controlling Circuit of the Carrier and Hand of a Disc Changer

Figure 72:
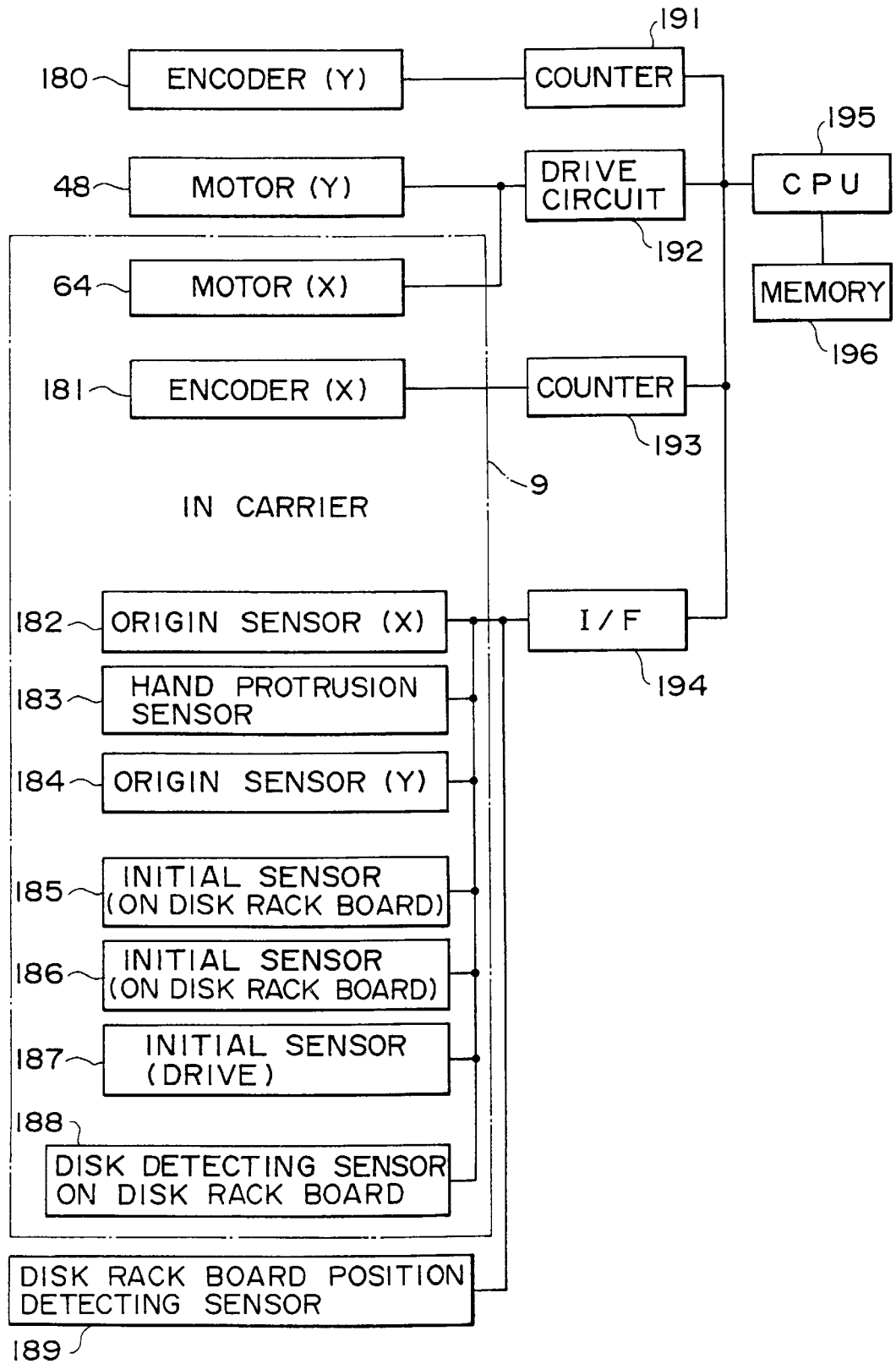
FIG. 72 is a block diagram for describing the control circuit for controlling the carrier and the hand of the disc changer.

A controlling circuit of the carrier 9 and the hand 8 of a disc changer is described referring to FIG. 72.

The drive circuit 192 of the motor 48 for driving the carrier in Y direction and of the motor 64 for driving the hand 8 in X direction is controlled by the CPU 195, which is a centralized controlling circuit. Output pulse from the encoder 180 for measuring the moved distance in Y direction of the carrier 9 and the encoder 181 for measuring the moved distance in X direction of the hand 8 is counted by the counter 191 and 193, and subsequently supplied to the CPU 195.

In the carrier 9, the hand origin sensor 182 for detecting the origin of the hand 8, the hand protrusion sensor 183 for detecting protrusion of the hand 8 from the internal of the carrier 9 to the disc rack board 4 side, disc drive 6 side, and disc-in-out port side, the carrier origin sensor 184 for detecting the origin of the carrier 9, a pair of top bottom initial sensors 185 for detecting the position in Y direction of a disc rack board 4, the initial sensor 187 for detecting the position of a disc drive 6 and the disc-in-out port 7 in Y direction, the disc detection sensor 188 for detection the existence of a disc 3 on the disc rack board, and the disc board detecting sensor for detecting the position of a disc rack board 4 in X direction. Output from these sensors 182 to 189 is supplied to the CPU 195 through the interface 194.

The CPU 195 supplies the moved distance of carrier 9 in Y direction and the moved distance of the hand 8 in X direction measured by the encoders 180 and 181 to the memory circuit 196, the data are stored in the memory 196. The CPU controls the drive circuit 192 responding to the detected information from the sensors 182 to 189, and the detected information from sensors 182 to 189 is supplied to the memory circuit 196.

The encoder 180 for measuring the moved distance of the carrier 9 in Y direction is constituted of an encoder combined with the motor 48 as illustrated in FIG. 23.

The encoder 181 for measuring the moved distance of the hand 8 in X direction is constituted of an encoder combined with the motor 64 as illustrated in FIG. 25.

The hand origin sensor 182 for detecting the origin of the hand 8 is mounted on the carrier 9 as illustrated in FIG. 25 and FIG. 27, and constituted of a light transmission sensor which detects the shutting of light by the shutter plate 198 combined with the slide plate 56 of the slide unit 52.

The hand protrusion sensor 183 is mounted on the carrier 9 as illustrated in FIG. 25 and FIG. 27, and constituted of a light transmission sensor which detects both X1 and X2-side ends of the shutter plate 198 in cooperation with the hand origin sensor 182.

The carrier origin sensor 184 for detecting the origin of the carrier 9 in Y direction is mounted on the carrier 9 as illustrated in FIG. 14 and 25, and constituted of a light transmission sensor which detects the shutting of light by the shutter plate 199 mounted on the partition.

Figure 57:
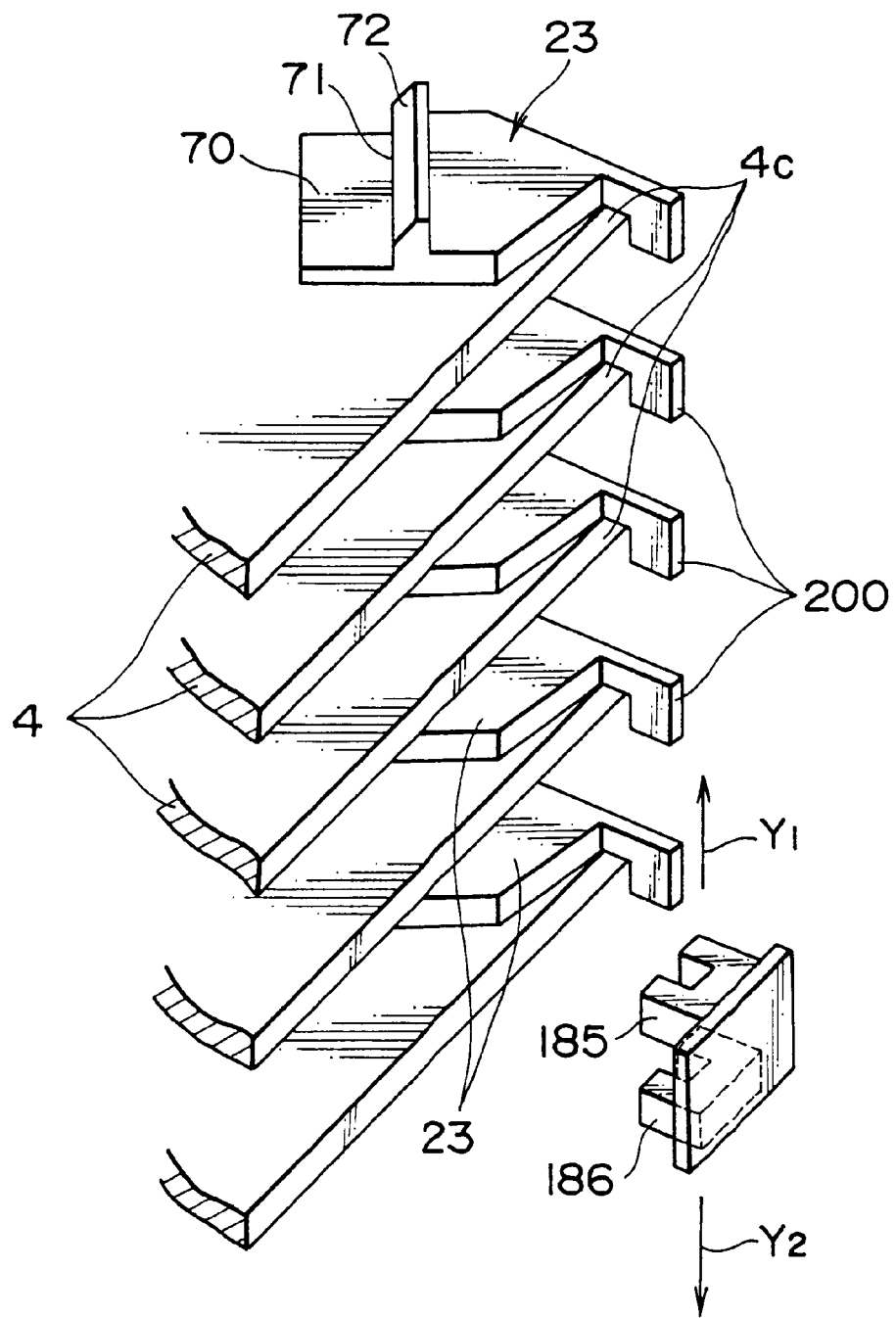
FIG. 57 is a perspective view for illustrating the Y-position detecting device of a disc rack board by the carrier.

The pair of top and bottom initial sensors 185 and 186 for detecting the position of a disc rack board 4 in Y direction is mounted on the carrier 9 as illustrated in FIG. 25 and FIG. 57, and constituted respectively of a light transmission sensor which detects the shutting of light by the shutter plate 200, which is the object to be detected by the sensor, mounted on the side face of the end 4c of all disc rack boards 4 linearly in Y direction.

The initial sensor 187 for detecting the position of a disc drive 6 and the disc-in-out port 7 in Y direction is mounted on the carrier 9 as illustrated in FIG. 25, constituted of a light reflection sensor which receives light reflected from the reflecting plate 201 having the hole 201a to be detected.

The disc detecting sensor 188 for detecting the existence of a disc on the disc rack board is mounted on the carrier 9 as illustrated in FIG. 25, constituted of a light transmission sensor comprising a light-emitting element 188a and a light-receiving element 188b.

Figure 58:
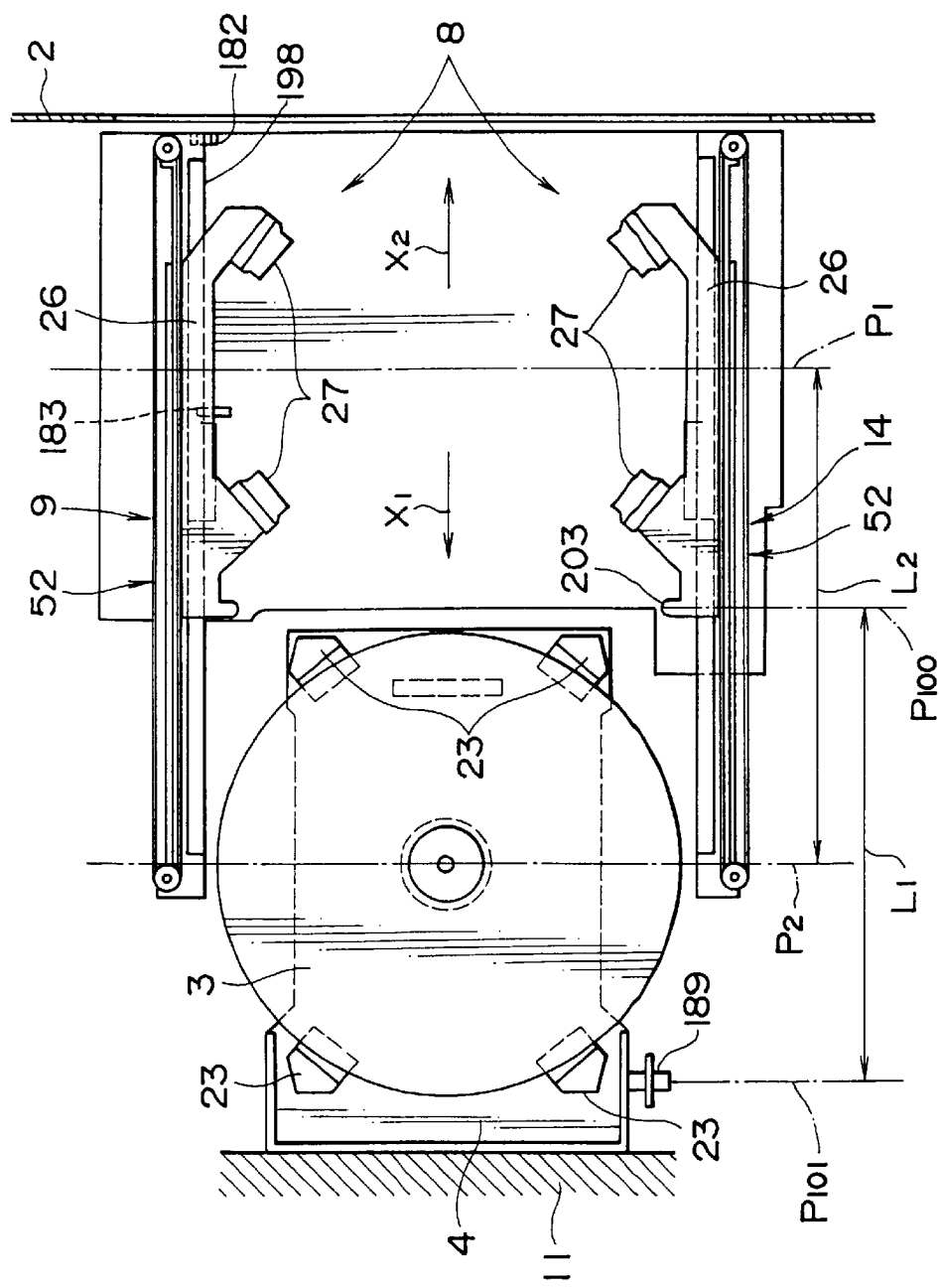
FIG. 58 is a top view for illustrating X-position detecting device of a disc rack board and the carrier.
Figure 59:
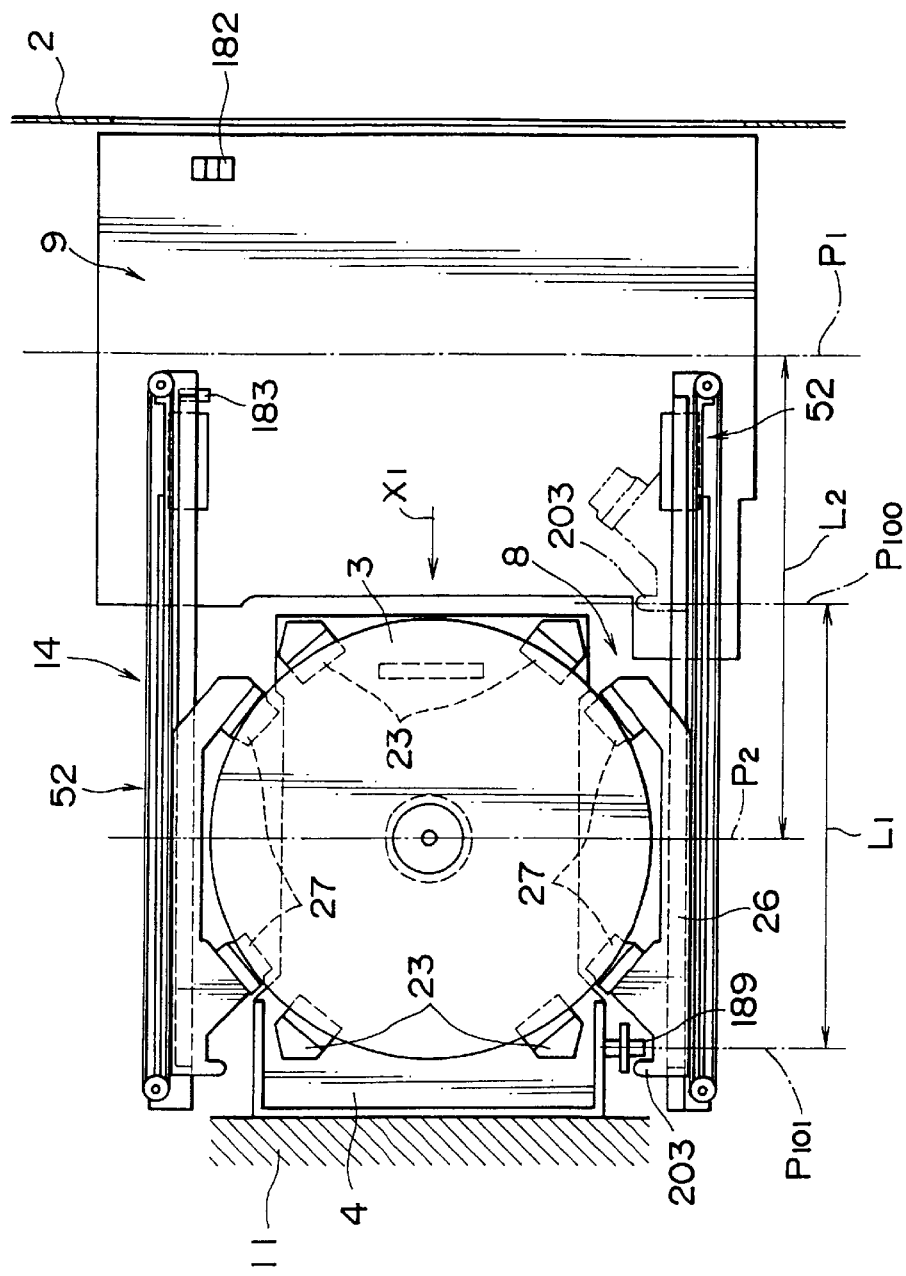
FIG. 59 is a top view for illustrating the operation of X-position detecting device of FIG. 58.
Figure 60:
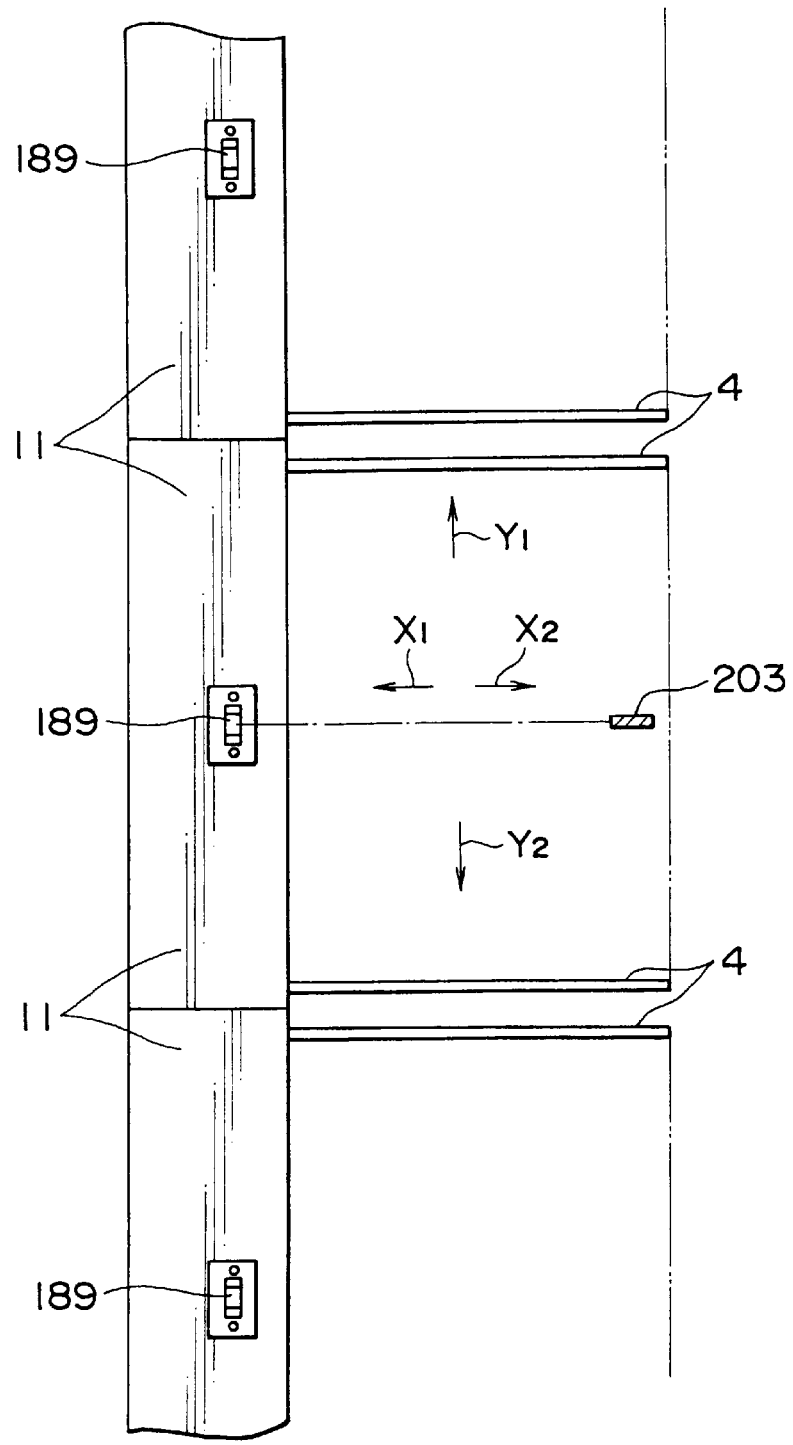
FIG. 60 is a side view for illustrating the disc rack board position detecting sensor of a board base of the X-position detecting device of FIG. 58.

The disc rack board position detecting sensor 189 for detecting the position of a disc rack board 4 in X direction is mounted on a board base 11 as illustrated in FIG. 58 to FIG. 60, and constituted of a light transmission sensor which detects the shutting of light by the shutter plate 203 mounted on the one end of the hand main member 26 of the hand 8.

Description of Disc Detecting Device on a Disc Rack Board

A disc detecting device for detecting the existence of a disc placed flat on a disc rack board 4 is described referring to FIG. 25, FIG. 28, FIG. 29, and FIG. 75.

Figure 29A:
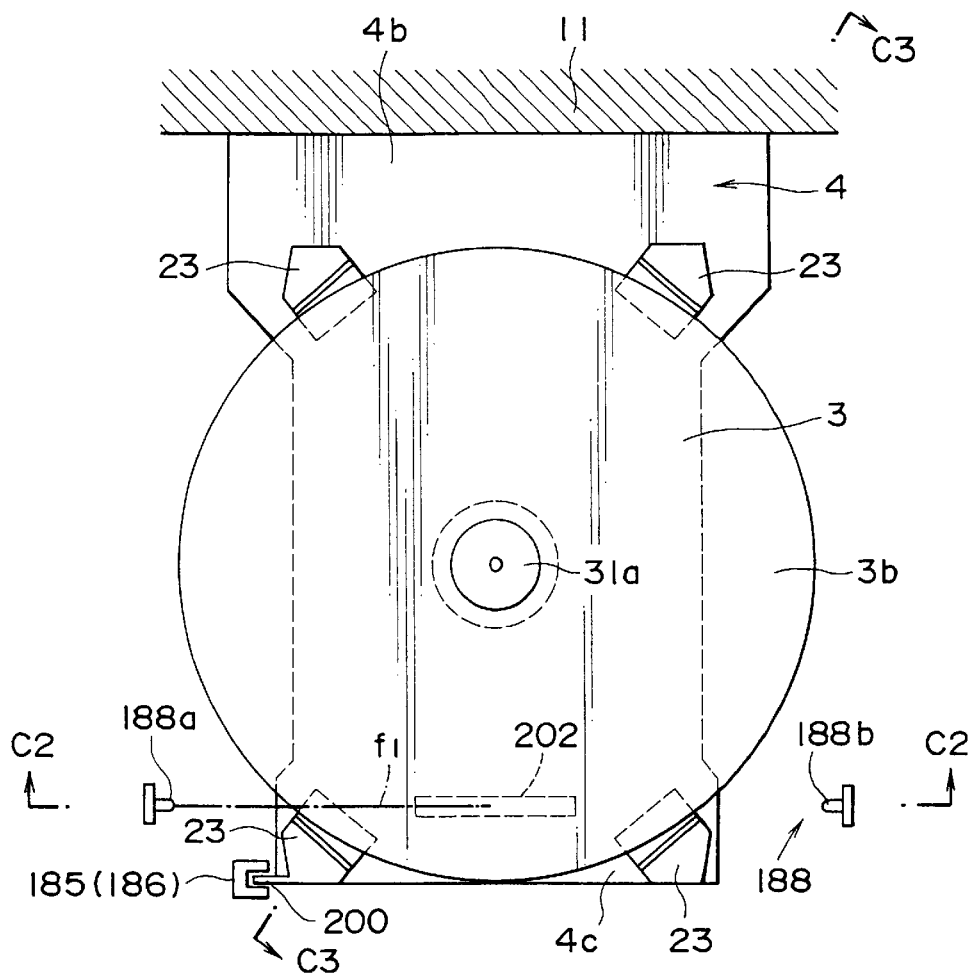
FIG. 29A is a top view of the disc detecting mechanism on a disc rack board when there is a disc.
Figure 29B:
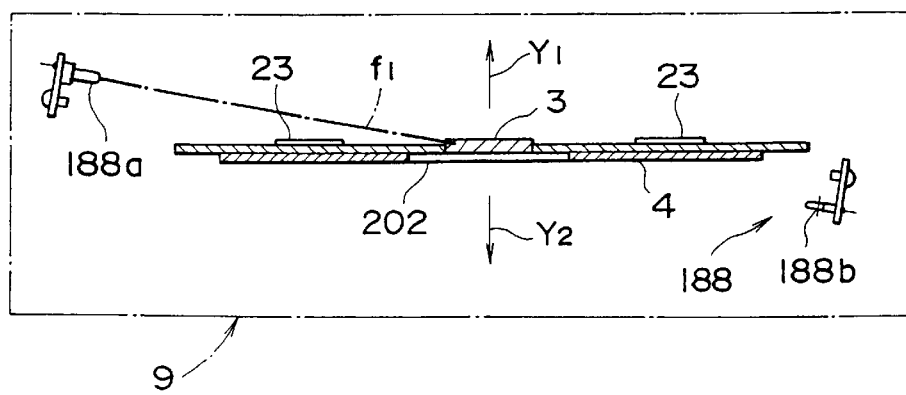
FIG. 29B is a cross-sectional view taken on line C2—C2 of FIG. 29A.

The light transmission hole 202 comprises a slot parallel to Z1 and Z2 directions provided at the center on the end 4c of a disc rack board 4. The light transmission hole 202 is open when no disc 3 is placed on the disc rack board 4 as illustrated in FIG. 28 and closed when a disc 3 is placed flat on the disc rack board 4 as illustrated in FIG. 29.

The disc detecting sensor 188 comprising a light-emitting element 188a and a light-receiving element 188b mounted on the carrier 9 are structured in an arrangement in which the light-emitting element 188a and a light-receiving element are provided facing each other on both Z1 and Z2 sides of the disc rack board 4 with a certain angle to Y1 and Y2 directions and in parallel to Z1 and Z2 directions so as that light f1 is allowed to pass through the light transmission hole 202 from vertically slant direction between an upper and lower disc rack boards 4.

Therefore, by using this disc detecting device, as illustrated in flowcharts of FIG. 72 and FIG. 75, the carrier 9 is moved by the motor 48 in Y1 or Y2 direction, the moved distance of the carrier 9 is measured by the encoder 180 of the motor 48, the encoder pulse is counted by the counter 191, and supplied to the CPU 195, and thus the position of each disc rack board 4 is detected successively.

The disc detecting sensor 188 checks the existence of a disc 3 successively for disc rack boards 4. The information of "disc provided" or "disc not provided" on each disc rack board 4 is stored in the memory circuit 196 through the CPU 195. When disc checking on all one hundred disc rack boards 4 is finished, the operation is completed.

In this case, if there is no disc 3 on the disc rack board 4 as illustrated in FIG. 28, light f1 emitted from the light-emitting element 188a passes through the light transmission hole 202 and is received by the light-receiving element 188b, the disc detecting sensor 188 is turned on, and "disc not provided" is detected.

If there is a disc 3 placed flat on the disc rack board 4 as illustrated in FIG. 29, light f1 emitted from the light-emitting element 188a is intercepted by the disc 3, and the light is not received by the light-receiving element 188b, the disc detecting sensor is turned off, and "disc provided" is detected.

By using this disc detecting device, the existence of a bare disc 3 is detected accurately even with some deviation of the bare disc 3 on a disc rack board 4.

Description of Y-position Detecting Device of a Disc Rack Board

A device for detecting the position of a disc rack board 4 in Y direction is described referring to FIG. 25, FIG. 28, FIG. 29, FIG. 57, FIG. 72, and FIG. 73.

Shutter plates 200, each of which is an object to be detected, are provided vertically in Y direction linearly on the end face 4c of the free end of each disc rack board 4 mounted with cantilevered structure on a board base 11. These shutter plates 200 are formed solidly with the side of the disc support 23 of synthetic resin mounted on each disc rack board 4, the width of a shutter plate 200 in Y direction is formed as small as slightly larger than the thickness of each disc rack board 4.

Figure 73:
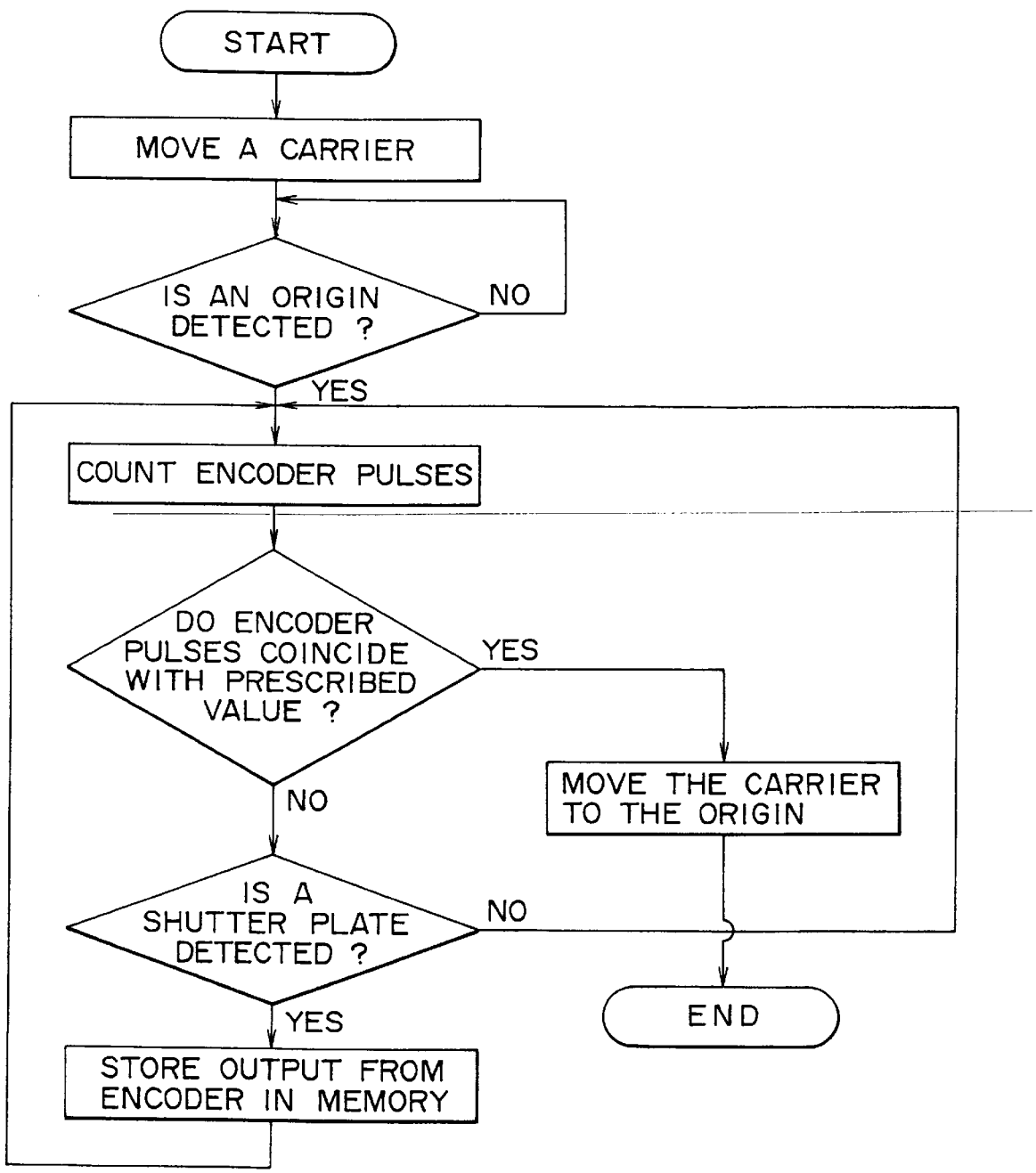
FIG. 73 is a flowchart for describing Y-position detecting operation in which the carrier detects a disc rack board.

When Y-position of a disc rack board 4 is to be detected, the carrier 9 is moved to Y1 or Y2 direction by the motor 48 to detect the origin in Y direction of the carrier 9 with aid of the carrier origin sensor 184 as illustrated in the control circuit of FIG. 72 and the flowchart of FIG. 73.

Then, the carrier 9 is moved from the origin to Y1 or Y2 direction by the motor 48, the moved distance of the carrier 9 is measured by the encoder 181 of the motor 48, and the encoder pulse is counted by the counter 191.

Either initial sensor 185 and/or initial sensor 186 detect Y-position of each shutter plate 200 of each disc rack board 4 successively, when, the device measures Y-position of each disc rack board 4 corresponding to the encoder pulse value which is obtained when the initial sensors 185 and 186 detect Y-position of each shutter plate 200 successively, the encoder pulse values are stored successively in the memory circuit 196 through the CPU 195.

After finishing of Y-position detection for all one hundred disc rack boards 4 and attaining of the encoder pulse value to a prescribed value, the carrier 9 is returned to the origin, and the operation is completed.

During practical use (for automatic change of a disc 3), based on Y-position information of all one hundred disc rack boards 4 stored in the memory circuit 196, the device controls the positioning of the hand 8 to a disc rack board 4.

Accordingly by using this Y-position detecting device of a disc rack board 4, the initial sensors 185 and 186 detect Y-position of shutter plates 200 mounted on the end 4c of each disc rack board 4, thereby, the absolute position in Y direction of the end 4c of each disc rack board 4 is detected directly and accurately.

Therefore, Y-position of the end 4c of each disc rack board 4 is detected accurately, based on this detected information, a disc 3 is transferred safely and accurately between each disc rack board 4 and the carrier 9 by the hand 8 in X2 and X2 direction.

Especially in the structure of this disc changer, all one hundred disc rack boards 4 are cantilevered at the base 4b to attach to a board base 11 and, based on this structure, free ends 4c are inherently easy to be displaced, therefore, it is important for the device to detect Y-position of the end 4c of each disc rack board 4 accurately without error.

Mounting of the initial sensors 185 and 186 on the carrier 9 and mounting of the shutter plates 200 on all one hundred disc rack boards 4 allow the number of initial sensors 185 and 186 to be reduced, and the cost down is possible. The solid molding of a disc support 23 with each shutter plate 200 using synthetic resin allows the number of parts and assembling work to be reduced, and the cost down is possible.

The initial sensor may be constituted of a light-reflecting sensor in which detecting object provided on a disc rack board 4 is replaced with a light-reflecting plate.

Description of X-position Detecting Device of the Carrier and a Disc Rack Board

A position detecting device of the carrier 9 and disc rack board 4 in X direction is described referring to FIG. 25, FIG. 58 to FIG. 60, FIG. 72, and FIG. 74.

The origin P1 of the hand 8 in the carrier 9 is detected by the combination of the hand origin sensor 182 and a detecting shutter plate 198. A light-transmission type disc rack board position detection sensor 189 is mounted on the end face of the center in Y direction of vertical provided four board bases 11, the detecting shutter plate 203 is mounted on the X1-side end of one hand main member 26 of the hand 8.

Figure 74:
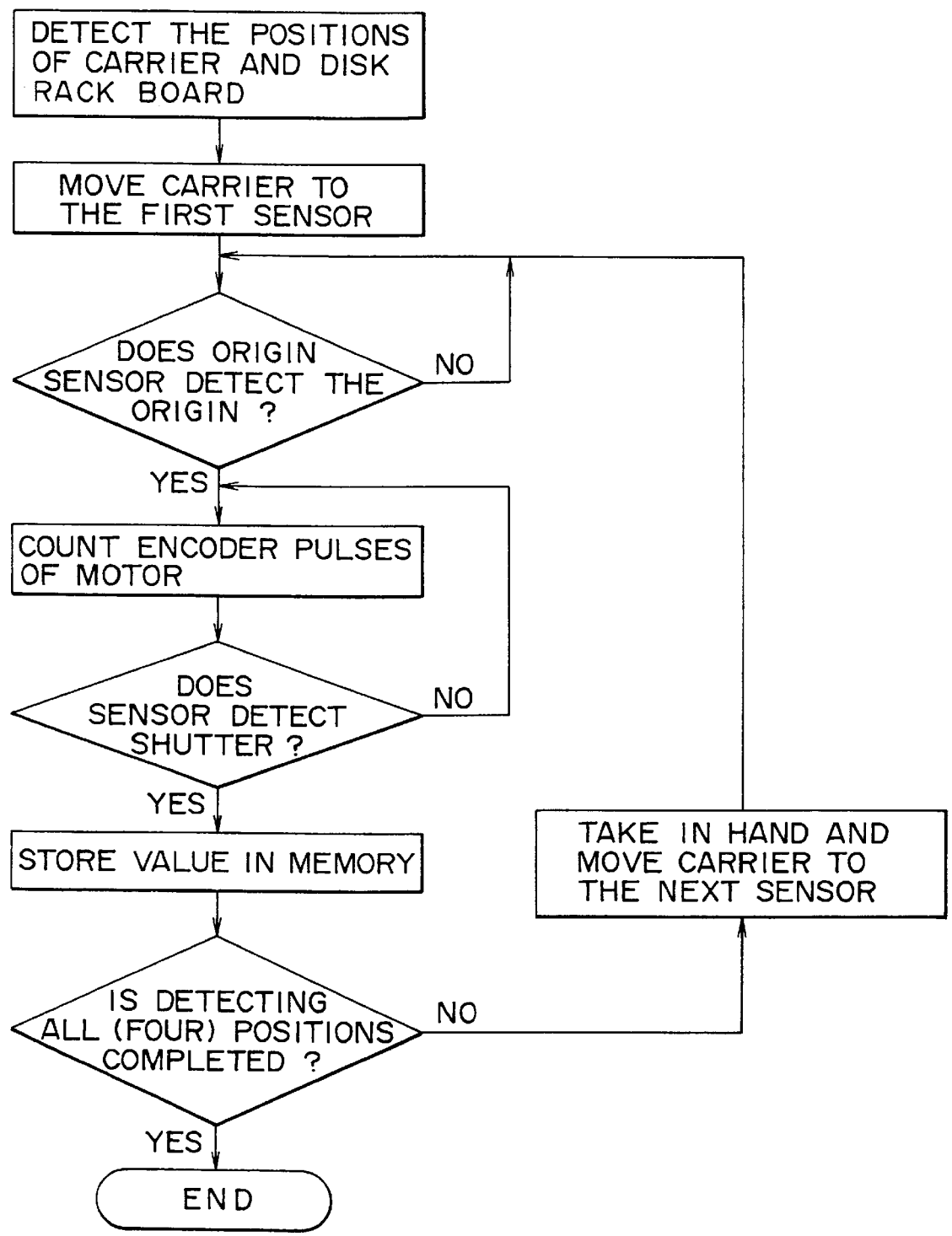
FIG. 74 is a flowchart for describing the operation in which the carrier detects X-position of a disc rack board.

For detecting X-position of the carrier 9 and a disc rack board 4, the carrier 9 is moved to Y1 or Y2 direction to position at the first disc rack board position sensor 189 of the four vertically provided disc rack board position sensors, and at the position the carrier 9 is stopped as illustrated in the control circuit of FIG. 27 and in the flowchart of FIG. 74.

The hand 8 is moved to the origin P1 on the carrier 9 and detected by the hand origin sensor 182 as illustrated in FIG. 58. hen, the shutter plate 203 moves to the origin P100.

Then, the hand 8 is move in X1 direction by the motor 64, the moved distance from the origin P1 to X1 direction of the hand 8 is measured by the encoder 181, the encoder pulse is counted by the counter 193 and supplied to the CPU 195.

As illustrated in FIG. 59, the actual moved distance L1 of the hand 8 from the origin P100 to the disc rack detecting position P101, where the shutter plate 203 is detected by the disc position detecting sensor 189, is measured by the encoder pulse value, and the value is stored in the memory circuit 196 through the CPU 195.

The distance L2 between the origin P1 in the carrier 9 of the hand 8 and the central position P2 of the disc rack board 4 is measured based on the actual moved distance L1 of the hand 8.

The position detecting operation of the carrier 9 and a disc rack board 4 is conducted on the vertically provided four disc rack board position sensor 189 successively, and the operation is completed.

During actual operation (changing automatically a disc 3), based on the information stored in the memory circuit 196, the moved distance L1 in X1 and X2 directions of the hand 8 between the carrier 9 and a disc rack board 4 is set up respectively for the vertically provided four board bases 11 block-wise, and a disc 3 is transferred in X1 and X2 directions between the disc rack board 4 and the carrier 9.

Accordingly by using this X-position detecting device for the carrier 9 and a disc rack board 4, based on the measured actual moved distance L1 of the hand 8 between the hand origin sensor 182 and the disc rack board position detecting sensor 189, the distance L2 between the carrier 9 and the disc rack board 4 is measured and stored, and based on the stored information the moved distance L1 of the hand 8 between the carrier 9 and the disc rack board 4 is set up for operation, thus even if there is scattering of the distance between the carrier 9 and disc rack board 4, the moved distance L1 of the hand 8 is set up accurately corresponding to the scattering for operation.

Therefore, a disc 3 is transferred between the carrier 9 and a disc rack board 4 consistently, safely, and accurately regardless of scattering of the distance between the carrier 9 and a disc rack board 4.

The requirement of accurate setting of the distance between the carrier 9 and a disc rack board 4 is needless, the precise manufacturing and assembling of parts are alleviated, the precise gap adjusting work for assembling is reduced, and these advantages lead to the significant cost down.

It is not necessary to provide disc rack board position detecting sensors 189 on all one hundred disc rack boards 4, but only four disc rack board position detecting sensors 189 are provided on four blocked vertically provided board bases 11, thus the number of disc rack board position detecting sensors 189 is significantly reduced.

A hand origin sensor 182 and disc rack board position detecting sensor 189 may be replaced with a light-reflecting type sensor.

Description of Protrusion Detection of the Hand

As illustrated in FIG. 25, FIG. 27, and FIG. 72, the protrusion of the hand 8 from the carrier 9 to the disc rack board 4 side, disc drive 6 side, and disc-in-out port 7 side is detected as well as the protrusion direction by the detecting shutter plate 198 which is moved in X1 and X2 directions synchronously with the hand 8, the hand protrusion sensor 183 which is turned on or off with the shutter plate 198, and the hand origin sensor 182, and the protrusion information is stored in the memory circuit 196 through the CPU 195.

Description of Y-position Detecting Device of a Disc Drive

Y-position detecting device of a disc drive 6 and the disc-in-out port 7 by the carrier 9 is described referring to FIG. 25, FIG. 66, FIG. 72, and FIG. 76.

Total nine detecting light-reflecting plates 201 which are detected by the initial sensor 187 which is a light-reflecting sensor mounted on the carrier 9 are mounted on eight disc drive 6 and on disc-in-out port 7.

Figure 76:
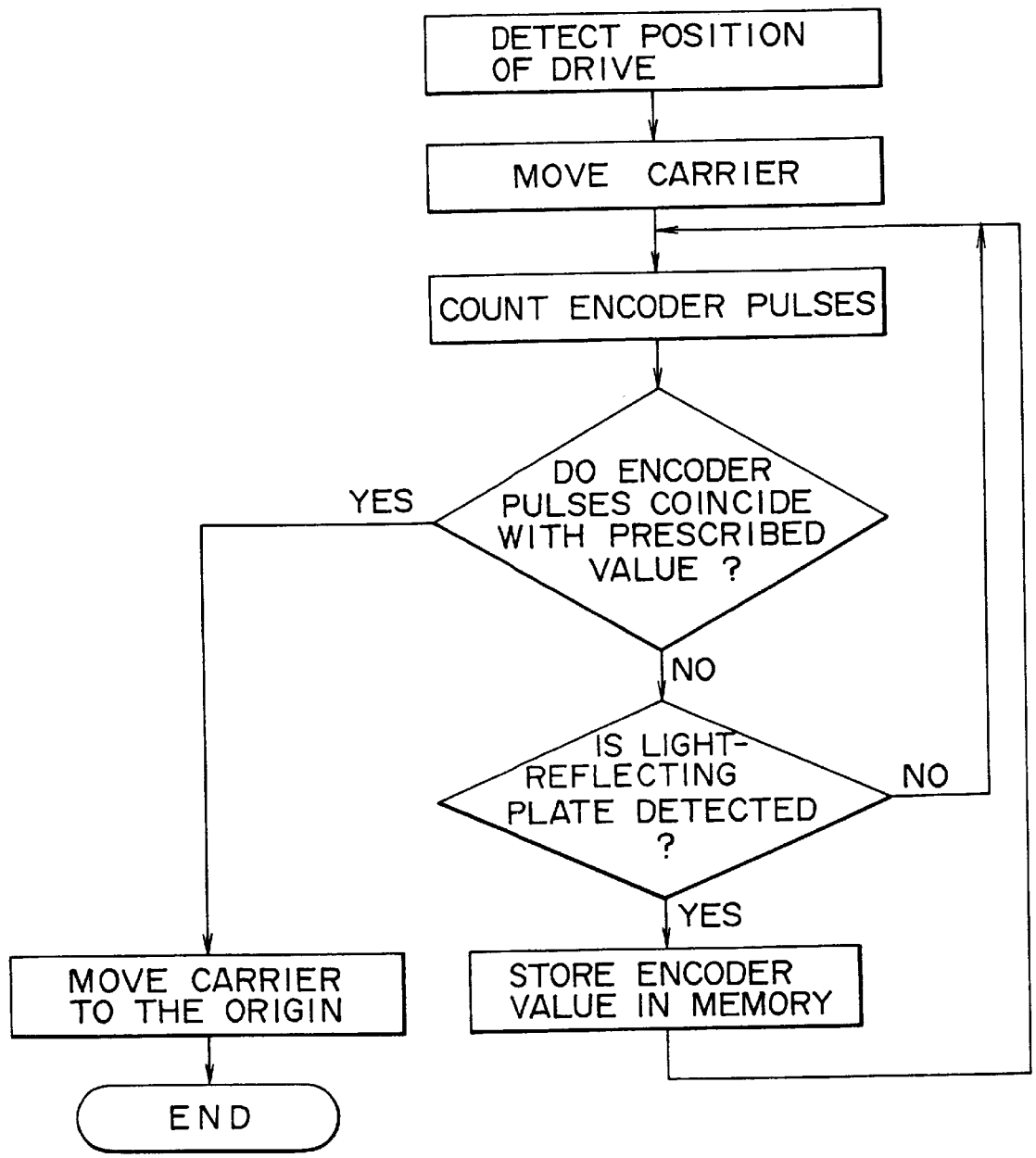
FIG. 76 is a flowchart for describing the operation in which the carrier detects Y-position of a disc drive.

For detecting Y-position of a disc drive 6 and disc-in-out port 7, the carrier 9 is moved from the origin to Y1 or Y2 direction, the moved distance is measured by the encoder 180 of the motor 48, and the encoder pulse is counted by the counter 191 to supply to the CPU 195 as illustrated in the control circuit of FIG. 72 and in the flowchart of FIG. 76.

Each light-reflecting plate 201 of each disc drive 6 and the disc-in-out port 7 is detected successively by the initial sensor 187, the encoder pulse value is stored in the memory circuit 196 through the CPU 195 successively. When the detection of nine light-reflecting plates 201 is finished and the encoder pulse is attained to a prescribed value, the carrier 9 is moved to the origin and the operation is completed.

In this case, as illustrated in FIG. 33 and FIG. 34, a recorder and/or regenerator 5 of a disc drive 6 is contained in a dust proofing box 89, a dust proofing box 89 is supported elastically by four dampers 91 on the bottom chassis 92 of the body enclosure 88, that is, the recorder and/or regenerator 5 is floating.

Figure 66:
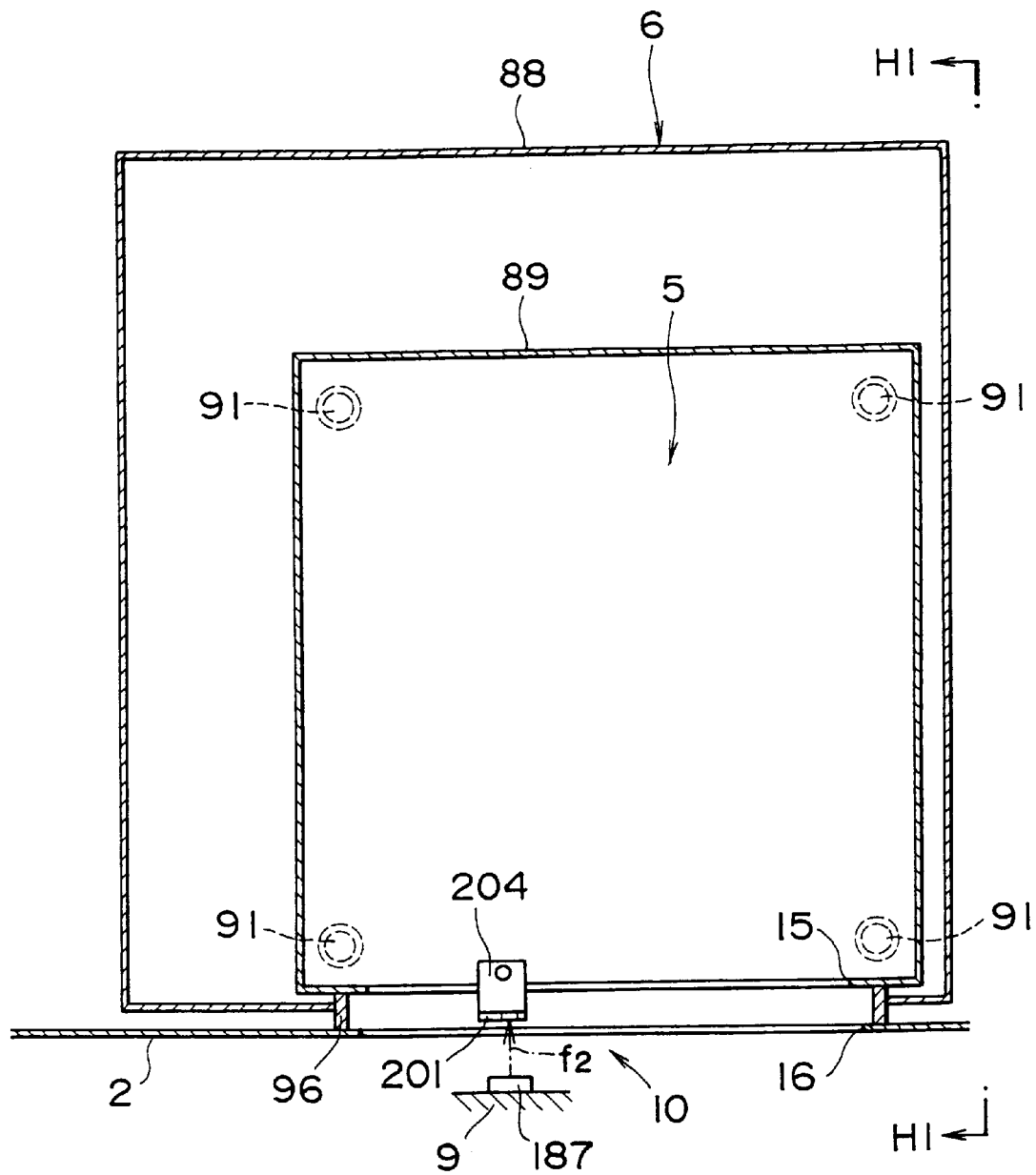
FIG. 66 is a partially cutaway top view for illustrating a light-reflecting plate mounted on a recorder and/or regenerator in a disc drive and a light-reflecting sensor mounted on the carrier.
Figure 67:
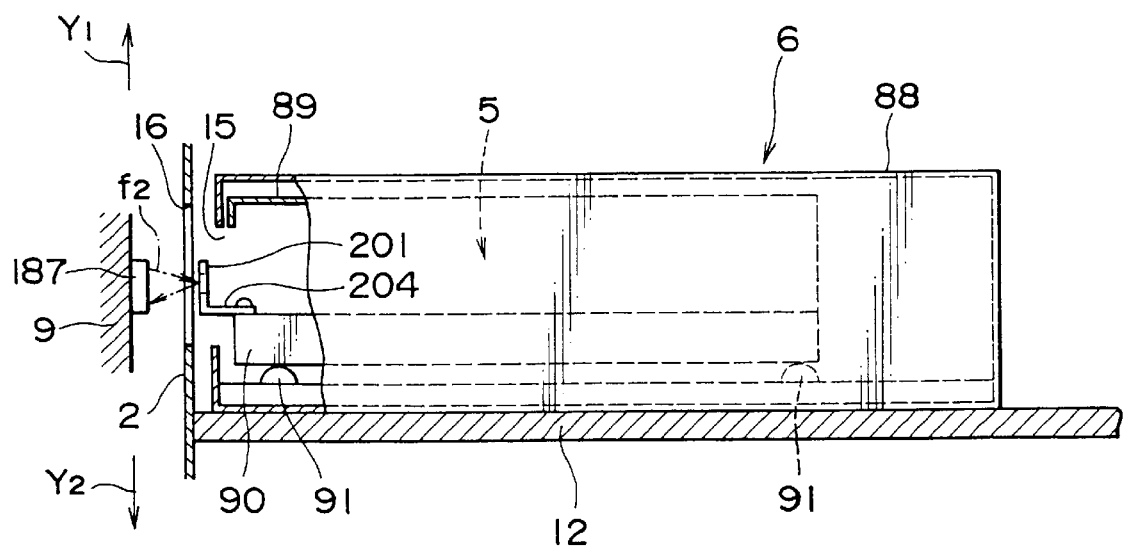
FIG. 67 is a partially cutaway side view taken on line H1—H1 of FIG. 66.

As illustrated in FIG. 66 and FIG. 67, a light-reflecting plate 201 is mounted directly on a mechanical chassis 90 which is the standard position in a dust proofing box 89 with a bracket, the light-reflecting plate 201 is provided on a some place of a disc gate 15, and the light-reflecting plate 201 is detected by the initial sensor 187.

As the result, the initial sensor 187 detects Y-position of a recorder and/or regenerator 5 directly and accurately regardless of the deviation of Y-position of a recorder and/or regenerator 5 due to the deterioration of dampers with time in the internal of each disc drive 6 in the body enclosure 88. Therefore, the carrier 9 is positioned accurately to a recorder and/or regenerator 5, a disc 3 is transferred consistently and stably between a recorder and/or regenerator 5 and the carrier 9 by the hand 8. The accuracy of the mechanical chassis 90 of a dust proofing box 89 is high, direct mounting of a light-reflecting plate 201 on the mechanical chassis allows the relative position of light-reflecting plate 201 to the standard position to be detected accurately.

Description of Control Device for Starting of Power Supply

A control device of the carrier 9 and hand 8 for starting up of a disc changer is described referring to FIG. 23, FIG. 24, FIG. 26, FIG. 26, FIG. 27, FIG. 61 to FIG. 65, FIG. 72, and FIG. 77.

This control device is provided with a carrier mechanism 13, hand moving mechanism 14, hand origin sensor 18 and protrusion sensor 183 which are the first sensor for detecting the relative position of the hand 8 to the carrier 9, a pair of vertically provided initial sensors 185 and 186 which are the second sensor for detecting the relative position to a disc rack board 4, initial sensor 187 which is the third sensor for detecting the relative position of the hand 8 to a disc drive 6, and control circuit using the CPU 195.

Figure 77:
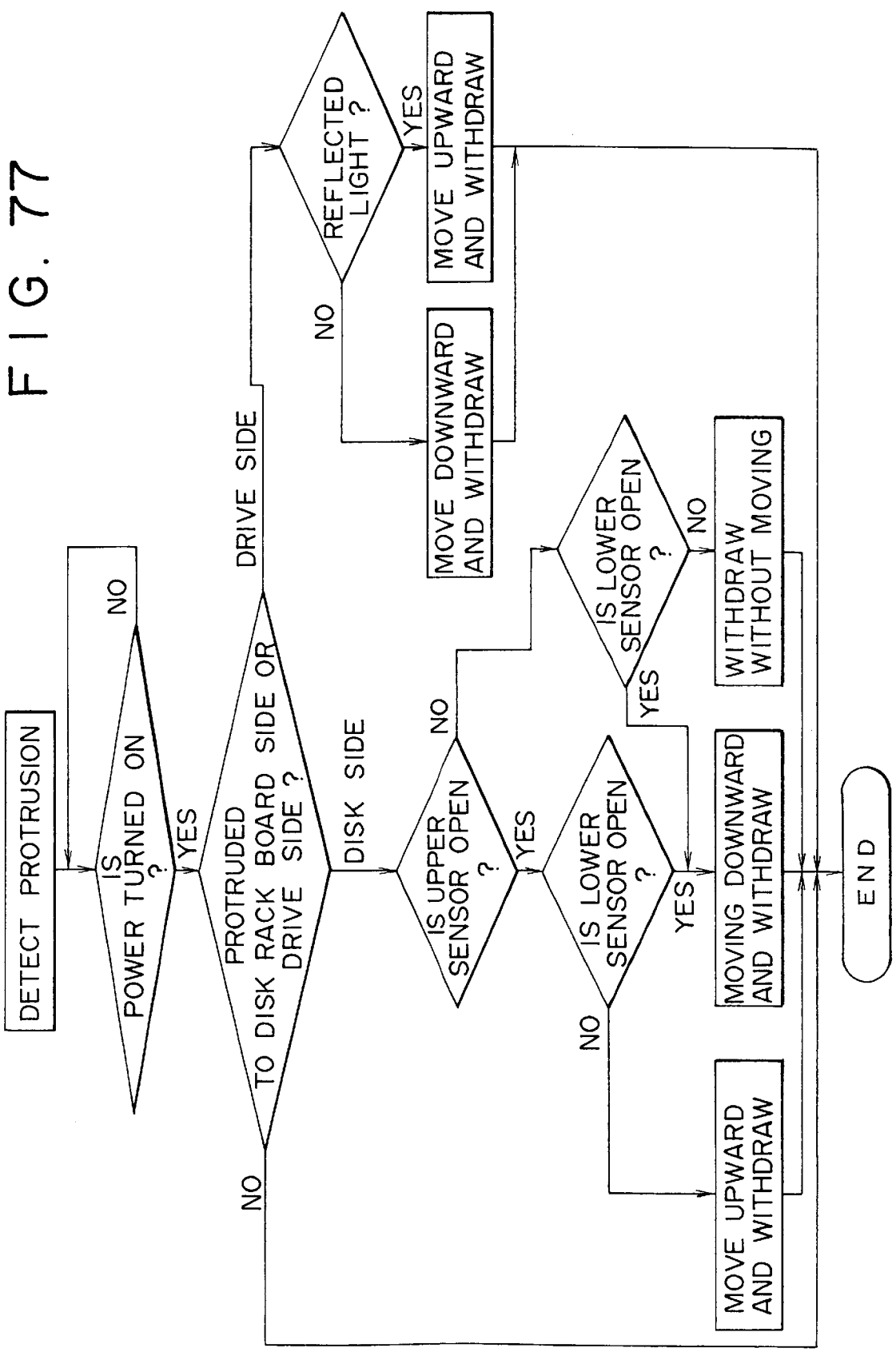
FIG. 77 is a flowchart for describing the operation for detecting the protrusion of the hand to disc rack board side or disc drive side and the operation for withdrawing the hand to the carrier side.

For starting up of the power supply of the disc changer, as illustrated in the control circuit of FIG. 72 and in the flowchart of FIG. 77, the protrusion of the hand 8 to the disc rack board 4 side or disc drive 6 side is detected by the hand origin sensor 182 and hand protrusion sensor 184 upon switching on.

If the hand 8 protrudes to the disc rack board 4 side, the pair of vertical provided initial sensors 185 and 186 detects the open or close of the shutter plate 200.

Figure 61A:
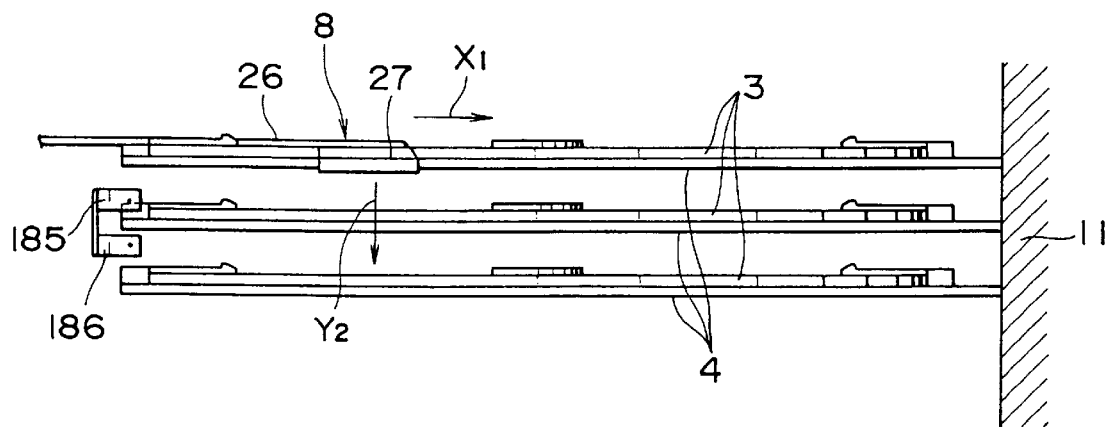
FIGS. 61A and 61B are schematic side views for illustrating the operation for taking out the hand from a disc rack board when a power supply is started up.
Figure 61B:
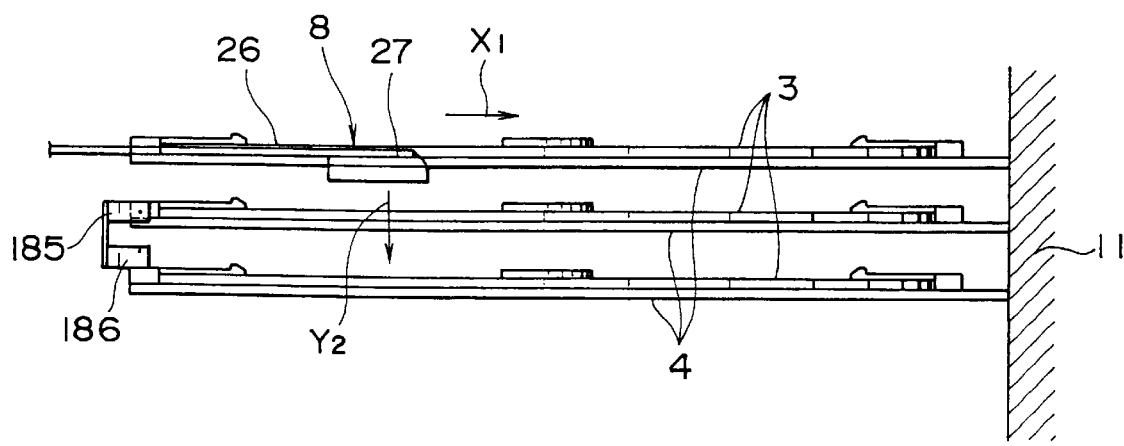

In the case that either initial sensors 185 and 186 are open as shown in FIG. 61A, or in the case that the upper initial sensor 185 is close and lower initial sensor 186 is open as shown in FIG. 61B, the hand is positioned too high to the disc rack board 4, to avoid the interference of the disc rack board 4 just above the hand 8, the hand 8 is moved downward and then withdrawn to the origin in X direction.

Figure 62A:
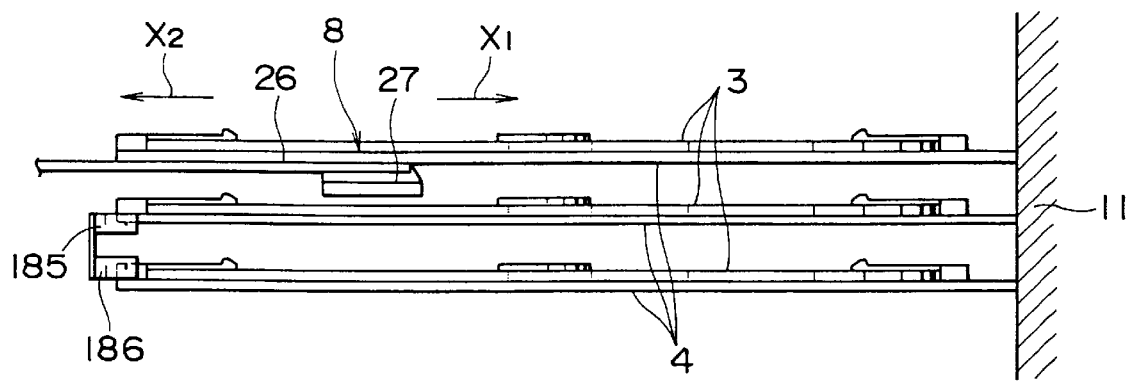
FIGS. 62A and 62B are schematic side views for illustrating the operation for taking out the hand following FIGS. 61A and 61B.
Figure 62B:
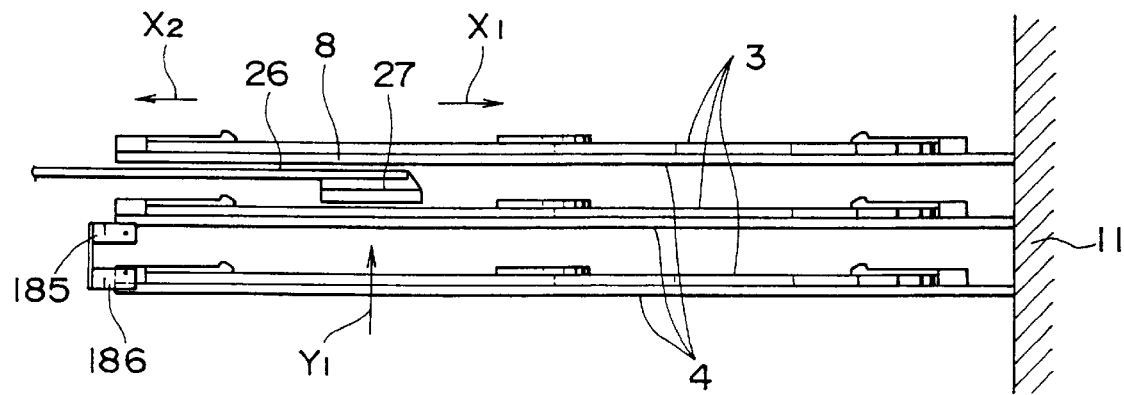

In the case that either upper and lower initial sensors 185 and 186 are close as shown in FIG. 62A, the hand 8 is staying in a safe region between upper and lower disc rack boards 4, the hand 8 is withdrawn to the original in the carrier 9 directly in X direction.

In the case that the upper initial sensor 185 is open and the lower initial sensor 186 is close as shown in FIG. 26B, the hand 8 is positioned too low, to avoid the interference of the disc rack board 4 just under the hand 8, the hand 8 is moved upward and then withdrawn to the origin in X direction.

When the hand 8 protrudes to the disc drive 6 side or disc-in-out port 7 side, the device checks the existence of light f2 which is emitted from the initial sensor 187 and reflected by the light-reflecting plate 201.

Figure 63A:
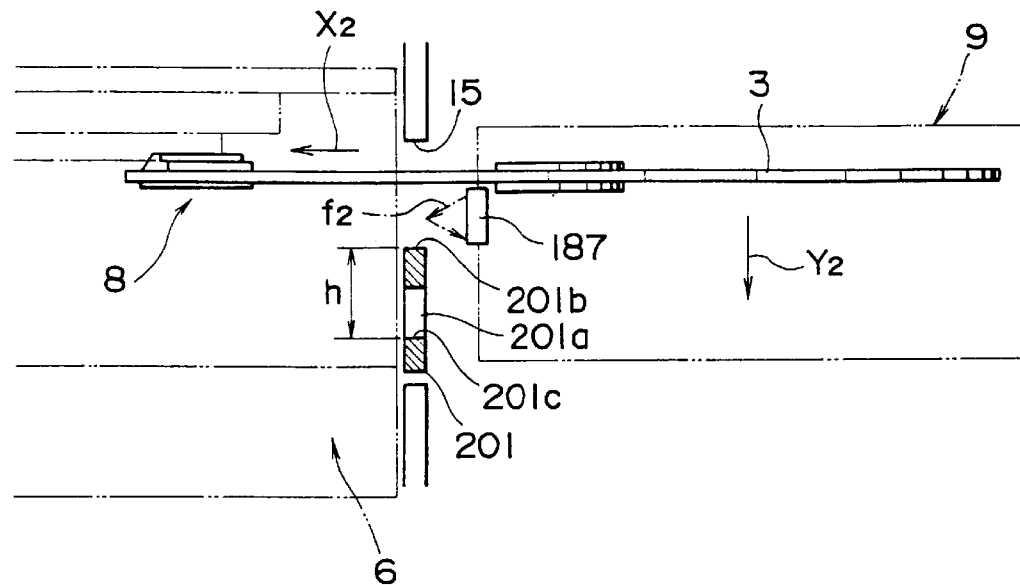
FIGS. 63A and 63B are schematic side views for illustrating the operation for taking out the hand from a disc drive when a power supply is started up.
Figure 63B:
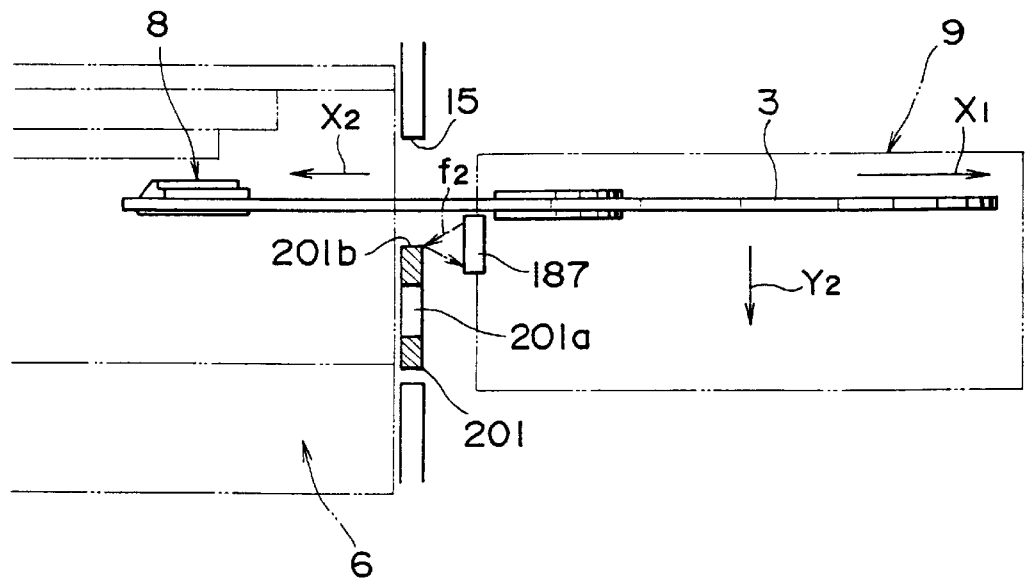
Figure 64A:
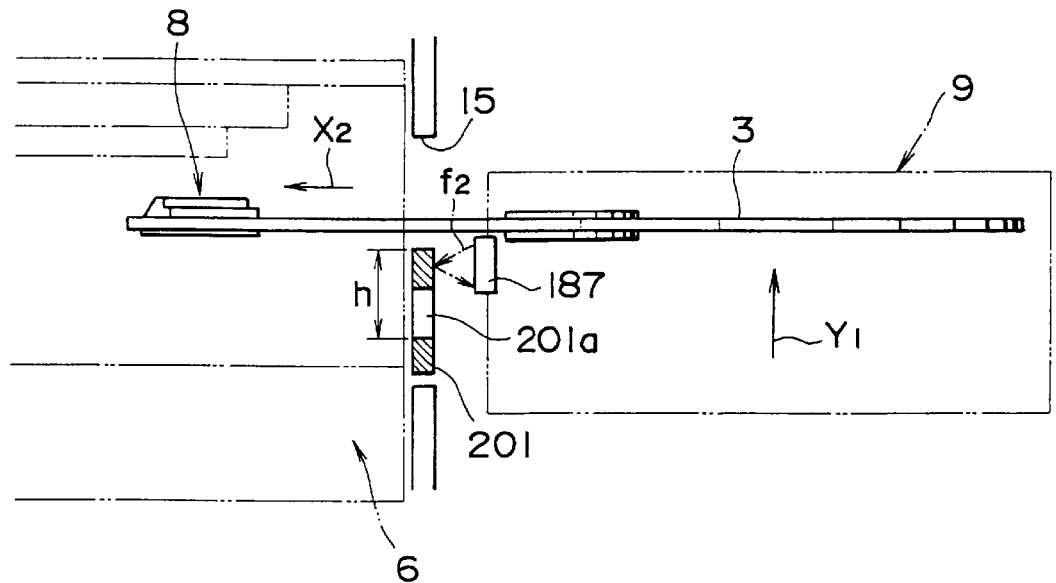
FIGS. 64A and 64B are schematic side views for illustrating the operation for taking out the hand from a disc drive following FIGS. 63A and 63B.
Figure 64B:
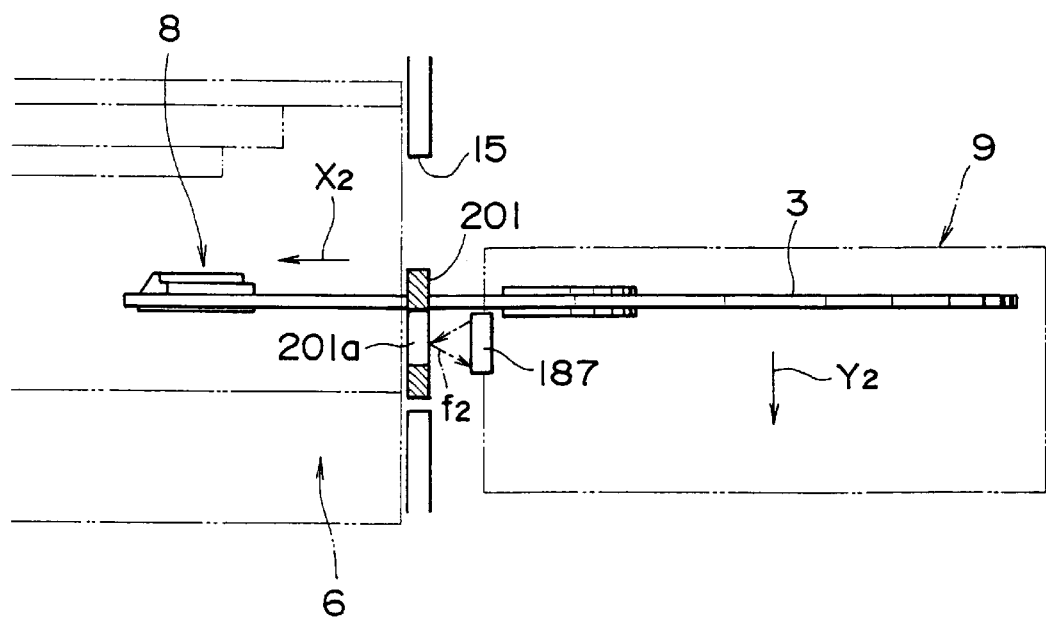

In this case, if the initial sensor 187 detects no reflected light f2 as shown in FIG. 63A and FIG. 64B, the hand 8 is moved downward to receive reflected light f2 of the initial sensor 187 at the top edge 201b or the bottom edge 201c of the hole 201a of the light-reflecting plate 201 as shown in FIG. 63B and FIG. 64A, then the hand 8 is withdrawn to the origin in the carrier 9 in X direction.

Figure 65A:
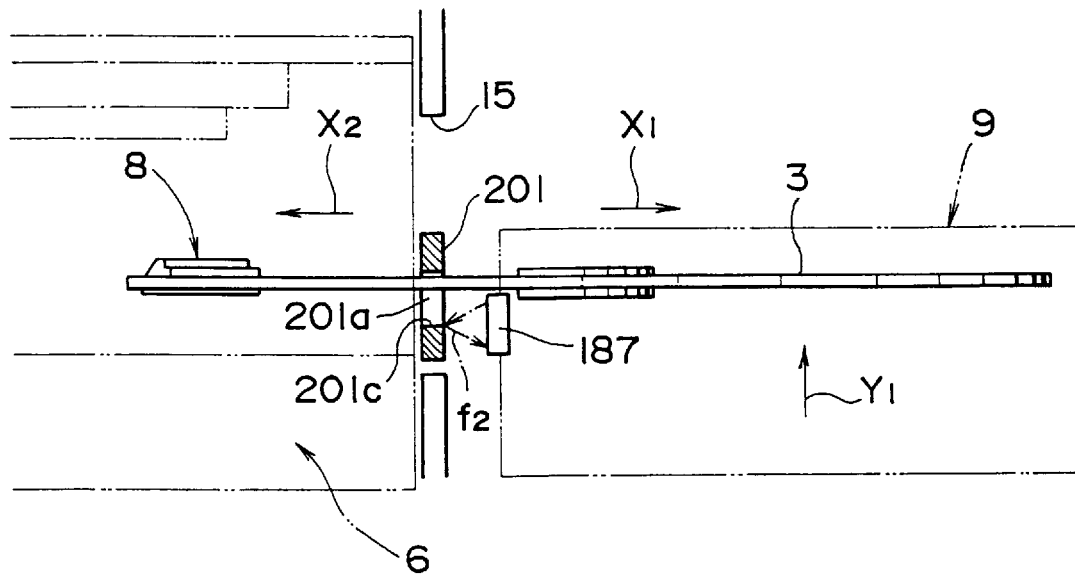
FIGS. 65A and 65B are schematic side views for illustrating the operation for taking out the hand from a disc drive following FIGS. 64A and 64B.
Figure 65B:
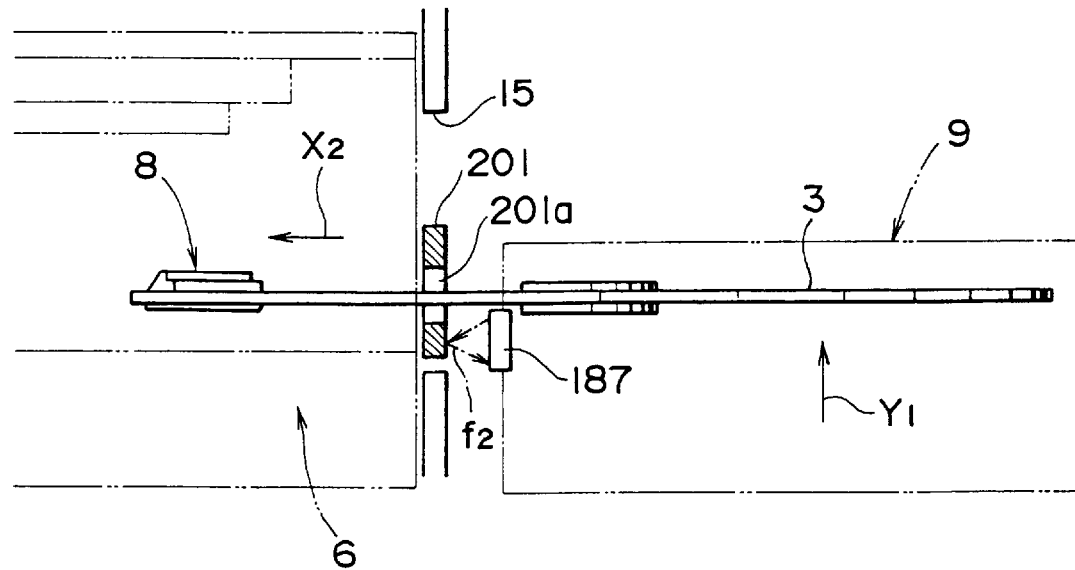

If the initial sensor 187 detects the reflected light f2 as shown in FIG. 64A and FIG. 65B, the hand 8 is moved upward so as that the upper edge 201b of the light-reflecting plate 201 or lower edge 201c of the hole 201a comes to the light f2, then, the hand 8 is withdrawn to the origin in the carrier 9 in X direction.

Thereby, the hand 8 is withdrawn to the carrier 9 safely within a safe certain height range between the upper edge 201b of the light-reflecting plate 201 and the lower edge 201c of the hole 201a. After safe returning of the hand 8 to the carrier 9, the carrier 9 is moved to the origin in Y direction.

If the carrier 9 is moved in Y direction directly as the hand 8 protrudes to the disc drive 6 side or the disc-in-out port 7 side, the disc 3 and the device is damaged, but according this device structured as described herein above a disc 3 and the device are prevented from damaging. Therefore, if changing operation of a disc 3 is interrupted due to, for example, power supply failure, when power supply is restarted, the hand 8 is returned once to the origin in the carrier 9 consistently, and then the carrier 9 is returned safely to the origin in Y direction for initialization.

If the hand 8 protrudes neither to the disc rack board 4 side and the disc drive 6 side at power start, the carrier 9 is moved directly to the origin in Y direction.

Description of a Device for Correction of Sensor Error

A device for correction of error due to the scattering of optical axis of a sensor referring to FIG. 68, FIG. 69, FIG. 72, and FIG. 78.

As illustrated in FIGS. 69A, 69B, and 69C, when a detecting light-reflecting plate 201 is detected by the initial sensor 187 which is a light-reflecting type sensor mounted on the carrier 9 to position the carrier 9 to a disc drive 6 or others, the scattering of the optical axis f2 of the initial sensor 187 from the standard position P104 causes the scattering ΔL of stop position of the carrier 9 from the standard stop position P104.

Figure 68:
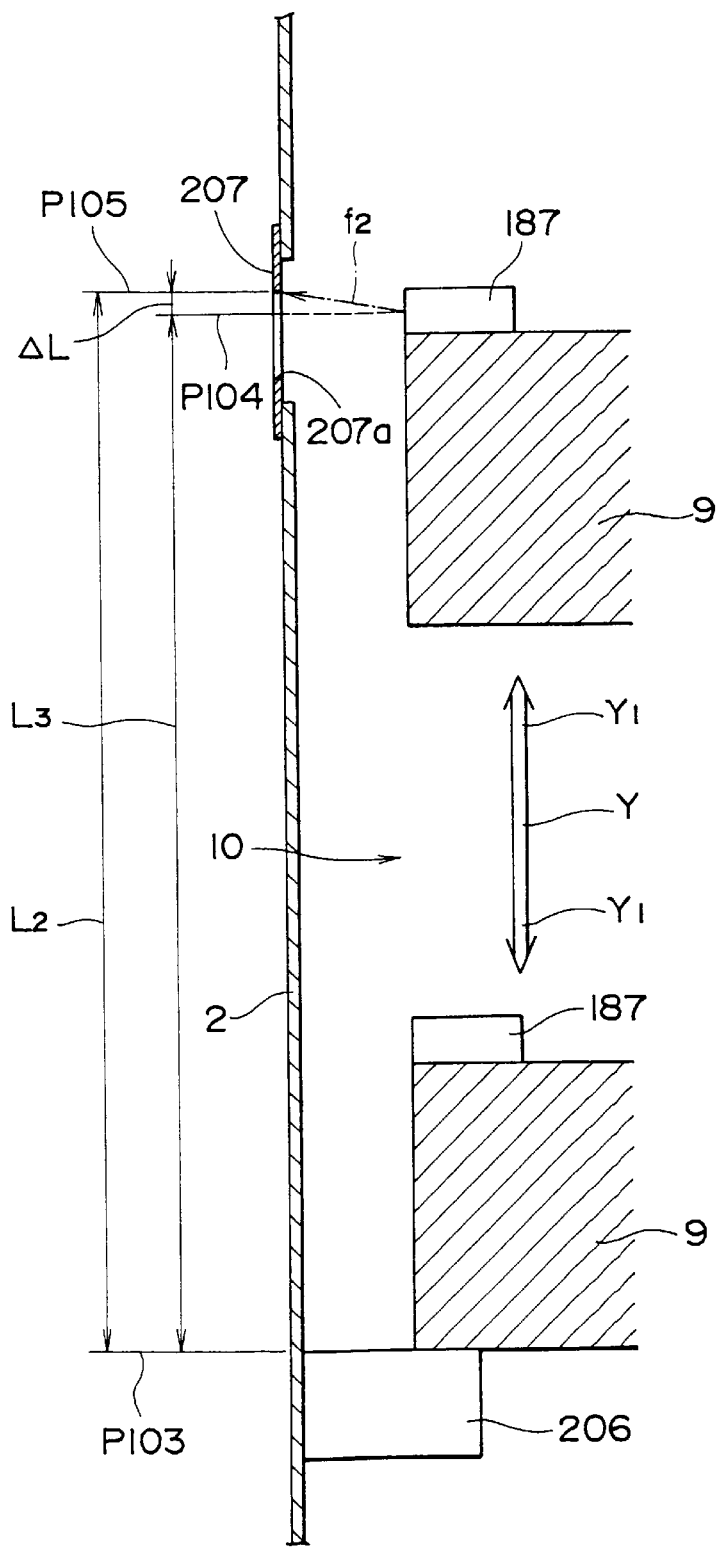
FIG. 68 is a schematic side view for illustrating a device for correcting sensor error of the carrier.

To prevent the scattering, as illustrated in FIG. 68, a stopper 206 is provided at the standard position P103 on the moving passage 10 of the carrier 9, a detecting standard light-reflecting plate 207 is provided at the position with interposition of a certain distance L3 to the standard position P103 along the moving passage 10, the distance L3 is stored in the memory circuit 196.

Figure 78:
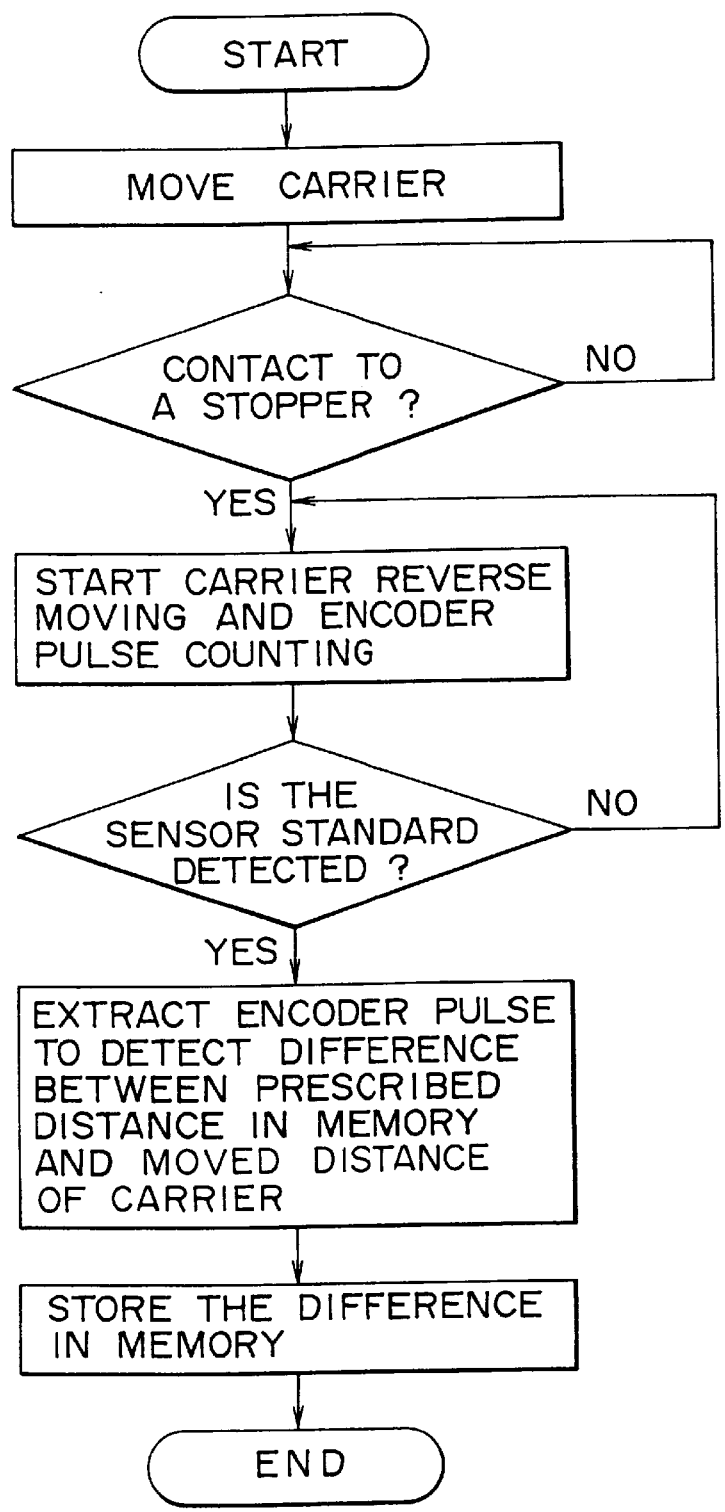
FIG. 78 is a flowchart for describing the operation for detecting sensor error of the carrier.

When starting, as illustrated in the control circuit of FIG. 72 and in the flowchart of FIG. 78, the carrier 9 is moved in Y2 direction to contact with the stopper 206 in FIG. 68, and the carrier 9 is position at the standard position P103.

Then, the carrier 9 is moved reversely to Y1 direction and simultaneously the moved distance of the carrier 9 is measured by the encoder 180, the encoder pulse is counted by the counter 191, and supplied to the CPU 195.

The encoder pulse value is detected when the initial sensor 187 detects the standard light-reflecting plate 207, and actual moved distance L2 of the carrier 9 from the standard position P102 to the standard light-reflecting plate 207 is calculated.

The CPU 195 compares the actual moved distance L2 and L3 stored in the memory 196, and the difference ΔL between the distance L3 and actual moved distance L3 is detected. he difference ΔL is the scattering (error) of the optical axis f2 of the initial sensor 187.

The difference ΔL is stored in the memory circuit 196 as the scattering of the optical axis f2 of the initial sensor 187, and when the initial sensor 187 detects a detecting light-reflecting plate 201 of a disc drive 6 or the disc-in-out port 7 to stop the carrier 9, the stop position of the carrier 9 is corrected by the difference ΔL always in operation.

As the result, the carrier 9 is stopped at a prescribed position consistently and accurately regardless of scattering of the optical axis f2 of the initial sensor 187, and thus a disc is changed accurately automatically.

Therefore, the accuracy of mounting position of the initial sensor 187 on the carrier 9 and adjusting of the mounting position of initial sensor 187 is allowed to be easy, and manufacturing and assembling of initial sensors become easier.

Embodiments of the present invention are described hereinbefore, the invention by no means restricted to these embodiments, various modifications may be possible based on the scope of the invention.

The disc changer in accordance with the present invention structured as described hereinbefore exhibits following effects.

The number of discs mounted on the disc changer is significantly increased because the volume of a bare disc is smaller significantly than that of a cartridge.

The driving of the carrier and the hand is easy, the simple structure leads to the cost down, the space for carrier moving is reduced, and the disc changer is minimized in size, because the carrier moves only in one direction and also the hand moves on the carrier only in one direction.

The charging and discharging of a bare disc is easy during operation of the disc changer, because a disc-in-out port for charging or discharging a bare disc to or from the external of the changer body is provided in the same arrangement of the disc drives.

A bare disc is transferred very lightly and quickly by the hand between a disc rack board and the carrier and between a disc drive and the carrier at both ends of the carrier while the carrier is moving vertically, because the passage of the carrier is provided vertically, and the disc rack boards and the disc drives are provided, facing each other to form stacks, respectively on both sides of the passage of the carrier. Accordingly, a bare disc is changed automatically between a disc rack board and a disc drive in a short time.

Comparing with dust-proof remediation of conventional disc changers, the installation of a fan is needless, the structure is simplified, the cost is reduced, the dusting on a disc when starting up in the disc changer due to diffusion of dust by a fan is eliminated, and the penetration of dust from the external is prevented completely by the sealed structure, because in the sealed area formed in the disc changer body, disc rack boards, a carrier moving passage, and recorders and/or regenerators, which have sealed structures in disc drives, are provided. Therefore, the dusting on discs is prevented, time-consuming periodical maintenance work such as filter change and cleaning is needless, and the running cost is low.

The temperature rising in the sealed area in the disc changer body is prevented because main heat generating sources are provided on the unsealed area in the disc changer body, and the dust proofing of discs and air-cooling of main heat generating sources are effective because no dust diffusion in the sealed area is caused regardless of air-cooling of main heat generating sources in the unsealed area.

Recorders and/or regenerators in disc drives are maintained dust-proof easily because a partition is provided to divide the internal of the disc changer body to the sealed area and the unsealed area, one or more of connecting gates are provided on the partition, and recorders and/or regenerators contained in the sealed structure in one or more of disc drives provided in the unsealed area are connected air-tightly to the connecting gates with interposition of dust-proof material.

Recorders and/or regenerators in disc drives are maintained dust-proof and vibration-proof because a dust-proof box is provided in each disc drive, a recorder and/or regenerator is contained in the dust-proof box, the dust-proof box is supported elastically on dampers for preventing vibration, the dust-proof box and the partition is connected air-tightly with elastic dust-proof material at the periphery of the connecting gate.

The sealed area in the internal of the disc changer body is maintained dust-proof completely because for connecting electrically the sealed area and the unsealed area with cables, connector plates having sealed structure are fixed on the partition at cable insertions, and cables are connected to connectors provided on both sides of the connector plates.

A disc is not damaged, time for transferring a disc is not long, scattering of stopping position of a disc due to slipping of the disc is prevented, and the structure of a disc changer of the present invention is simple, different from conventional disc changers having a structure, for example, in which a disc is sandwiched between rollers or belts driven by a motor and moved and transferred between a carrier and a disc rack board and between a carrier and disc drive. Therefore the life of a disc is improved, the accuracy of stopping position of a disc is improved, the disc changing between the carrier and a disc rack board and between the carrier and a disc drive is carried out at a high speed, safely, and accurately, thus the automatic changing operation of a disc to a disc drive is carried out in a very short time.

While it is not required to withdraw the hand to a disc rack board and disc drive with a long stroke and the withdrawing distance of the hand to a disc rack board and disc drive is short, a disc is transferred with supporting stably at the periphery of the disc by the had, because the hand is structured so as to transfer a disc in the horizontal direction supporting the disc at the periphery thereof on both sides in the direction perpendicular to the moving direction of the hand. Therefore, a disc is transferred between the carrier and a disc rack board and between the carrier and a disc drive stably and quickly, thus the time for automatic changing of a disc is significantly shortened. When a disc is withdrawn from a disc rack board at one end of the carrier and the disc is delivered to a disc drive at another opposite end of the carrier, the passing of a disc from one hand to the other is not required, and a disc which is withdrawn from a disc rack board is directly delivered to a disc drive quickly, because the hand transfers a disc in the horizontal direction with supporting the disc at the periphery thereof on both sides in the direction perpendicular to the moving direction of the hand. Therefore, the time for automatic changing of a disc is significantly shortened.

The recording area of a disc is prevented from damaging and also a disc is positioned on a disc rack board accurately at the center regardless of the size of recording area, because the plane for placing a disc thereon of a disc support provided on a plurality of vertically provided disc rack board is formed so as to be tapered with sleeper inclination gradually toward the center of the disc and the periphery of a bare disc is placed on the tapered plane from the above. A disc is placed on a disc rack board stably and horizontally and the disc positioning is not affected by vibration, because the periphery of a disc is placed horizontally on tapered planes. Therefore, a disc is transferred between the carrier and a disc rack board smoothly and consistently.

A disc will not fall down from a disc rack board even when vibrated, because the vertical section which rises vertically from the periphery of the disc supporting section is provided on the disc support.

The disc support is minimized in size, and the small sized disc support favors in respects of the cost and space.

The disc is centered accurately on the hand, transferred by the hand between the carrier and a disc rack board and between the carrier and a disc drive accurately, smoothly, and consistently, while the recording area of a disc supported on the hand is prevented from damaging.

The falling down of a disc from the hand due to vibration is prevented during moving of the disc on the hand, because the vertical section which rises vertically from the periphery of the disc supporting section is provided on the disc support.

A disc holder is minimized in size, the minimized disc holder favors in respects of the cost and space, and favors in respect of light weight, thus allows the hand to move at high speed and allows the automatic changing of a disc to be shortened.

By using the simple two axis direction control comprising the movement control in vertical direction of the carrier by the carrier moving mechanism and the movement control in horizontal direction of the hand by the hand moving mechanism, a disc is automatically changed very simply to a disc drive.

The hand moving mechanism is made simple, small sized, light weight, and cheep in cost, and the moving stroke in horizontal direction of the hand is made long. Therefore, the high speed moving of the carrier is possible, and devices which have different size in the direction parallel to the moving passage of the carrier are provided easily.

Even if, under unusual conditions such as emergency halt of high speed motion of a disc by the carrier to happen to exceed the acceleration of gravity of the disc, a disc is prevented from floating and falling down and the safety is improved, because the disc brace is provided for preventing a disc on the hand from jumping up from the hand and falling down. The disc brace with simple structure is only provided on the carrier, the cost for providing the disc brace is low, it is not required to clamp a disc for preventing the disc from falling down, thereby the disc is prevented from damaging.

The number of sensors for detecting the existence of a disc on a plurality of disc rack boards provided vertically is reduced significantly to lead the significantly reduced cost.

The structure of sensing mechanism is so simple in which simply a sensor is mounted on the carrier and light transmission holes are formed on a plurality of disc rack boards provided vertically, thereby the cost is reduced, and in addition, the distance between a plurality of disc rack boards provided vertically is made small significantly, thereby, the disc changer is minimized significantly by saving the space, such space saving is impossible for conventional structure in which a sensor is mounted individually on a plurality of disc rack boards provided vertically.

A disc on a disc rack board is detected accurately and consistently even if the disc is positioned slightly deviated from the center on the disc rack board, because when light transmission holes on a plurality of disc rack board provided vertically is detected from the slant direction by the sensor system comprising a light-emitting element and light-receiving elements, the existence of a disc on a plurality of disc rack boards provided vertically is detected depending on shielding of the light or passing the light corresponding to the existence or no existence of the disc respectively.

When a bare disc is used as recording medium, the existence of the bare disc is detected accurately, because the light from the sensor is shielded by the upper side or lower side of the disc for opening and closing the light-transmission holes of a plurality of disc rack boards provided vertically, that is, it is not required that a light-reflecting type sensor which requires the light reflection at the end of the recording medium is used.

The carrier is moved smoothly without interference to the carrier by a plurality of disc rack boards provided vertically.

What is claimed is:

1. A disc changer comprising:
    a plurality of disc rack boards provided vertically for holding a plurality of bare discs for recording and/or regeneration;
    at least one disc drive for recording and/or regenerating a bare disc of said plurality of bare discs provided facing said plurality of disc rack boards;
    a carrier which moves in only one direction in a space defined between said plurality of disc rack boards and said at least one disc drive; and
    a hand mounted on said carrier which moves only in the direction perpendicular to the moving direction of the carrier for transferring in only one direction said bare disc between a disc rack board of said plurality of disc rack boards and said carrier and between said at least one disc drive and said carrier;
    wherein the inside of the disc changer is divided into a sealed area and an unsealed area, said plurality of disc rack boards and the space provided for passage of said carrier are provided in said sealed area, said at least one disc drive is provided in said unsealed area, a recorder and/or regenerator in said at least one disc drive is formed in a structure sealed from said unsealed area, but accessible to said sealed area, and main heat generating sources are provided in said unsealed area.

2. The disc changer as claimed in claim 1, wherein the disc changer comprises a partition for dividing the inside of said disc changer into said sealed area and said unsealed area, the recorder and/or regenerator of said at least one disc drive contained in the structure sealed from said unsealed area is provided in said unsealed area and is connected in an air-tight manner through connecting gates to said sealed area with interposition of dust-proof material.

3. The disc changer as claimed in claim 2, wherein a dust-proof box having a structure sealed from said unsealed area is provided around said at least one disc drive, said dust-proof box is supported elastically by dampers for vibration insulation, and the periphery of said connecting gate is connected in said air-tight manner with flexible dust-proof material between said dust-proof box and said partition.

4. The disc changer as claimed in claim 2, wherein a connector plate is fixed on the partition for electrically connecting said sealed area and said unsealed area wherein cables are connected to both sides of the connector plate using connectors.

5. The disc changer as claimed in claim 1, wherein a disc-in-out port for charging and discharging said bare disc is provided in said unsealed area, and the disc-in-out port is formed with a structure sealed from said unsealed area and is connected to said sealed area.

* * * * *